(12) United States Patent
Smith et al.

(10) Patent No.: US 11,113,762 B2
(45) Date of Patent: Sep. 7, 2021

(54) SYSTEM AND METHOD FOR CREATING ON-DEMAND USER-CUSTOMIZED DEPOSIT STRATEGIES USING DATA EXTRACTED FROM ONE OR MORE INDEPENDENT SYSTEMS

(71) Applicant: Choice Financial Solutions, S.L., Madrid (ES)

(72) Inventors: Daniel J. Smith, Madrid (ES); Iñigo San Martín, Madrid (ES); Emilio Fernández, Madrid (ES)

(73) Assignee: Raisin Technology Europe, S.L., Madrid (ES)

( * ) Notice: Subject to any disclaimer, the term of this patent is extended or adjusted under 35 U.S.C. 154(b) by 0 days.

(21) Appl. No.: 16/889,921

(22) Filed: Jun. 2, 2020

(65) Prior Publication Data
US 2020/0294150 A1  Sep. 17, 2020

Related U.S. Application Data

(60) Provisional application No. 62/925,937, filed on Oct. 25, 2019, provisional application No. 62/925,970, filed on Oct. 25, 2019.

(51) Int. Cl.
*G06Q 40/06* (2012.01)
*G06F 3/0482* (2013.01)

(52) U.S. Cl.
CPC .......... *G06Q 40/06* (2013.01); *G06F 3/0482* (2013.01)

(58) Field of Classification Search
CPC ..... G06Q 40/06; G06F 3/0482; G06F 3/0484; G06F 3/048
See application file for complete search history.

(56) References Cited

U.S. PATENT DOCUMENTS

| | | | | |
|---|---|---|---|---|
| 5,918,217 A | * | 6/1999 | Maggioncalda ... | G06Q 30/0601 705/36 R |
| 6,018,722 A | * | 1/2000 | Ray ....................... | G06Q 40/00 705/35 |
| 6,188,993 B1 | * | 2/2001 | Eng ....................... | G06Q 20/06 705/37 |
| 6,275,814 B1 | * | 8/2001 | Giansante .............. | G06Q 40/00 705/35 |

(Continued)

*Primary Examiner* — Jung-Mu T Chuang
(74) *Attorney, Agent, or Firm* — DLA Piper LLP (US)

(57) ABSTRACT

Interactive graphical user interfaces (GUI) are provided. An interactive GUI is generated on a display of a user device, comprising one or more screens to display baseline portfolios and user adjustment tools for customizing variables of the baseline portfolios. The portfolios comprise a combination of data structures, with each data structure defined by a combination of components and/or parameters. The variables comprise a portfolio strategy and/or a customizable parameter. An adjustment indication is received from the user device via the interactive GUI via the user adjustment tools. A variable is adjusted responsive to the adjustment indication. The interactive GUI dynamically updates and displays the adjusting and an impact of the adjusting on at least one other variable as the adjusting occurs. A confirmation indication is received from the user device via the interactive GUI. A user-customized portfolio of data structures is created and issued responsive to the confirmation indication.

30 Claims, 35 Drawing Sheets

(56) References Cited

U.S. PATENT DOCUMENTS

| | | | | |
|---|---|---|---|---|
| 6,765,596 B2* | 7/2004 | Lection | G06F 3/0482 | 715/764 |
| 7,050,998 B1 | 5/2006 | Kale | G06Q 40/00 | 705/35 |
| 7,373,324 B1* | 5/2008 | Engin | G06Q 40/00 | 705/35 |
| 7,401,040 B2 | 7/2008 | Sloan | G06Q 40/00 | 705/35 |
| 7,467,106 B1* | 12/2008 | Levine | G06Q 10/04 | 705/14.13 |
| 7,509,274 B2* | 3/2009 | Kam | G06Q 20/0855 | 463/10 |
| 7,596,523 B2* | 9/2009 | Sobel | G06Q 40/06 | 705/36 R |
| 7,672,886 B2* | 3/2010 | Bent | G06Q 40/08 | 705/35 |
| 7,979,334 B2* | 7/2011 | Kochansky | G06Q 40/06 | 705/36 R |
| 7,983,975 B2* | 7/2011 | Jones | G06Q 40/00 | 705/36 R |
| 8,019,667 B1* | 9/2011 | Bent | G06Q 40/06 | 705/35 |
| 8,073,760 B2* | 12/2011 | Somech | G06Q 40/02 | 705/36 R |
| 8,219,473 B2* | 7/2012 | Gardner | G06Q 40/025 | 705/35 |
| 8,326,728 B1* | 12/2012 | Devaney | G06Q 40/08 | 705/36 R |
| 8,341,063 B1* | 12/2012 | Cernyar | G06Q 40/06 | 705/36 R |
| 8,370,243 B1* | 2/2013 | Cernyar | G06Q 40/06 | 705/36 R |
| 8,468,090 B2* | 6/2013 | Lesandro | G06Q 40/02 | 705/39 |
| 8,498,913 B2* | 7/2013 | Jenson | G06Q 40/08 | 705/35 |
| 8,548,886 B1* | 10/2013 | Bosch | G06Q 40/00 | 705/35 |
| 8,566,191 B2* | 10/2013 | Shelon | G06Q 40/02 | 705/35 |
| 8,571,962 B1* | 10/2013 | West | G06Q 40/06 | 705/36 R |
| 8,606,708 B1* | 12/2013 | Homier | G06Q 40/02 | 705/40 |
| 8,688,575 B2* | 4/2014 | Steiner | G06Q 40/04 | 705/40 |
| 8,700,522 B2* | 4/2014 | Moore | G06Q 40/025 | 705/38 |
| 8,768,815 B1* | 7/2014 | Thayer | G06Q 40/06 | 705/36 R |
| 8,849,711 B2* | 9/2014 | Glinberg | G06Q 40/06 | 705/37 |
| 10,217,167 B2* | 2/2019 | Thayer | G06Q 40/06 | |
| 10,255,636 B2* | 4/2019 | Jha | G06Q 40/06 | |
| 10,268,757 B2* | 4/2019 | Aikawa | G06F 21/50 | |
| 10,290,059 B2* | 5/2019 | Basu | G06F 3/0484 | |
| 10,475,119 B1* | 11/2019 | Kissner | G06Q 40/025 | |
| 10,515,410 B2* | 12/2019 | Kodama | G06Q 40/06 | |
| 10,586,287 B2* | 3/2020 | Jha | G06Q 40/06 | |
| 10,592,987 B2* | 3/2020 | Dennelly | G06Q 40/06 | |
| 2001/0009003 A1* | 7/2001 | Groat | G06Q 99/00 | 705/36 R |
| 2001/0051907 A1* | 12/2001 | Kumar | G06F 16/9535 | 705/36 R |
| 2002/0042764 A1* | 4/2002 | Gardner | G06Q 40/06 | 705/35 |
| 2002/0091605 A1* | 7/2002 | Labe, Jr. | G06Q 40/06 | 705/36 R |
| 2002/0140742 A1* | 10/2002 | Lection | G06F 3/0482 | 715/835 |
| 2002/0152151 A1* | 10/2002 | Baughman | G06Q 40/06 | 705/36 R |
| 2002/0198811 A1* | 12/2002 | Wizon | G06Q 40/02 | 705/36 R |
| 2003/0028466 A1* | 2/2003 | Jenson | G06Q 40/00 | 705/36 R |
| 2003/0088489 A1* | 5/2003 | Peters | G06Q 40/06 | 705/36 R |
| 2003/0208427 A1* | 11/2003 | Peters | G06Q 40/06 | 705/36 R |
| 2004/0210500 A1* | 10/2004 | Sobel | G06Q 40/00 | 705/35 |
| 2004/0267651 A1* | 12/2004 | Jenson | G06Q 40/08 | 705/36 R |
| 2005/0010516 A1* | 1/2005 | Ivanov | G06Q 40/06 | 705/36 R |
| 2005/0055301 A1* | 3/2005 | Cohen | G06Q 40/06 | 705/36 R |
| 2005/0090911 A1* | 4/2005 | Ingargiola | G06Q 40/00 | 700/36 |
| 2005/0187851 A1* | 8/2005 | Sant | G06Q 40/06 | 705/36 R |
| 2005/0228733 A1* | 10/2005 | Bent | G06Q 40/025 | 705/35 |
| 2005/0289037 A1* | 12/2005 | Smith | G06Q 40/06 | 705/36 R |
| 2006/0010418 A1* | 1/2006 | Gupta | G06Q 10/06 | 717/101 |
| 2006/0020531 A1* | 1/2006 | Veeneman | G06Q 40/00 | 705/35 |
| 2006/0106703 A1* | 5/2006 | Del Rey | G06Q 40/06 | 705/35 |
| 2007/0011063 A1* | 1/2007 | Shelon | G06Q 40/00 | 705/35 |
| 2007/0156573 A1* | 7/2007 | Whitehurst | G06Q 40/00 | 705/37 |
| 2007/0208651 A1* | 9/2007 | Noel | G06Q 40/06 | 705/37 |
| 2007/0233585 A1* | 10/2007 | Ben Simon | G06Q 40/00 | 705/35 |
| 2007/0271197 A1* | 11/2007 | Law | G06Q 40/025 | 705/36 R |
| 2008/0243716 A1* | 10/2008 | Ouimet | G06Q 40/06 | 705/36 R |
| 2009/0030818 A1* | 1/2009 | Braun | G06Q 40/06 | 705/30 |
| 2009/0094170 A1* | 4/2009 | Mohn | G06Q 40/02 | 705/36 T |
| 2009/0119198 A1* | 5/2009 | Manriquez | G06Q 40/04 | 705/37 |
| 2009/0144123 A1* | 6/2009 | Malov | G06Q 10/04 | 705/7.29 |
| 2009/0150301 A1* | 6/2009 | Abbott | G06Q 40/08 | 705/36 R |
| 2010/0088210 A1* | 4/2010 | Gardner | G06Q 40/00 | 705/35 |
| 2010/0229155 A1* | 9/2010 | Adiyapatham | G06F 11/3672 | 717/124 |
| 2010/0268668 A1* | 10/2010 | Burdette | G06Q 40/06 | 705/36 R |
| 2011/0066457 A1* | 3/2011 | Chang | G06Q 10/10 | 707/600 |
| 2011/0066570 A1* | 3/2011 | Kolo | G06Q 40/06 | 705/36 R |
| 2011/0066589 A1* | 3/2011 | Chang | G06F 16/283 | 707/600 |
| 2011/0066590 A1* | 3/2011 | Chang | G06F 16/00 | 707/602 |
| 2011/0106692 A1* | 5/2011 | Moore | G06Q 40/02 | 705/38 |
| 2011/0258139 A1* | 10/2011 | Steiner | G06Q 40/06 | 705/36 R |
| 2011/0298805 A1* | 12/2011 | Laurito | G06Q 40/06 | 345/440 |
| 2012/0047090 A1* | 2/2012 | Gunther | G06Q 40/06 | 705/36 R |
| 2012/0054095 A1* | 3/2012 | Lesandro | G06Q 20/10 | 705/39 |

(56) References Cited

U.S. PATENT DOCUMENTS

| | | | | |
|---|---|---|---|---|
| 2012/0054121 | A1* | 3/2012 | Fiala | G06Q 40/06 705/36 R |
| 2012/0179598 | A1* | 7/2012 | Roth | G06Q 40/025 705/38 |
| 2013/0246238 | A1* | 9/2013 | Chen | G06Q 40/06 705/37 |
| 2013/0311398 | A1* | 11/2013 | Navin | G06Q 40/06 705/36 R |
| 2014/0143175 | A1* | 5/2014 | Greenshields | G06Q 40/06 705/36 R |
| 2014/0258175 | A1* | 9/2014 | Twombly | G06Q 40/06 705/36 R |
| 2014/0351166 | A1* | 11/2014 | Schlossberg | G06Q 40/06 705/36 R |
| 2014/0365399 | A1* | 12/2014 | Dennelly | G06Q 40/06 705/36 R |
| 2015/0039530 | A1* | 2/2015 | Jha | G06Q 40/06 705/36 R |
| 2015/0095258 | A1* | 4/2015 | Odabashyan | G06Q 40/06 705/36 R |
| 2015/0121185 | A1* | 4/2015 | Holt | G06F 3/04817 715/212 |
| 2015/0161733 | A1* | 6/2015 | Emsbo-Mattingly | G06Q 40/06 705/36 R |
| 2015/0206245 | A1* | 7/2015 | Basu | G06F 3/0484 705/36 R |
| 2015/0379448 | A1* | 12/2015 | Santos | G06F 9/451 705/7.23 |
| 2016/0098655 | A1* | 4/2016 | Varadan | G06Q 10/0637 705/7.28 |
| 2016/0155200 | A1* | 6/2016 | Basu | G06T 11/206 705/36 R |
| 2016/0239918 | A1* | 8/2016 | Lambur | G06Q 50/01 |
| 2017/0024816 | A1* | 1/2017 | Altomare | G06Q 40/08 |
| 2017/0116669 | A1* | 4/2017 | Wickstrom | G06Q 10/1097 |
| 2017/0213290 | A1* | 7/2017 | Praul | G06Q 40/06 |
| 2017/0270610 | A1* | 9/2017 | Kee | G06Q 40/06 |
| 2017/0323385 | A1* | 11/2017 | Sivaramakrishnan | G06Q 40/06 |
| 2018/0089758 | A1* | 3/2018 | Stradling | H04L 63/105 |
| 2018/0173794 | A1* | 6/2018 | Aikawa | G06F 21/31 |
| 2018/0225767 | A1* | 8/2018 | Tanaka | G06Q 40/06 |
| 2019/0019132 | A1* | 1/2019 | Cullen | G06Q 10/06316 |
| 2019/0026830 | A1* | 1/2019 | Powell | G06F 3/0485 |
| 2019/0180377 | A1* | 6/2019 | Jha | G06Q 40/06 |
| 2020/0111161 | A1* | 4/2020 | Altomare | G06Q 40/04 |
| 2020/0175602 | A1* | 6/2020 | Jha | G06Q 40/06 |
| 2020/0249966 | A1* | 8/2020 | Smith | G06F 3/04847 |
| 2020/0294150 | A1* | 9/2020 | Smith | G06F 3/04842 |
| 2021/0065202 | A1* | 3/2021 | Bansal | G10L 15/22 |

\* cited by examiner

Time Deposit Portfolio Builder

[Back To Products]  [⬇ Download Details]

About This Offer  [<]

1. Input total portfolio amount 3,000,000.00

Modify deposits...

2. Input initial portfolio term 60 months ⌄

3. Choose portfolio structure

Annual ⌄

4. What renewal strategy do you prefer?

● Perpetual
   ○ Fixed Term
   ○ No Renewal 24, 36, 48, 60 Months

Create the portfolio of FDIC-insured time deposit that best suits your fixed income strategy from a single or multiple depository institutions.

Features
- Ability for a saver to combine the higher rates of longer term CDs with the access to cash when you need it.
- Select your amount, term and frequency to automatically generate your portfolio structure of the CDs
- Determine if you want to adjust the distribution of your CD amounts
- Compare the return of your portfolio to other CD strategies
- You can also take advantage of additional reinvestment opportunities.

FIG. 7C

Time Deposit Portfolio Builder

Back To Products | Download Details

1. Input total portfolio amount
   3,000,000.00
   Modify deposits...

2. Input initial portfolio term
   60 months

3. Choose portfolio structure
   Annual

4. What renewal strategy do you prefer?
   ● Perpetual
   ○ Fixed Term
   ○ No Renewal About This Offer ● Rollover Interest   ○ Strategy Interest

742

$70,396 | $96,745 | $146,282 | $196,610 | $253,815
$160,058 | $247,744
$350,896
$451,320

12 MONTHS | 24 MONTHS | 36 MONTHS | 48 MONTHS | 60 MONTHS

| 12 Month CD Rollover Potential Interest | Yield 1.58% | Accumulated Interest $247,744.26 |
| Portfolio Auto-Renew Potential Interest | Yield 2.80% | Accumulated Interest $451,320.28 |

User / Accounts / Open an Account

| 1. User Information ✓ | 2. Contact Information ✓ | 3. Funding and Payments ✓ | 4. Review × | 5. Documentation × |

ACCOUNT NUMBER: NOT ASSIGNED | STATUS: REQUEST NOT SAVED

[PREVIOUS] [NEXT]

| Entity System Name | Amount | Term | APY |
|---|---|---|---|
| Entity System 1 | 245,000 | 1 year | |
| Entity System 2 | 245,000 | 1 year | |
| Entity System 3 | 245,000 | 1 year | |
| Entity System 4 | 245,000 | 1 year | |
| Entity System 22 | 245,000 | 1 year | |
| Entity System 6 | 245,000 | 1 year | |
| Entity System 7 | 245,000 | 1 year | |
| Entity System 8 | 245,000 | 1 year | |
| Entity System 9 | 245,000 | 1 year | |
| Entity System 10 | 245,000 | 1 year | |
| Entity System 11 | 245,000 | 1 year | |
| Entity System 12 | 245,000 | 1 year | |
| Entity System 13 | 245,000 | 1 year | |
| Entity System 14 | 245,000 | 1 year | |
| Entity System 15 | 245,000 | 1 year | |
| Entity System 16 | 245,000 | 1 year | |
| Entity System 17 | 245,000 | 1 year | |
| Entity System 18 | 245,000 | 1 year | |
| Entity System 19 | 245,000 | 1 year | |
| Entity System 20 | 245,000 | 1 year | |
| Entity System 21 | 100,000 | 1 year | |
| Total | 5,000,000 | Blended APY | 1.05% |

WHAT IS THE MAXIMUM REVENUE FOR YOUR INSTITUTION?
(EXPRESSED IN UPFRONT TERMS PER YEAR OF DURATION APPLIED
TO THE INITIAL TOTAL AMOUNT)  [ 0.15% ]

CLICK HERE IF REVENUE IS DIFFERENT DEPENDING ON TENOR

IS THE RELATIONSHIP MANAGER ALLOWED TO KEEP A
PORTION OF THE REVENUE CHARGED BY YOUR INSTITUTION?   [ YES ] [ NO ]

WHAT IS THE MAXIMUM DISCOUNT THE RELATIONSHIP
MANAGER CAN GIVE TO THE USER   [ 0.05% ]

| TENOR | APY | MINIMUM ($) | MAXIMUM ($) | ALLOCATED ($) | REMAINING ($) |
|---|---|---|---|---|---|
| OVERNIGHT | 0.05% | 25,000 | 5,000,000 | 2,450,000 | 2,550,000 |
| 1 WEEK | 0.05% | 0 | 0 | 0 | 0 |
| 2 WEEKS | 0.05% | 0 | 0 | 0 | 0 |
| 3 WEEKS | 0.05% | 0 | 0 | 0 | 0 |
| 1 MONTH | 0.10% | 25,000 | 5,000,000 | 5,000,000 | 0 |
| 2 MONTHS | 0.10% | 25,000 | 10,000,000 | 6,000,000 | 4,000,000 |
| 3 MONTHS | 0.15% | 25,000 | 10,000,000 | 10,000,000 | 0 |
| 4 MONTHS | 0.20% | 25,000 | 15,000,000 | 5,000,000 | 10,000,000 |
| 5 MONTHS | 0.20% | 25,000 | 15,000,000 | 15,000,000 | 0 |
| 6 MONTHS | 0.25% | 25,000 | 15,000,000 | 15,000,000 | 0 |
| 7 MONTHS | 0.25% | 0 | 0 | 0 | 0 |

| MATURITY DATE | OUTFLOW ($) | PRINCIPAL ($) | EXPECTED INTEREST ($) | REMAINING CAPACITY ($) | DEPOSITOR(S) |
|---|---|---|---|---|---|
| xx/yy/zz | 2,346,740 | 2,325,000 | 21,740 | 653,260 | VARIOUS |
|  | 584,554 | 580,000 | 4,554 |  | DEPOSITOR zzzz |
|  | 249,521 | 245,000 | 4,521 |  | DEPOSITOR yyyy |
|  | 1,512,665 | 1,500,000 | 12,665 |  | DEPOSITOR xxxx |
| xx/yy/zz | 457,000 | 432,000 | 25,000 | — | DEPOSITOR tttt |

| FILTER CRITERIA | | | | | | Data is automatically updated every 180 seconds<br>Last Update: 11/03/2016 18:03:24 | |
|---|---|---|---|---|---|---|---|
| PREVIOUS DAY | | 11/03/2016 | FOLLOWING DAY | | | RESET | SEARCH |

| | SCHEDULED TIME | EOD MODEL | START | END | STATUS | SETS | | | | LOG |
|---|---|---|---|---|---|---|---|---|---|---|
| ⊖ | 11/03/2016 18:03:15 | PRECLOSE | 11/03/2016 18:03:15 | N/A | Running | SetChoice | | | | |
| | | EOD PROCESSING SET | | | STATUS | START | END | STATUS | | |
| | DETAILS | Platform Pre-Close - SetChoice | | | | 18:03:15 | 18:03:17 | Finished | | |
| | DETAILS | Bank Pre-Close - Set1 | | | | N/A | N/A | Pending | | |
| | DETAILS | Bank Pre-Close - Set2 | | | | N/A | N/A | Pending | | |
| ⊕ | 17:00:00 | STANDARD | N/A | N/A | Pending | Set1,Set2,SetChoice | | | | |
| ⊕ | 04:00:00 | REPORT | N/A | N/A | Pending | Set1,Set2,SetChoice | | | | |

FIG. 9C

System Management / End Of Day Monitoring

SEARCH

EOD Processing Date 4/14/2016

Actual Server Start: 11/03/2016 18:04:53    Actual Server End: 11/03/2016 18:05:27

Message: err    User Name:

[RESET]  [SEARCH]  [BACK]

| USER | DATE | EXCEPTION |
|---|---|---|
| Oscar.Riopedre | 11/03/2016 18:04:59 | End of process - ConfidenceCheck - EntityCHOICE - Result : 40 - KC: No Rates... [MORE] |
| Oscar.Riopedre | 11/03/2016 18:04:59 | ERROR: Unexpected end due to process error - ConfidenceCheck - |
| Oscar.Riopedre | 11/03/2016 18:05:00 | Selected Execution Mode is From Last Error |
| Oscar.Riopedre | 11/03/2016 18:05:00 | Automatic Application Termination with Errors - Return Code = 1 |

FIG. 9D

| | | EOD Processing Set: | Platform EOD - SetChoice | | EOD Model: | STANDARD | |
|---|---|---|---|---|---|---|---|
| | | Scheduled Time: | 11/03/2016 18:04:53 | | Status: | Error | |
| | | Actual Server Start: | 18:04:53 | | Actual Server End: | 18:04:57 | |
| | | Running Rules: | AllBusiness;FederalHolidayNYSE | | Running Rule Applied: | AllBusiness | |
| | | | | | | VIEW LOG | BACK |
| | PROCESS NAME | SINGLE PER SET | START | END | STATUS | BANKS | |
| ⊕ | GetSystemStatus | ✓ | 11/03/2016 18:04:53 | 11/03/2016 18:04:53 | Finished | | |
| ⊕ | SetSystemStatus | ✓ | 11/03/2016 18:04:55 | 11/03/2016 18:04:55 | Finished | | |
| ⊕ | ConfidenceCheck | ✓ | 11/03/2016 18:04:57 | 11/03/2016 18:04:57 | Error | | |
| ⊕ | MBMPublish_DropOff | ✓ | N/A | N/A | Pending | | |
| ⊕ | ProcessSystemTasks | ✓ | N/A | N/A | Pending | | |
| ⊕ | PromoteCampaignStatus | ✓ | N/A | N/A | Pending | | |
| ⊕ | PromoteCampaignGroupStatus | ✓ | N/A | N/A | Pending | | |
| ⊕ | SetSystemStatus | ✓ | N/A | N/A | Pending | | |
| ⊕ | SystemDateChange | ✓ | N/A | N/A | Pending | | |
| ⊕ | PromoteCampaignStatus | ✓ | N/A | N/A | Pending | | |

| PROCESS NAME | SINGLE PER SET | START | END | STATUS | BANKS |
|---|---|---|---|---|---|
| GetSystemStatus | ✓ | 11/03/2016 18:04:53 | 11/03/2016 18:04:53 | Finished | |
| SetSystemStatus | ✓ | 11/03/2016 18:04:55 | 11/03/2016 18:04:55 | Finished | |
| ConfidenceCheck | ✓ | 11/03/2016 18:04:57 | 11/03/2016 18:04:57 | Error | |

| START | END | STATUS | BANKS |
|---|---|---|---|
| 18:04:57 | 18:04:57 | Error | All |

| PROCESS NAME | SINGLE PER SET | START | END | STATUS | BANKS |
|---|---|---|---|---|---|
| MBMPublish_DropOff | ✓ | N/A | N/A | Pending | |
| ProcessSystemTasks | ✓ | N/A | N/A | Pending | |
| PromoteCampaignStatus | ✓ | N/A | N/A | Pending | |
| PromoteCampaignGroupStatus | ✓ | N/A | N/A | Pending | |
| SetSystemStatus | ✓ | N/A | N/A | Pending | |
| SystemDateChange | ✓ | N/A | N/A | Pending | |

EOD Processing Set: Platform EOD – SetChoice
Scheduled Time: 11/03/2016 18:04:53
Actual Server Start: 18:04:53
Running Rules: AllBusiness;FederalHolidayNYSE EOD Model: STANDARD
Status: Error
Actual Server End: 18:04:57
Running Rule Applied: AllBusiness

[VIEW LOG] [BACK]

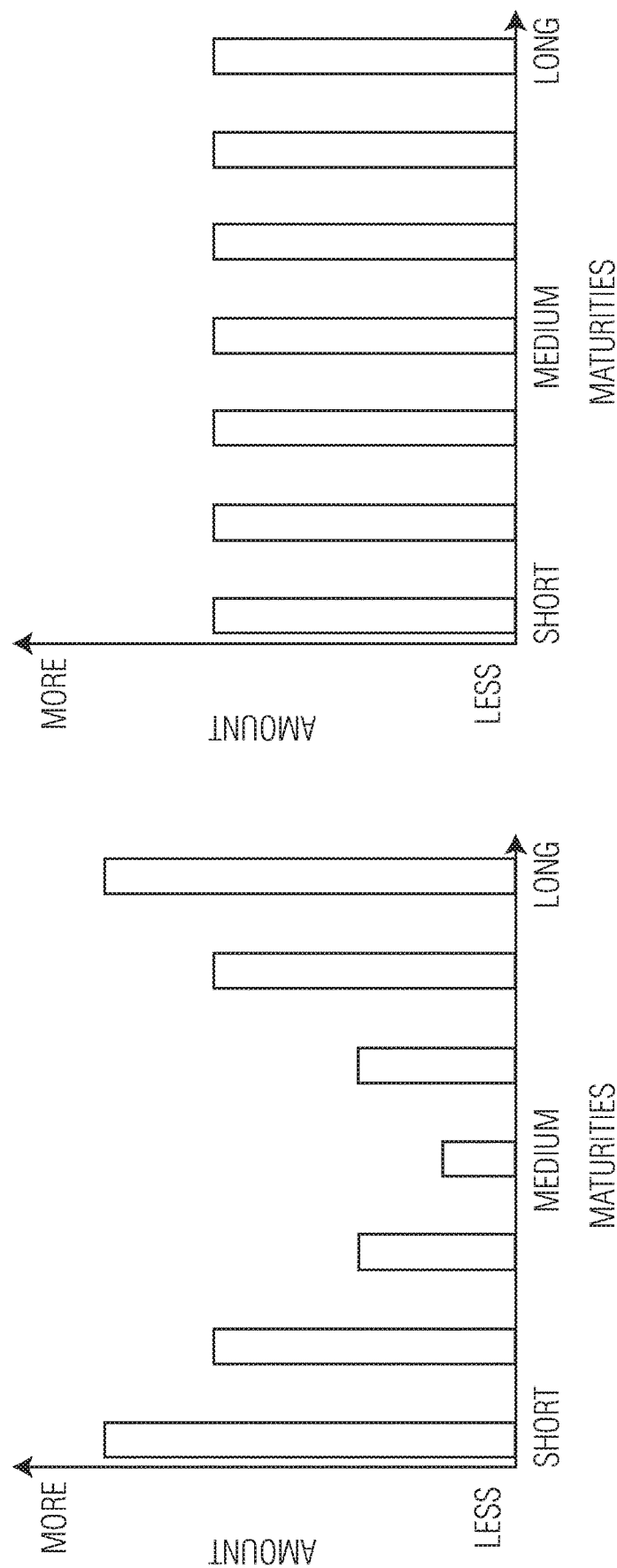

SYSTEM AND METHOD FOR CREATING ON-DEMAND USER-CUSTOMIZED DEPOSIT STRATEGIES USING DATA EXTRACTED FROM ONE OR MORE INDEPENDENT SYSTEMS

TECHNICAL FIELD

The present disclosure generally relates to improving data structure management and, in particular, to management systems, interactive graphical user interfaces (GUIs) and methods for the creation and management of on-demand user-customizable portfolios of data structures.

BACKGROUND

Problems exist in the field of creating, customizing and managing portfolios of electronic data structures. These problems are exacerbated by attempts to fully automate creating and/or managing customized portfolios of electronic data structures throughout their entire life cycles. Indeed, conventional systems are incapable of fully automating the creating (e.g., building) and/or managing of portfolios (i.e., combinations) of data structures. Even when building (non-customized) portfolios comprised of pre-selected combinations and/or quantities of data structures, existing systems still require time-consuming, cumbersome and error-prone human intervention. And once a portfolio of data structures is created, existing systems require human intervention to manage certain portfolio-specific features (e.g., renewal, rollover, etc.) that may arise throughout a portfolio's life-cycle. Depending on the types of data structures used to create a given portfolio, or the particular strategy being deployed by the portfolio, the external (human) intervention may extend to involve administrators and/or agents from multiple external sources, thereby further increasing overall operations costs and reducing systematic efficiencies.

Beyond creating and managing portfolios, user-customization of such portfolios may be desired, for example, to obtain user-specific objections or strategies. Customizing portfolios, however, presents additional layers of difficulties and challenges that conventional systems are simply not equipped to handle. As a result, conventional systems are limited to offering pre-defined portfolios that have been pre-programmed into said systems. These pre-programmed portfolios, however, have little to no variability or adjustability in respect of their respective portfolio components (e.g., combinations of data structures, key features, characteristics and/or parameters of the data structures within said portfolios, etc.). As a result, the pre-defined portfolios cannot easily be adapted to the specific needs (e.g., strategies) of individual users. And since there are nearly endless combinations of data structures, features, characteristics and parameters that may define a particular portfolio, conventional systems clearly fall well short of offering all viable portfolio configurations.

One reason conventional systems generally only offer a relatively small, limited set of pre-defined portfolios includes the significant computational burden, cost, complexity and continual system maintenance needed to both create and manage each additional variation of a portfolio of data structures. Indeed, creating a portfolio that varies even slightly (e.g., having a same combination of data structures, but with one or more different parameters (e.g., expiration date)) from an existing portfolio (e.g., customized to a particular user's specifications) would require the conventional system to be manually updated and re-programmed (e.g., re-configured) to construct this entirely new portfolio combination and to manage it throughout aspects its life-cycle; and each additional variation would similarly require such updating and re-programming. In addition, the conventional system would need to allocate additional system resources (e.g., memory, processor, etc.) to accommodate all aspects of each new data portfolio. This is computationally exhausting, impractical and cost prohibitive.

In order to avoid system re-programming and re-configuring, continual system updating and maintenance, increased drain on system resources, and other challenges, conventional systems simply avoid offering any 'customization' or variability beyond their respective pre-defined set of portfolios. Said another way, conventional systems offering truly customizable portfolios of data structures on the fly do not exist.

Instead, because of the systematic deficiencies noted above, customized portfolios may theoretically be created and managed manually, outside of the constraints of conventional systems. However, because of the computer-specific features and functions required to create, customize and/or manage portfolios of the types described herein, manual creation and management of customized data structure portfolios does not present a viable option. Indeed, creating, customizing and/or managing portfolios of data structures requires monitoring of real-time data, extracting data from multiple data sources, making real-time calculations and adjustments in response to changes in the real-time data, and triggering other (external) systems to initiate processes and routines. Humans are incapable of capturing, processing and/or initiating anything in real-time, let alone the volumes of data and functions associated with creating, processing and managing said data structures. As a result, an attempted manual customization process would inevitably fail, and lead to inaccurate underlying data and calculations within the portfolios. Such inaccuracies would be particularly exacerbated for portfolios comprised of data structures having complex relationships and/or those that are dependent upon voluminous and/or highly volatile real-time data.

Moreover, it is noted that aspects of processing and managing these portfolios are acutely time-sensitive. Thus, even if (arguendo) it were theoretically possible for a human to perform the needed creating, customizing and/or managing functions and procedures, the human delay associated with such functions and procedures would certainly lead to stale and outdated results. Further, fully performing such functions manually would result in a process that is less automated, rather than closer to full automation. Thus, any attempted manual alternative, if possible, would be unfeasible, impractical, inaccurate, and worse, technologically regressive.

Accordingly, there is a need for a system (including a novel interactive graphical user interface (GUI)), and method for creating, customizing and managing any number of user-customizable portfolios of data structures, on the fly, in a fully-automated (or near fully-automated) manner. There is also a need for the system and method to automate the management of the customized portfolios throughout their respective life-cycles. All of this, without significant increases to the computational burden, cost, complexity and system maintenance.

SUMMARY

Aspects of the present disclosure relate to systems, methods and non-transitory computer-readable mediums providing an interactive graphical user interface (GUI) for creating on-demand user-customizable portfolios of data structures. A system includes at least one computer server configured to communicate with one or more entity systems and at least one user device. The at least one computer server comprises memory storing computer-readable code and at least one processor executing the computer-readable code. The computer-readable code causes the at least one computer server to: receive, via one or more data feed interfaces, one or more baseline data structures from among the one or more entity systems; generate an interactive GUI on a display of the at least one user device, where the interactive GUI comprising one or more screens; display, via the interactive GUI, one or more baseline portfolios, each of which comprises a combination of one or more data structures among the one or more baseline data structures, where the one or more data structures are each defined by a combination of one or more data structure components and/or parameters; display, via the interactive GUI, one or more user adjustment tools for customizing variables of the one or more baseline portfolios, where the variables comprise at least one of a portfolio strategy and a customizable parameter among said parameters; receive, from the at least one user device via the interactive GUI, at least one adjustment indication via the one or more user adjustment tools; adjust, responsive to the at least one adjustment indication, at least one of said variables; dynamically update and display, via the interactive GUI, the adjusting and an impact of the adjusting on at least one other variable as the adjusting occurs; receive, from the at least one user device via the interactive GUI, input comprising a confirmation indication; and create and issue a user-customized portfolio of data structures responsive to the confirmation indication received from the at least one user device via the interactive GUI.

Aspects of the present disclosure also relate to an interactive GUI. An interactive GUI is configured to be generated on a display of at least one user device. The interactive GUI comprises one or more screens, where at least one of the one or more screens comprises a user adjustment region, a display region, and a user confirmation region. The display region is configured to display a baseline portfolio comprising a combination of one or more data structures. The one or more data structures each being defined by a combination of one or more data structure components and/or parameters. The one or more data structures being received from among one or more entity systems via one or more data feeds. The display region configured to display characteristics of the baseline portfolio in a graphical format and a textual format. The user adjustment region comprises one or more user adjustment tools for customizing variables of the baseline portfolio. The variables comprise at least one of a portfolio strategy and a customizable parameter among said parameters. The interactive GUI is further configured to: receive, via the one or more user adjustment tools in the user adjustment region, at least one adjustment indication, from the at least one user device; adjust, responsive to the at least one adjustment indication, at least one of the variables; dynamically update the display region and display the adjusting and an impact of the adjusting on at least one other variable as the adjusting occurs, thereby dynamically modifying the characteristics of said baseline portfolio; receive, via the user confirmation region, from the at least one user device, input comprising a confirmation indication; and display details of a user-customized portfolio of data structures once said user-customized portfolio is created and issued responsive to the confirmation indication.

BRIEF DESCRIPTION OF THE DRAWINGS

FIGS. 7A, 7B, 7C, 7D and 7E are example screenshots of an interactive GUI creating user-customized portfolio(s), according to an aspect of the present disclosure.

FIGS. 8A, 8B, 8C, 8D, 8E, 8F, 8G, 8H, 8I, 8J, 8K and 8L are examples screenshots of an interactive GUI creating and managing user-customized portfolio(s), according to aspects of the present disclosure.

FIGS. 9A, 9B, 9C, 9D, 9E, 9F and 9G are example screenshots of an interactive administrator GUI, according to an aspect of the present disclosure.

FIGS. 11A, 11B, 11C and 11D are graphs of various example portfolio strategies, according to an aspect of the present disclosure.

DETAILED DESCRIPTION

Figure 1:
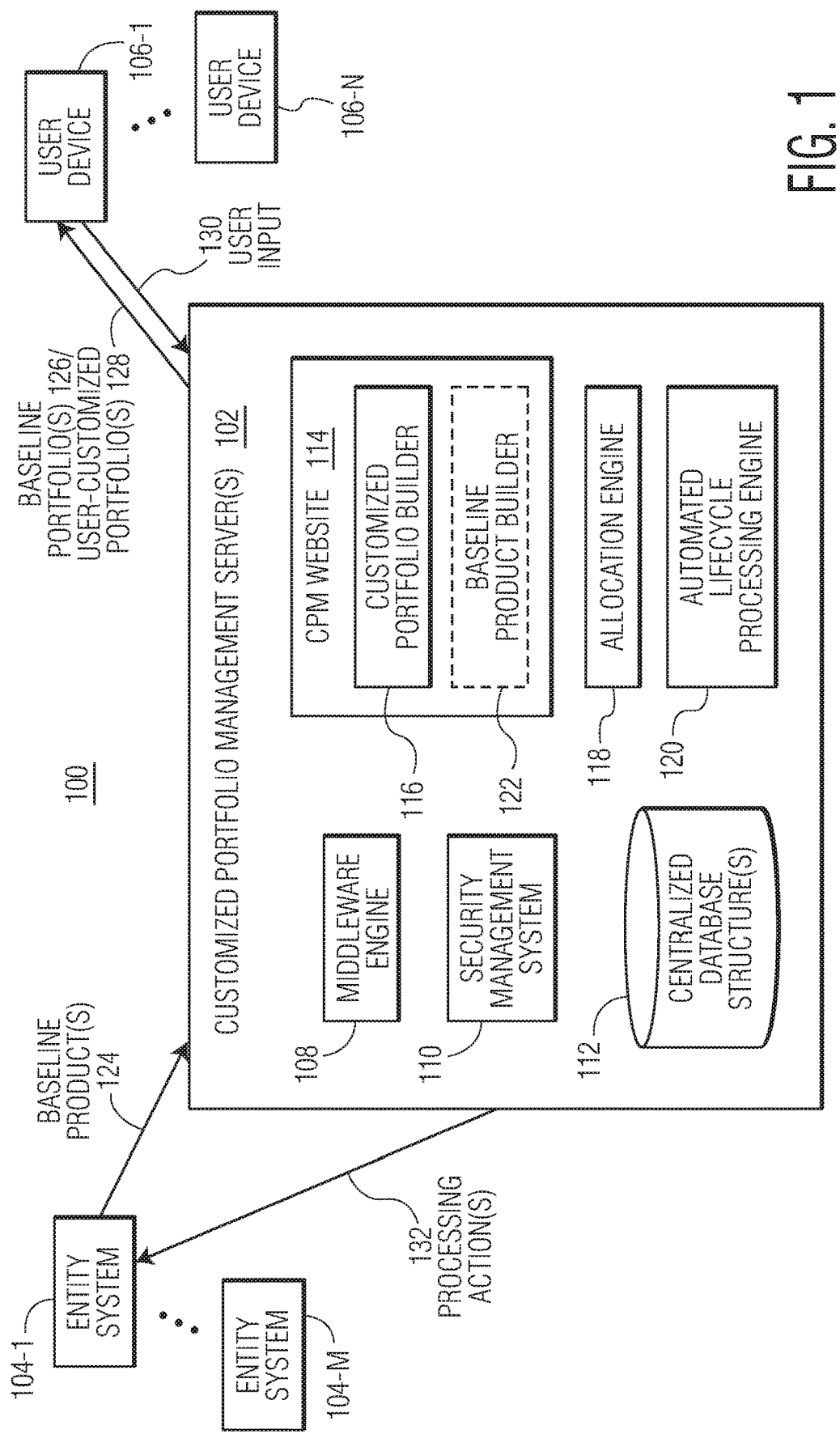
FIG. 1 is a functional block diagram of an example data structure management system for creating and managing user-customized portfolios of data structures, according to an aspect of the present disclosure.

Aspects of the present disclosure relate to systems, methods and non-transitory computer-readable storage media for creating and managing user-customized portfolios of data structures. In summary, a system according to the present disclosure may include one or more computing devices in communication with each other, each comprising a memory storing computer-readable instructions and at least one processor for executing said instructions. At least one of the computing devices executes instructions that causes the system to create one or a plurality of user-customizable portfolios (also referred to as "baseline portfolios") of data structures. These baseline portfolios will each comprise a pre-defined combination of underlying data structures, with each data structure of each portfolio being defined by a combination of one or more data structure components and/or parameter(s). Optionally, the baseline portfolio(s) may be created by a single system, across multiple (independent) systems networked together and/or via a user's personal computing device. Once created and/or defined, the baseline portfolios may form the basis of any number of feasible and/or desirable customized portfolio permutations.

Once created and/or defined as noted above, the system may make said baseline portfolio(s) available (for customization) on a global basis or selectively to certain authorized users. Users may then access a respective baseline portfolio (e.g., remotely over a network via a user device, or locally by directly accessing the computing device(s) that created the baseline portfolio), and provide user input to customize said baseline portfolio. The user input may comprise data and/or instructions relating to a desired portfolio strategy and/or to one or more customizable portfolio parameters (collectively, portfolio variables). Then, responsive to the user input, the system may automatically adjust one or more portfolio variables of the baseline portfolio. The users may continue to submit user-input to cause the system to initiate any number and/or variety of strategy and/or parameter adjustments to the baseline portfolio. Once all desired adjustments are completed, the result is a user-customized portfolio.

The system may optionally comprise an interactive graphical user interface (GUI). The interactive GUI may be specially configured to present baseline portfolios on a display device together with user-adjustment tools for adjusting (e.g., fully customizing) one or more customizable strategies/parameters of the baseline portfolio(s). The interactive GUI may also display user-selection tools, such that a user may select one or more baseline portfolios to customize. In response to user input (e.g., user-indicated adjustments and/or selections), the interactive GUI may display the creation of the baseline portfolio, as well as the dynamic impact of user-indicated adjustments on the baseline portfolio(s) itself, including the effect on strategies/parameters of the baseline portfolio(s), on the display device, in real-time. This may be accomplished, for example, by connecting to and/or monitoring any number of external systems (e.g., over a network), such that, in response to user-indicated adjustments or selections, a system of the present disclosure may extract and/or obtain pertinent real-time data from the external system(s), perform real-time calculations and determinations, generate strategy/parameter adjustments, and dynamically display the impact of such adjustments on the interactive GUI. As the pertinent data changes, the visual display on the interactive GUI may dynamically change to reflect such data changes (e.g., in real-time).

The system may further be configured to automatically prepare and display (via the interactive GUI) summary report(s) reflecting all adjusted strategies and/or parameters associated with each user-customized portfolio. Once each adjusted strategy/parameter is confirmed (e.g., via user input), the system may automatically issue (i.e., generate) the user-customized portfolio.

Once user-customized portfolio(s) are created and issued, the system according to the present disclosure may be configured to automatically manage data handling functions for user-customized portfolio(s) over a lifecycle of the customized portfolio(s). This may be accomplished, for example, by connecting to any number of external system(s), and automatically initiating certain processes and routines such as (without limit): portfolio renewal, portfolio rollover, portfolio funding and formalization, portfolio event scheduling, settlement generation and one or more automatic daily/end-of-day processes.

In an exemplary embodiment, the systems and methods of the present disclosure may be utilized for creating and managing user-customized portfolios of data structures defining financial products, where the financial products include time deposit products. In some examples, these time deposit products may themselves be user-customized. According to this exemplary embodiment, a plurality of user-customizable baseline portfolios, each comprising a combination of time deposit products, may be created using one or more computing devices. Each time deposit product of each baseline portfolio may comprise a rate curve (which is defined as combinations of data variables such as available tenors and interest rates). The data and information used to create the baseline portfolios may originate from a single entity system (e.g., bank, broker, investment firm, etc.), from multiple (independent) entity systems networked together, and/or remotely via a user's personal computing device.

Once created, the baseline portfolios may be made available on a global basis or on a selective basis to users. Upon accessing a baseline portfolio (e.g., via a user device), a user may submit input (e.g., via an interactive GUI comprising user-adjustment tools) comprising data and/or instructions to select and/or adjust one or more portfolio strategies and/or parameters, such as, for example, maximum strategy tenor, total deposit amount, one or more interim maturities (including details of an amount desired in each maturity), renewal strategy, rollover strategy, portfolio strategy type (e.g., barbell, ladder, bullet, a combination thereof, etc.), etc.

In response to the user input, the system may automatically adjust at least one customizable portfolio parameter and/or strategy, and reflect the impact of said adjustment(s) on one or more other portfolio parameters. For example, adjustment or entry of one parameter (e.g., total deposit amount) may impact a value of other parameters (e.g., yield, total interest amount to be received, schedule of time deposit maturities, final maturity, etc.). These adjustments and their impact may be determined, for example, by connecting to and/or monitoring any number of external systems (e.g., over a network), such that, in response to the user-input, the system of this embodiment may extract and/or obtain pertinent real-time data from the external system(s), perform real-time calculations and determinations, and generate strategy/parameter adjustments. In addition, the system may dynamically display the user-input and the impact of such adjustments on the interactive GUI.

The system of this exemplary embodiment may further be configured to automatically generate and display (via the interactive GUI) summary report(s) reflecting all adjusted strategies and/or parameters associated with the user-customized portfolio. These summary report(s) may include graph plots of chosen portfolio strategies, showing investment allocation amounts (less, more) versus maturity times (e.g., short, medium, long). Once each adjusted strategy/parameter is confirmed (e.g., via user input), the system may automatically issue (i.e., generate) the user-customized portfolio.

Once user-customized portfolio(s) are created and issued, the system according to this exemplary embodiment may be automatically manage data handling functions for user-customized portfolio over a lifecycle of the customized portfolio(s). This may be accomplished, for example, by connecting to any number of external system(s), and automatically initiating certain processes and routines such as (without limit): portfolio renewal, portfolio rollover, portfolio funding and formalization, portfolio event scheduling, settlement generation, one or more daily/end-of-day processes, portfolio status and/or performance reporting (e.g., at a global portfolio level, at an underlying product level, etc.), portfolio statements and/or other suitable processes/routines (e.g., maturity ladders, cash flow projections, etc.). The system, according to the present disclosure may automate lifecycle processes and routines such as (without limit): automatic formulation (e.g., funding) routines, generating and transmitting details of data structures for structure classification, generating accounting entries, creating and submitting regulatory/fiscal reporting data, creating analytics reporting information and data storage, auto-scheduling of event planning, auto-scheduling of renewals/rollovers, auto-scheduling of settlement operations and other transactions.

Referring now to FIG. 1, a functional block diagram of an example data structure management system 100 for creating, customizing and managing user-customized portfolios comprising one or more products (e.g., a type of data structure) according to the present disclosure is shown. System 100 may include at least one customized portfolio management (CPM) server 102, one or more entity systems 104-1, . . . , 104-M (designated generally as entity system(s) 104, where M is greater than or equal to 1) and one or more user devices 106-1, . . . , 106-N (designated generally as user device(s) 106, where N is greater than or equal to 1, and where M may or not be equal to N). Although not shown, CPM server 102, entity system(s) 104 and user device(s) 106 may be communicatively coupled via one or more communication (e.g., wired and/or wireless) networks. The one or more networks may include, for example, a private network (e.g., a local area network (LAN), a wide area network (WAN), intranet, etc.) and/or a public network (e.g., the Internet).

In summary, CPM server(s) 102 may be configured to communicate with entity system(s) 104 and define and/or receive one or more baseline products 124 and/or one or more baseline portfolio(s) 126 from among entity system(s) 104. CPM server 102 may also be configured to communicate with user device(s) 106 via customized portfolio builder 116 (an example of an interactive graphical user interface (GUI)) of CPM website 114, in order to create one or more user-customized portfolios 128. As described further below, user-customized portfolio(s) 128 may be created based on one or more of baseline product(s) 124. In some embodiments, baseline product(s) 124 and/or baseline portfolio(s) 126 may themselves be created by the CPM server 102 based on input/data from entity system(s) 104, user device(s) 106, or from external data sources (not pictured). CPM server 102 may further be configured to manage user-customized portfolio(s) 128 over their entire lifecycle (via automated lifecycle processing engine 120), and may communicate any processing action(s) 132 to a corresponding entity system among entity system(s) 104. Processing action(s) 132 may include any processing actions for execution by one or more of entity system(s) 104 (e.g., updating records, additional processing, updates to baseline product(s) 124, baseline portfolio(s) 126, etc.) based on any events associated with the lifecycle of user-customized portfolio(s) 128.

The entity system(s) 104 may comprise a server computer, a desktop computer, a laptop or any other computing device configured to capture, receive, store and/or disseminate any suitable data associated with baseline product(s) 124 and/or baseline portfolio(s) 126. In some examples, entity system(s) 104 may include a computing device configured to employ an internet browser for secured connections via a wired and/or wireless communications network to centrally hosted and managed CPM server(s) 102. In one non-limiting example, one or more of entity system(s) 104 may include sources of electronic financial data (e.g., banking rates, interest rates, live market data, etc.). In some examples, entity system(s) 104 may include a single entity system (e.g., entity system 104-1) and CPM server(s) 102 may be configured for in-house deployment including for physical and/or virtual machine configurations. In some examples, entity system(s) 104 may include one entity system (e.g., entity system 104-1) configured as a cloud computing environment, including, in some examples, as Infrastructure as a Service (IAAS) and/or Platform as a Service (PaaS) cloud services. In some examples, entity system(s) 104 may include multiple (e.g. M>1) entity systems, configured as a multi-entity platform deployment. The multi-entity platform may include IaaS and/or PaaS configurations. A multi-entity platform may optionally use a suite of programmed tools (such as Microsoft Azure®) to provide a completely automated and elastic scripted deployment of both hardware and application software.

User device(s) 106 may comprise a server computer, a desktop computer, a laptop, a smartphone, tablet, or any other computing device known in the art configured to capture, receive, store and/or disseminate any suitable data. User device(s) 106 may include a display device, a user interface and a communication interface (e.g., a web browser) for communication with CPM website 114. The user interface and the display may be one component (e.g., a touchscreen display), may be separate components (e.g., a display and a pointing device) and or any combination thereof. In some examples, user device(s) 106 may include in-house terminal located within entity system(s) 104. In some examples, user device(s) 106 may include remote devices not associated with entity system(s) 104 (e.g., a user's smartphone).

In some non-limiting examples, baseline product(s) 124 may comprise financial products including liquid time deposit products. In some non-limiting examples, each financial product 124 may comprise an interest rate curve (combinations of data variables such as available tenors and interest rates). Table 1 illustrates an example of interest rate curves that may be distributed by entity system(s) 104. One or more of entity system(s) 104 may be configured to create multiple versions of the data series, which may be used for configuring differentiated product offerings based on, without being limited to, delivery channel (e.g., physical channels such as a financial entity branch location vs. online channels), a user demographic profile, and/or a geographical location of the user. In some examples, entity system(s) 104 may be configured with a specialized system functionality for the transfer of baseline product(s) 124 (and in some examples baseline portfolio(s) 126) (e.g., the input, import and/or export of data series comprising baseline product(s) 124) between entity system(s) 104 and CPM server(s) 102.

TABLE 1

Example of Baseline Products

| Tenor (months) | Interest Rate Entity 1 Curve 1 | Interest Rate Entity 1 Curve 2 | Interest Rate Entity 2 Curve 1 | . . . | Interest Rate Entity x Curve n |
|---|---|---|---|---|---|
| 1 | N.A. | N.A. | 0.05% | . . . | N.A. |
| 2 | N.A. | N.A. | 0.05% | . . . | N.A. |
| 3 | N.A. | N.A. | 0.08% | . . . | 0.50% |
| 6 | 0.65% | 0.60% | 0.36% | . . . | 0.75% |
| 9 | N.A. | N.A. | 0.50% | . . . | 1.00% |
| 12 | 1.40% | 1.35% | 0.70% | . . . | 1.35% |
| 18 | 1.40% | 1.35% | 0.85% | . . . | 1.45% |
| 24 | 1.40% | 1.35% | 0.91% | . . . | 1.35% |
| 30 | N.A. | N.A. | 1.05% | . . . | N.A. |
| 36 | 1.40% | 1.35% | 1.15% | . . . | 1.45% |
| 48 | 1.40% | 1.40% | 1.20% | . . . | 1.35% |
| . . . | . . . | . . . | . . . | . . . | . . . |
| 60 | 1.40% | 1.40% | 1.65% | . . . | 1.50% |

Baseline product(s) 124 and/or baseline portfolio(s) 126 may be distributed to CPM server(s) 102 as an electronic catalog. In some examples, the electronic catalog may include a suite of data/information that may be utilized by CPM server(s) 102 for the management and control of product/portfolio offerings, as well as a further suite of data/information and materials that may be used by customized portfolio builder 116 for the dynamic presentation of baseline portfolio(s) 126 of baseline product(s) 124 to user device(s) 106 and entity system(s) 104. In some examples, the management/control of product/portfolio data/information may include, without being limited to, product, term, rate, frequency, active state (active/not active), applicable distribution channel, user-entity system relationship and/or user demographic(s). The presentation information may include, without being limited to, static product/portfolio concept documentation, dynamic documentation for user-specified customized product(s)/portfolio(s), terms and conditions and/or disclosure information.

Users may access a baseline product/baseline portfolio catalogue. The access may include remote access with user device(s) 106, via a wired or wireless communication network (e.g. the Internet, telecommunications network, etc.), on-site at one or more of entity system(s) 104 (e.g., a financial institution or broker), and/or via any other appropriate means or channels. In one example, a user may access baseline product(s) 124 and/or baseline portfolio(s) 126 remotely via user device(s) 106 (e.g., a personal computer, a mobile telephone, or any other mobile communications device). In another example, the user may enter entity system 104-1 and access a baseline product and/or a baseline portfolio catalogue via an onsite computing device having a display screen and means for interacting with the computer device.

It may be appreciated that the techniques described herein for creating and managing user-customized portfolio(s) of data structures may be applied to data classes associated with other technical fields aside from electronic or financial products, such as, without being limited to, cancer research, seismic activity analysis, climate modeling, traffic modeling, etc. Thus, although CPM server(s) 102 is described in some examples below with respect to data classes associated with financial data, CPM server(s) 102 may be used with any electronic data classes associated with any type of electronic data, including those having a fixed set of data structures. Examples of such data classes where user-customization may be desired may include, for example, healthcare treatment scheduling, traffic light patterns, and any other class of data where automated life-cycle management on a large scale of customized data structures is required.

CPM server(s) 102 may include middleware engine 108, security system 110, one or more centralized database structures 112, CPM website 114 including customized portfolio builder 116, allocation engine 118 and automated lifecycle processing engine 120. Optionally, CPM website may include baseline product builder 122. One or more of components 108-122 may communicate with each other via a data and control bus (not shown). In some examples, CPM server(s) 102 may be configured to operate with multiple types of entity system deployment models with complete elastic scalability and business continuity configurations, and may provide optimized recovery point objective (RPO) and recovery time objective (RTO) in the case of a loss off key infrastructure and/or roll-over to a secondary site/region.

Entity system(s) 104 may be configured to communicate with CPM server(s) 102 via one or more data feed interfaces to CPM website 114. The data feed interface(s) may be specially configured as real-time connection(s). Thus, in operation, baseline product(s) 124 and/or baseline portfolio(s) may be distributed to CPM server(s) 102 from among entity system(s) 104 via the real-time data feed interface(s).

Each data feed interface may include security protection (e.g., encryption) associated with a corresponding entity system (e.g., entity system 104-1). In some examples, different entity system(s) 104 may include different data transfer formats. For instance, data feeds may be configured in one or more formats including, without being limited to, RSS (e.g., RDF Site Summary, Rich Site Summary, Really Simple Syndication), Atom, Resource Description Framework (RDF), comma-separated values (CSV), JavaScript Object Notation (JSON) and Extensible Markup Language (XML). In some examples, different entity systems(s) 104 may transmit the data with various unique, non-standard values and/or data formats (e.g., proprietary formats). Furthermore, data content may correspond to different forms of data, such as different currencies, date formats, time periods, etc.

Middleware engine 108 may be configured to communicate with the various data feed interfaces via CPM website 114, and may at least one of reformat the received data (representing baseline product(s) 124 and/or baseline portfolio(s) 126) to a common format and/or normalize the data from among the data feeds, thereby forming unified data. Middleware engine 108 may include a parameterized middleware engine that may allow for the creation of completely automated data feed interfaces to and from entity system(s) 104 with a suitable type of automated data reformatting, and data value translation (e.g., normalization). Middleware engine 108 may further be configured to perform the reformatting and normalization without impacting core processing on CPM sever(s) 102 that of entity system(s) 104.

Security management system 110 may include one or more encryption and decryption keys and may be configured to provide data security protection of data received via the data feed interfaces. The encryption/decryption keys may include independent keys associated with respective entity system(s) 104. In some examples, the encryption/decryption keys may include independent encryption/decryption keys by institution for the case of multi-tenant deployments. Security management system 110 may be configured to provide automated encryption of all sensitive data stored in CPM server(s) 102, for example, the data stored in centralized database structure(s) 112, including independent encryption keys by institution for the case of multi-tenant deployments. In some examples, security management system 110 may operate synchronous with middleware engine 108 to decrypt received data from the data feed interface(s), permit middleware engine 108 to perform the reformatting/normalization operations and then encrypt the now unified data from middleware engine 108. Security management system 110 may provide secure and unified data to centralize database structure(s) 112.

Centralized database structure(s) 112 may be configured to store baseline product(s) 124 and/or baseline portfolio(s) 126 (e.g., after unification and/or encryption), user-customized product(s), user-customized portfolio(s) 128, processing action(s) 132, entity system information (e.g., data security, data format, normalization, any network identifiers, geolocation(s), etc.), and user information (e.g., personal, account, network identifier(s), geolocation(s), etc.). Centralized database structure(s) 112 may be configured to store any suitable information associated with entity system(s) 104, baseline product(s) 124, baseline portfolio(s) 126, user device(s) 106 and user-customized portfolio(s) 128 that may be useful for middleware engine 108, security management system 110, CPM website 114, customized portfolio builder 116, allocation engine 118, automated lifecycle processing engine 120 and optional baseline product builder 122.

In some implementations, centralized database structure(s) 112 may include a number of complex database structures that are capable of transparently supporting multiple instances of a Structured Query Language (SQL) server. Each structure may be configured to support multiple databases, where each database may be configured to support multiple financial institutions in a multi-tenant deployment.

In order implement a multi-tenant deployment, it may be desirable for the data of each entity system 104, associated users, user accounts and user portfolios to be completely segregated in a secure manner, and that each entity system 104 may only access their own data. Accordingly, CPM server(s) 102 may utilize a number of data access security mechanisms, in addition to applying data encryption that may employ, for example, individualized encryption keys and strings for each entity system 104.

In a non-limiting example, centralized database structure(s) 112 may include entity system details tables, entity system-specific dynamic documentation tables (e.g., for provision of entity system-specific documents for users, account information, account opening, account opening forms, disclosures, brochures, etc.), baseline product/portfolio definition tables (e.g., definition of product characteristics and management of product behavior), entity system product and/or campaign definitions (e.g., for definition and management of product offerings including control of distribution channels, user demographics, product/portfolio builder (PB) tools, and offering availability status), etc. Offering availability status may allow entity system(s) 104 to dynamically adjust on a real-time basis which product/rate/term/frequency combinations to make available (or not to make available), to users and/or channels. Centralized database structure(s) 112 may further include one or more tables related to entity system-specific product parameters, such as rate-terms, frequency, early withdrawal conditions; and user tables related to user details, accounts, account simulations, account documentation, account planned liquidity schedules, tax information such as taxpayer identification number (TIN) certification and/or backup withholding (BUW) status, for example. In some examples, centralized database structure(s) 112 may include one or more tables related to entity system-specific general ledger (GL) account mapping and GL account entries such as for asset/liability accounting, income/expense accounting and regulatory reporting, for example. In some examples, centralized database structure(s) 112 may include one or more tables related to entity system-specific interface definition parameter tables including, without being limited to, data reformatting, data translation, data encoding, data handling and delivery mechanisms. In some examples, centralized database structure(s) 112 may include one or more tables related to settlement information including, without being limited to, funding, interest payments, liquidity payments and maturity payments.

CPM server(s) 102 may distribute an electronic baseline product and/or baseline portfolio catalog to one or more among entity system(s) 104 (and/or one or more sub-entities within a particular entity system such as within entity system 104-1) via the real-time (data feed) connection(s) to CPM website 114. The electronic catalog may be distributed based on data registered in centralized database structure(s) 112, such that CPM website 114 (via middleware engine 108 and security management system 110) may provide secure encrypted data to one or more of entity system(s) 104. In a non-limiting example, entity system(s) 104 may access one or more electronic baseline product/portfolio catalogs held in CPM server(s) 102 and may obtain and utilize details from the catalog(s) via CPM server(s) 102, and where all processing and calculations may occur within CPM server(s) 102. At the same time or alternatively, entity system(s) 104 may elect to pull a distributed copy of at least one electronic baseline product/portfolio catalog via a suite of application programming interfaces (APIs) that may be made available by CPM server(s) 102, including, in some examples, additional APIs for the performance of processing operations (e.g., calculations).

Configuration(s) of baseline product(s) 124 and/or baseline portfolio(s) 126 (e.g., in an electronic catalog), together with the introduction and activation (or deactivation) of data series comprising rate/term combinations may be performed in real-time by a respective entity system (e.g., entity system 104-1) via a secure connection to CPM website 114. Any changes applied by a particular one of entity system(s) 104 may be effective immediately in real-time (via the data feed interface). Because the data and electronic catalog configuration details may be maintained on a real-time basis by entity system(s) 104 via secure CPM website 114, data is immediately available to CPM server(s) 102 where the same data is securely stored in centralized database structure(s) 112.

CPM website 114 may be configured to present one or more interactive webpages on user device(s) 106 for the presentation of baseline portfolio(s) 126 of one or more baseline product(s) 120 and for the creation of user-customized portfolio(s) 128 via user input 130. The content of the interactive webpages may be generated by customized portfolio builder 116. In some examples, customized portfolio builder 116 may provide a web interface (e.g., CPM website 114) that may be branded for each specific entity system 104. In some examples, the content of CPM website 114 itself (e.g., in terms of portfolio offerings and product attributes) may be dynamically generated without the need for programming intervention by technology staff. Examples of CPM website 114 with customized portfolio builder 116 are described further below with respect to FIGS. 7A-7E.

Customized portfolio builder 116 may be configured to create one or more webpages on CPM website 114 that provides user-customization of baseline portfolio(s) 126 comprising one or more baseline product(s) 124, where the customization can be performed in real-time (through portfolio builder or "PB" tool(s) 206, described further below). Customized portfolio builder 116 generates a real-time interactive GUI that allows users (via user device(s) 106) to introduce user input 130, including multiple adjustments to one or more baseline portfolio(s) 126 (e.g., of baseline product(s) 124 from a baseline product catalog configured by entity system(s) 104). As customized portfolio builder 116 receives user input 130 indicating adjustment(s) to baseline portfolio(s) 126, customized portfolio builder 116 dynamically refreshes other portfolio characteristics presented on CPM website 114 that details the impact/effect of the user-defined adjustments. In some examples, changes to the portfolio characteristics may automatically and dynamically be illustrated both numerically (e.g., in terms of yield and accumulated interest), as well as graphically. Because changes to the portfolio characteristics are shown as the user adjustments are made, users may observe the impact of the adjustments in real-time. In some examples, customized portfolio builder 116 may receive user input 130 defining a desired portfolio strategy (e.g., maximum strategy maturity, total deposit amount to invest, one or more interim maturities (e.g., frequency, amount(s)), any renewal or rollover strategy, etc.) for a particular baseline portfolio, and in response, customized portfolio builder 116 may dynamically display details of the impact and effect of the programmed desired portfolio strategy on underlying portfolio parameters (e.g., yield, total interest amount to be received by the user dependent upon interim maturities, maximum strategy maturity, renewal or rollover strategy, schedule of time deposit maturities, etc.). In some examples, customized portfolio builder 116 may prompt user device(s) 106 to provide additional information regarding the desired portfolio strategy (e.g., Federal Deposit Insurance Corporation (FDIC) insurance information, yield, exclusion(s), etc.).

Customized portfolio builder 116 may further be configured to utilize baseline product configuration parameters and/or underlying portfolio parameters that have been defined by entity system(s) 104. Based on the baseline product/underlying portfolio configuration parameters, customized portfolio builder 116 may be configured to control the features and degree to which a user may configure baseline portfolio(s) 126. Customized portfolio builder 116 may be configured to perform these controls and determinations on a real-time basis, and does not need to be reprogrammed for different entity system(s) 104, different baseline product/baseline portfolio catalogs and/or different parameterizations. In some examples, customized portfolio builder 116 may create user-customized portfolio(s) 128 by selecting and/or combining one or more baseline products 124 that have been configured by and/or made available by one or more among entity system(s) 104. Optionally, one or more of the products included in the user-customized portfolio(s) 128 may be user-customized products (e.g., baseline products that have been customized according to user-input via, for example, an optional baseline product builder 122, as discussed further below). In any event, the products selected/included in the user-customized portfolio(s) 128 (e.g., entity configured product(s), user-customized product(s), a combination thereof, etc.) may be so selected or configured to achieve a particular portfolio strategy, as discussed above.

CPM server(s) 102 may include optional baseline product builder 122. Optional baseline product builder 122 may be configured to create one or more webpages on CPM website 114 that provides user-customization of one or more baseline product(s) 124, where the customization can be performed in real-time (e.g., through product builder tools similar to "PB" tool(s) 206). In some examples, optional baseline product builder 122 may allow users to customize baseline product(s) 124 that will ultimately end up in their customized portfolio(s). The customized products may be provided to customized portfolio builder 116, to allow users to create user-customized portfolio(s) with user-customized products. In some examples, baseline product customization functions (performed by optional baseline product builder 122) may be performed by customized portfolio builder 116.

Optional baseline product builder 122 may be configured to generate a real-time interactive GUI that allows users (via user device(s) 106) to introduce user input 130, including multiple adjustments to one or more baseline product(s) 124 (e.g., from a baseline product catalog configured by entity system(s) 104). Similar to customized portfolio builder 116, as baseline product builder 122 receives user input 130 indicating adjustment(s) to baseline product(s) 124, baseline product builder 122 may dynamically refresh other product characteristics presented on CPM website 114 that details the impact/effect of the user-defined adjustments. For instance, changes to the product characteristics may automatically and dynamically be illustrated both numerically (e.g., in terms of annual percentage yield (APY) and interest amount), as well as graphically. Because changes to the product characteristics are shown as the user adjustments are made, users may observe the impact of the adjustments in real-time. Optional baseline product builder 122 may receive input defining one or more customized programmed liquidity events for a particular product, and in response, baseline product builder 122 may dynamically display details of the impact and effect of the programmed liquidity events on product parameters.

Optional baseline product builder 122 may further be configured to utilize baseline product configuration parameters that have been defined by entity system(s) 104. Based on the baseline product configuration parameters, optional baseline product builder 122 may be configured to control the features and degree to which a user may configure baseline product(s) 124. Optional product builder 122 may be configured to perform these controls and determinations on a real-time basis, and may not need to be reprogrammed for different entity system(s) 104, different baseline product catalogs and/or different parameterizations.

Allocation engine 118 may be configured to receive a desired portfolio strategy for a particular user-customized portfolio 128 from customized portfolio builder 116. Allocation engine 118 may be configured to automatically determine and assign one or more optimal products from among baseline product(s) 124 among one or more of entity system(s) 104. In some examples, allocation engine 118 may determine, a combination of one or more products that most closely matches the desired portfolio strategy. Allocation engine 118 may transmit the optimized allocation to customized portfolio builder 116, for presentation to user device(s) 106. Customized portfolio builder 116 may be configured to present the optimized allocation as part of a summary report reflecting the adjusted parameters associated with a particular user-customized portfolio 128.

Responsive to user input 130 indicating acceptance of the optimized allocation via customized portfolio builder 116, allocation engine 118 may be configured to issue the allocation-optimized-user-customized portfolio (also referred to herein as an optimized-customized portfolio). Alternatively, user input 130 may be received by customized portfolio builder 116, responsive to the presented optimized allocation, indicating election of one or more alternative products and/or one or more alternative entity system(s) 104 for the user-customized portfolio 128. Allocation engine 118 may be configured to issue an optimized-customized portfolio responsive to the alternative elections indicated by user input 130. In some examples, allocation engine 118 may further determine that the alternative election(s) (as selected by the user) may be unsuitable (e.g., may not match the desired portfolio strategy, may be unavailable for a particular entity system (e.g., entity system 104-1, etc.)). In this example, allocation engine 118 may cause customized portfolio builder 116 to prompt user device(s) 106 to input a different allocation and/or select the optimized allocation. As part of the issuance of the optimized-customized portfolio, allocation engine 118 may be configured to transmit the optimized-customized portfolio to automated lifecycle processing engine 120.

Automated lifecycle processing engine 120 may be configured to receive optimized-customized portfolio(s) and may automatically manage the treatment (i.e., processing) of optimized-customized portfolio(s) (including baseline portfolio(s) 126, baseline product(s) 124 and/or user-customized product(s)) over their lifecycle(s) and user accounts over their lifecycles. In summary, a lifecycle of a portfolio of product(s) or an account refers to the different stages (also referred to herein as events) that products of the portfolio/accounts may undergo, and identifies which stages (events) may be managed and controlled automatically by automated lifecycle processing engine 120.

In one non-limiting example, lifecycle stages of a portfolio of product(s) may include at least one of rate/term maintenance, rate/term maintenance approval, frequency maintenance, offering activation, offering suspension, renewal management and rollover management. In one non-limiting example, lifecycle stages of an account may include at least one of account simulation, requested status (pending not funded), formalized status (account funded), interest accrual, interest payments and settlements, planned liquidity payments, early redemption requests and settlements (including in some examples penalty fees), maturity settlements, automatic rollovers, taxation reporting, management information system (MIS) reporting and statement data production.

Automated lifecycle processing engine 120 may be configured to perform a daily processing of scheduled tasks for the management of accounts associated with one or more of entity system(s) 104. For example, automated lifecycle processing engine 120 may be configured to perform one or more calculations associated with the scheduled tasks (described further below), and may then automatically extract all of the requisite data used by core processing system(s) of a corresponding entity system(s) 104. Based on different data feed interface definitions configured in CPM server(s) 102, middleware engine 108 may be configured to apply any automated data reformatting and data conversion rules to the extracted data and may generate a suite of electronic files that may be automatically transmitted in an (optionally) encrypted format (via security management system 110), as processing action(s) 132, for internal processing by respective entity system(s) 104.

As discussed above, conventional technology does not allow for automated, creation of customizable portfolios of products (e.g., time deposits) on the fly that permit each user to define a personalized portfolio strategy. This is due, in part, to the significant operational challenges that conventional entity systems would face if they tried to manually manage and/or re-program such systems to offer this type of service with their current technology. Moreover, current technology and core systems are designed for the management and processing of high volume, static or homogeneous portfolios, products and accounts. They are not equipped to handle user-customized portfolios of products.

In some examples, CPM server(s) 102 may provide a completely service-based/application programming interface (API) architecture that enables existing entity system(s) 104 to leverage functionality across multiple delivery channels as well as optimize and significantly reduce integration effort and time to configure and manage user-customized portfolio(s) 128.

In some examples, system 100 may be configured to create user-customized portfolios (e.g., of time deposit products) in an systematically viable manner, and without significant restrictions placed on a minimum transaction value and/or a level of user-customization associated therewith. As a result, users of all sizes from individuals to large entity system users, can purchase and tailor the portfolios to their specific individual preferences and needs.

In an exemplary embodiment, system 100 may provide for dynamic real-time yield adjustment, maturities/amounts scheduling, automatic renewal of products (e.g., time deposits) in appropriate new maturities, and overall lifecycle management of user-customized portfolios. Importantly, this is in sharp contrast to existing, conventional systems and methods that are required to manually select and process such customized offerings on an individualized basis (i.e., one-by-one). System 100, on the other hand, provides for the automated pricing and lifecycle processing of any number of user-customized portfolios, having any number of permutations, simultaneously. As a result, entity system(s) 104 desiring to offer such products, whether at one sub-location or across multiple locations, or via any electronic distribution channel, may do so via system 100 in an efficient and viable manner.

In other examples, system 100 may allow users (via user device(s) 106) to create user-customized portfolios (e.g., customized time deposit portfolio) by providing user input 130 for a desired portfolio strategy (e.g., choosing a total amount to invest, maximum strategy maturity, interim maturities including adjustment of amounts allocated to each maturity, and a renewal/rollover strategy). Baseline product(s) 124 may include underlying base interest rate curves definitions created and made available by entity system(s) 104. System 102, via customized portfolio builder 116 may dynamically adjust characteristics of baseline portfolio(s) 126 of baseline product(s) 124 to the desired particular characteristics of each user's desired portfolio strategy (e.g., a desired fixed income strategy), including the application of a dynamic repricing of baseline portfolio 126.

Contrary to conventional technology, each user's personalized time deposit portfolio is not necessarily created or managed individually in system 100. Instead, system 100 provides for collective pricing and downstream management of any number of user-customized portfolios, having any number of permutations.

Because a time deposit portfolio that has been user-customized retains and continues to consume the same key components of interest rate curve, tenors and rates, across an unlimited number of user permutations and configurations, system 100 is able to automatically manage all downstream lifecycle processing without the need to undertake adjustments to the already existing system logic and code, thereby achieving the goal of operational efficiency. In some examples, the modules/components of system 100 may be configured to be product agnostic and, thus, able to interpret and process any product expressed and configured as a series of known, or contingent behavior (e.g., cash-flows). As such, no programming is required for the management of new products, or combinations of products in the construction of product portfolios, including the case of multiple entity systems 104 with variable user-defined renewal strategies.

Figure 2:
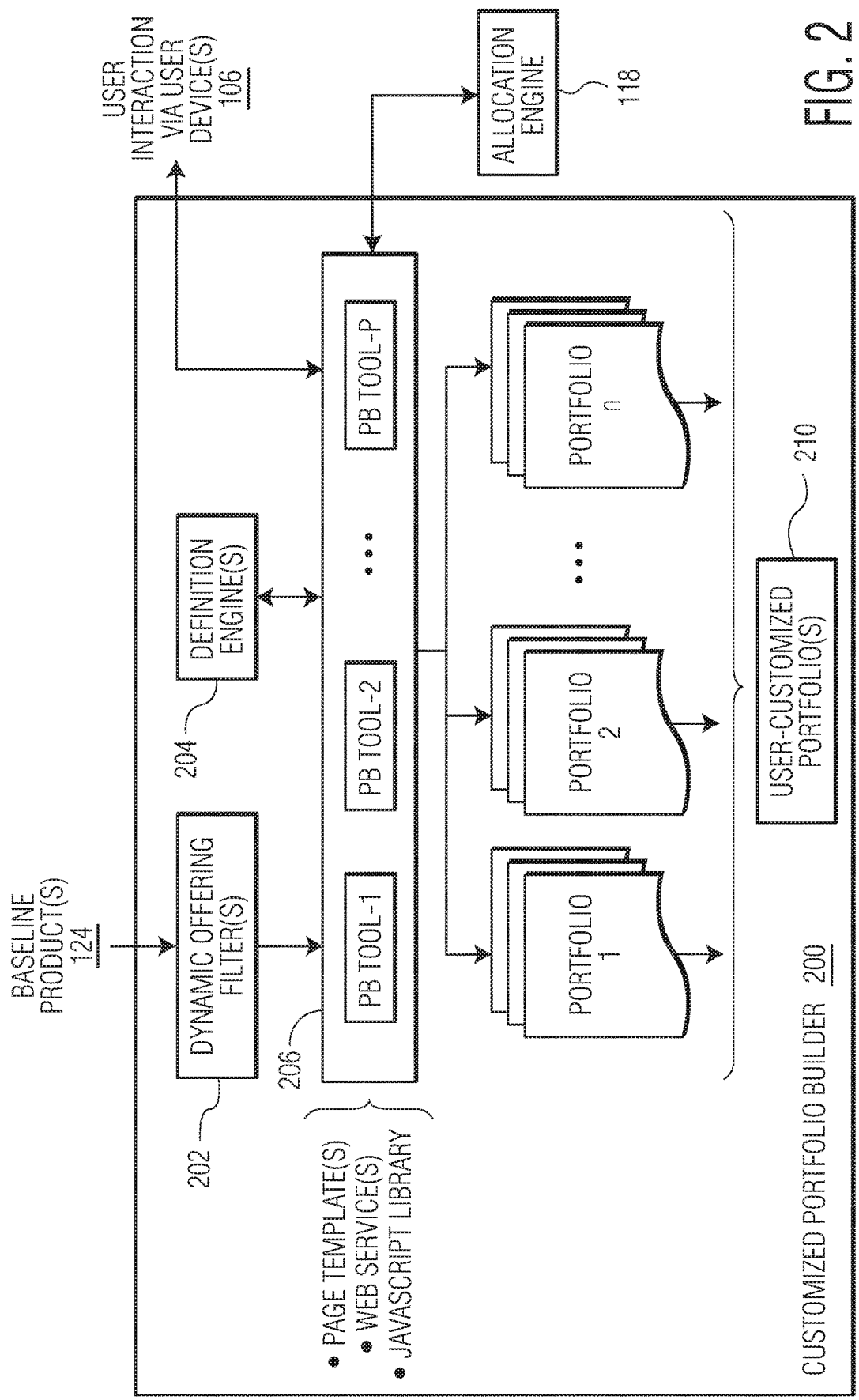
FIG. 2 is a functional block diagram of an example customized portfolio builder, according to an aspect of the present disclosure.

Referring now to FIG. 2, a functional block diagram is shown of an exemplary customized portfolio builder 200, according to an aspect of the present disclosure. Customized portfolio builder 200 may include, one or more dynamic offering filters 202, one or more definition engines 204, GUI interface 206 and one or more PB tools 206 (e.g., PB tool-1, . . . , PB tool P, where P is greater than or equal to 1). In some examples, customized portfolio builder 200 may provide support for multiple languages, including, in some examples, multi-languages within a single installation for different user preferences. In this manner, users may interact with customized portfolio builder 200 via one or more desired languages.

Dynamic offering filter(s) 202 may be configured to receive baseline product(s) 124 and/or baseline portfolio(s) 126 and may filter the presentation of certain product offerings to user device(s) 106, certain product characteristics (e.g., particular rate/term combinations), certain portfolio offerings and/or certain portfolio characteristics based on user preferences, user privileges, user location, system configuration, etc. Further, in the case of building portfolios of product(s), dynamic offering filter(s) 202 may identify appropriate products that may satisfy user input 130 (e.g., in terms of portfolio strategy and distribution). Dynamic offering filter(s) 202 may also be configured to match identified appropriate products to multiple entity systems (e.g., multiple issuers). The matching may take into consideration any user instructions regarding potential entity systems who should be excluded from any simulations and calculations for allocation as performed by allocation engine 118. In some examples, dynamic offering filter(s) 202 represent a software component of CPM server(s) 102. Dynamic offering filter(s) 202 may be completely transparent to the end user and/or may be used interactively by administrator(s) of entity system(s) 104.

In an example of interactive filtering by an administrator of entity system(s) 104, customized portfolio builder 200 may present the administrator (e.g., via an administrator system) with a series of questions and/or list of drop-down values regarding a user's demographic details and/or user's portfolio (or product) objectives. Dependent on the values elected by user (as input via the administrator), the list of available products, issuer and/or different issuers, and the associated combinations of product characteristics (e.g., rate/term) may be automatically filtered by dynamic offering filter(s) 202 to present only those products appropriate to the inputs provided. In one non-limiting embodiment, examples of filtering questions may include: "Is the primary objective for this portfolio of time deposits to maximize strategy yield?"; "Is the primary objective for this portfolio to match as close as possible the desired duration and convexity?"; "Is the primary objective for this portfolio to maximize FDIC-insurance?"; and "Of all available time deposit providers, are there any with which you do not wish to place funds?"

For an example of transparent filtering applied to end-user interaction, customized portfolio builder 200 may automatically identify the origin of the user request (e.g., an online channel of entity system(s) 104, a marketplace channel, etc.). When the user is already authenticated via a login system of the channel, dynamic offering filter(s) 202 may apply one or more dynamic filtering rules based on one or more of user characteristics (e.g., a legal address, an IP address of user device(s) 106, etc.), as well as any other rules or criteria that can be configured including (but not limited to) an existing relationship between the user and entity system(s) 104 (e.g., other contracted products, transaction volumes, etc.). Based on the different filtering rules, dynamic offering filter(s) 202 may automatically filter baseline product(s) 124 (and in some examples baseline portfolio(s) 126) to generate a list of available products/baseline portfolios, and associated combinations of characteristics and issuer(s). In this manner, customized portfolio builder 200 may present only those products/portfolios and characteristics on CPM website 114 that may be appropriate to the particular inputs, while taking into consideration any user-defined exclusions and portfolio strategy.

Definition engine(s) 204 may be configured as a parameterized engine that allows a non-technical user to create new products/portfolios in a computationally fast manner, without the need to undertake new programming. Definition engine(s) 204 may operate with PB tool(s) 206 to create new user-customized portfolio(s) 128. In a non-limiting example, definition engine(s) 204 may be configured to create new products or any product that can be expressed as a series of known or conditional cash-flows. Data input (e.g., from user input 130 via user device(s) 106) may be supported by one or more automatic data generation wizards.

Definition engine(s) 204 may include definition variables for the configuration of a new product. In some examples, the definition variables may include, without being limited to, at least one of general product description and details, calendar details (e.g., defining start and end date and/or term, events, guaranteed or contingent payment definitions expressed through a payout formula tool), market data parameters (e.g., option price, discount factors, etc.), product classification parameters (e.g., that may drive automated accounting engine 410 shown in FIG. 4), associated automatic and dynamic product documentation, and/or early withdrawal conditions.

Definition engine(s) 204 may be configured to control the product definition(s) and usage of PB tool(s) 206 for creating user-customized portfolio(s) 128. Definition engine(s) 204 may also be configured to control the definition(s) and usage of PB tool(s) 206 that allows a non-technical user to create new products in a computationally fast time with the associated product definitions that the user wishes to configure. In some examples, a product configuration wizard may allow a non-technical user to test PB tool(s) 206 and any product presentation before saving and publishing the user-customized product(s) 122. In some examples, definition engine(s) 204 may also be configured to control the definition(s) and usage of PB tool(s) 206 that allows a non-technical user to create new campaign offerings in a computationally fast time with the associated product definitions that the user wishes to configure. An example of creating products using multiple PB tool(s) 206 is further discussed below in connection with FIG. 10.

For purposes of this disclosure, a product is itself defined as a data structure comprising a combination of underlying components such as rate curve, tenor, interest rate, etc., as well as other user-customizable components. Once constructed and/or customized, such a product may be offered by certain types of entities to users for purchase. In a non-limiting example, a product may comprise a baseline banking product that may be customized and offered by a banking institution to a user for purchase. A campaign, on the other hand, generally relates to how, when and to whom a product or products may be offered to users. For example, a campaign may dictate that a particular product (or group of products) be offered for a certain period of time, or may be a permanent off-the shelf offering. Another consideration of a campaign may refer to the definition and control by entity system(s) 104 of: distribution channel(s) in which product(s) are made available, customer demographics to which product(s) may be offered, "web" front-end(s) to be used to offer product(s), etc. In some examples, different web PB tool(s) 206 may determine and control which parameters/characteristics may be customized, and the extent of such customization. In some examples, a single product could be associated with more than one campaign, with each campaign providing different controls, limitations, user experiences and features, etc.

When configuring an offering of a product and/or a portfolio of product(s), customized portfolio builder 200 may provide a user with the ability to associate the product to a particular campaign, and within the campaign define which PB tool 206 should be used. PB tool(s) 206 may provide a connection point between users and products of a portfolio. In some examples, any single product of a portfolio may be simultaneously distributed through multiple PB tools 206 (e.g., PB Tool-1, PB Tool-2, etc.). A product designer, for example, may define the type of users (e.g., sales force (such as retail bankers, licensed bankers, brokers), branches, customer segments) or channels that may access each campaign/PB tool(s) 206 and its related products. As a result, an entity (such as entity system(s) 104) may manage a single product, yet provide multiple experiences to its different types of users and distribution channels.

Campaign definition variables for the configuration and setup of a new campaign may include, without being limited to, at least one of general campaign details (e.g., availability dates, minimum amount(s) permitted, maximum amount(s) permitted, etc.), selection of a particular tool among PB tool(s) 206 to be used for presentation, selection of product(s) to be associated with the campaign, key description text to be presented to users and/or account administrators on CPM website 114, dynamic bullet text of key features to be highlighted to users and/or account administrators on CPM website 114, associated automatic and dynamic campaign documentation and/or distribution controls to determine which entity system(s) 104/channels may be permitted to offer the campaign to their users and/or account administrators.

In some examples, user-customized portfolio(s) 128 may be configured to include one or more baseline product(s) 124 (e.g., product(s) 124 that may be configured and/or managed by entity system(s) 140), one or more user-customized products (e.g., created via optional baseline product builder 122), and/or any combination thereof. In some examples, entity system(s) 104 may, via definition engine(s) 204, create additional and/or new products that can be incorporated into a user-customizable portfolio.

PB tool(s) 206 may be configured to support the distribution of any portfolio of products (and/or product, or combination of products), as an offering to users (and account administrators), complemented by the ability generate dynamic, personalized data/information/documentation to users on the fly. PB tool(s) 206 may be configured to perform user-customization of baseline portfolio(s) 126 of baseline product(s) 124 in real-time.

In operation, PB tool(s) 206 may provide a real-time interactive GUI that allows a user to introduce input to cause one or multiple parameter adjustments to a baseline portfolio(s) 126 of baseline product(s) 124 (e.g., from a baseline product catalog) that has been configured by entity system(s) 104 and/or created by server(s) 102. As the user inputs these adjustments (e.g., to underlying portfolio parameter(s)), PB tool(s) 206 may dynamically refresh the portfolio characteristics on CPM website 114, and automatically present details of the effect of the user's adjustments. In some examples, the impact of the user's adjustments may be presented numerically (e.g., in rollover and renewal interest amounts) and/or graphically. In some examples, PB tool(s) 206 may be configured such that a user may observe the impact on changes to portfolio characteristics, that may be input by the user into customized portfolio builder 200, all in real-time as the adjustments are entered.

PB tool(s) 206 may be configured to use underlying portfolio parameters (associated with baseline product(s) 124) that have been defined by entity system(s). Based on the underlying portfolio parameters, PB tool(s) 206 may be configured to control the features and degree to which a user (via CPM website 114) may configure baseline portfolio(s) 126. PB tool(s) 206 may be configured to perform the control of features/degree of configuration (and any calculations) on a real-time basis in such a manner that PB tool(s) 206 do not need to be reprogrammed for different entity system(s) 104, for different baseline portfolios, for different baseline product catalogs and/or for different parameterizations.

An aspect of PB tool(s) 206 includes allowing multiple user inputs to automatically drive the selection of underlying products across potentially multiple entity system(s) 104 and drive the presentation of a portfolio structure. Another aspect of PB tool(s) 206 may include its ability to adjust the automatic distribution to create different portfolio distribution strategies as well as different portfolio renewal strategies, etc. Another aspect of PB tool(s) 206 may include its ability to provide immediate, dynamic feedback and calculations through a GUI interface in order to inform the user of the expected yield of their chosen portfolio strategy and selections, including the ability to generate dynamic, personalized electronic documentation reflecting the same details.

PB tool(s) 206 may provide benefits including allowing users to dynamically and intuitively construct a portfolio of underlying products (e.g., time deposits), that may be from a single entity system or from multiple entity systems. In some examples, the ability to select from multiple providers of products (versus a single provider) may provide additional benefits to users. One benefit may include an ability to maximize yield. For example, not all entity systems offer the same rate by term and the same entity system does not always offer the best rate for every term. Another benefit may include an ability to maximize FDIC-insurance. For example, there may be a fixed limit (e.g., $250,000) by an entity system. If the total strategy amount is above that fixed limit, it may be necessary to divide a total investment between multiple entity systems for full FDIC-insurance. A further benefit may include enabling users to dynamically and intuitively adjust the selection of term deposits, issuers, renewal strategy and fund allocation characteristics and receive real-time calculations and feedback regarding the impact of their choices and inputs both through the GUI as well as dynamically generated personalized documentation.

PB tool(s) 206 may provide further benefits including enabling entity system(s) 104 to determine how a portfolio should be presented to users. Another aspect of PB tool(s) 206 may include its ability to enable users to dynamically and intuitively adjust characteristic(s) of baseline portfolio(s) 126 and receive real-time calculations and feedback regarding the impact of the choices and inputs. In some examples, the impact may be presented both through customized portfolio builder 200 as well as via dynamically generated personalized electronic documentation. Moreover, PB tool(s) 206 may be configured to be entity system agnostic. Accordingly, PB tool(s) 206 may be able to intelligently and dynamically provide an entity-system-specific user experience based on the underlying criteria and parameters defined by each entity system 104 without the need to undertake any reprogramming specific to each entity system 104. PB tool(s) 206 may enable users (e.g., clients, administrators) to dynamically personalize the characteristics of individual user accounts within a portfolio without impacting the underlying product structure or the components of CPM server(s) 102 that handle the lifecycle processing of the portfolio(s).

In some examples, PB tool(s) 206 may include one or more page templates, one or more web services and at least one JavaScript library. The page template(s) may include a suite of Model, View, Controller (MVC) baseline page templates that may control customized portfolio builder 200, where, dependent on data received via web services and JavaScript algorithms, the content/behavior/look and feel of PB tool(s) 206 may be dynamically adjusted for each user.

The web service(s) may include a suite of web services configured to access, in real-time, underlying product descriptions and attributes, campaign descriptions and attributes, available rate-term combinations, details of different product issuers, etc. that may be configured and maintained by each entity system 104. The data retrieved may be used by customized portfolio builder 200 to dynamically determine what selections users may make. In some examples, the retrieved data may also be used to determine the selection of variables and account attributes permitted by each entity system 104. The web service(s) may also include a suite of web services that may be utilized by customized portfolio builder 200 to provide dynamically generated personalized documentation for each user account simulation as well as to interact with the account opening flow for each user. Optionally, the web service(s) may retrieve details of one or more products defined and/or maintained by one or more among entity systems 104 through definition engine(s) 204.

The JavaScript library may be configured to contain a suite of algorithms that may be utilized by customized portfolio builder 200 to perform all real-time calculations and generation of any charts (or any other suitable graphically formatted results) that graphically represent the calculations, based on the entity system-specific data retrieved by the web services for the presentation of the data to users.

As discussed above, PB tool(s) 206 may be configured to perform automated generation of all personalized documentation for user-customized portfolio(s) 210. It may be appreciated that even though all the product components of a given portfolio may be part of a single strategy, each of the components is an individual product (e.g., time deposit) with possible different underlying characteristics (e.g., a term and/or an interest rate that may be different from all other deposit accounts) in the portfolio. Accordingly, it may be desirable to be able to automatically generate and present electronic documentation for each of the individual products in user-customized portfolio(s) 210, particularly for portfolio with a complex set of products (e.g., large number of products, large number of differing underlying product characteristics, etc.).

The concept of PB tool(s) 206 is powerful as it allows system administrators to define and control "How" a product and/or portfolio of product(s) should be presented to users (e.g., end-users or clients associated with particular entity system(s) 104). PB tool(s) 206 provide a connection point between users and underlying products. With customized portfolio builder 200, any portfolio of product(s) (or product) may be simultaneously generated via multiple PB tool(s) 206. PB tool(s) 206 enable entity system(s) 104 to provide associated users with multiple experiences with a single product. PB tool(s) 206 also allow entity system(s) 104 to provide associated users with dynamic, simultaneous products from multiple entity systems 104 for multiple terms.

The systems and methods discussed herein are specifically configured to generate user-customizable and user-customized portfolios (and in some example customizable/customized products) that feature simplicity, transparency and security. Data and details about a portfolio of product(s), particularly when the portfolio is being customized, may be configured to be presented to the user in a very clear and easy-to-understand manner—both through the dynamic GUI screen information (e.g. that may show a clear representation not only of a portfolio parameter, e.g., final maturity), but also what the presented data may mean to the user (e.g., impact of user-defined parameter adjustments, in actual monetary amounts). The information may be presented both graphically as well as numerically via customized portfolio builder 200, allowing for adjustments to the information which result in a clear (visual) representation of the impact of user-specified adjustments to the details of the portfolio(s) (e.g., a final maturity). This same information may be complemented by dynamic documentation that provides extended details, information and considerations for a portfolio.

In operation, when customized portfolio builder 200 receives an indication from user device(s) 106 that the creation of user-customized portfolio(s) 210 is complete (e.g., all of the desired adjustments and configurations of baseline portfolio(s) 126 have been made), user-customized portfolio(s) 210 may be submitted to allocation engine 118. Allocation engine 118 may determine an optimized allocation for user-customized portfolio(s) 210, and provide the optimized allocation to PB tool(s) 206 for presentation and approval. Once approval of the optimized allocation (or an alternative allocation) is received from user device(s) 106 via PB tool(s) 206, the approval may be transmitted to allocation engine 118, for issuing the portfolio.

Figure 3:
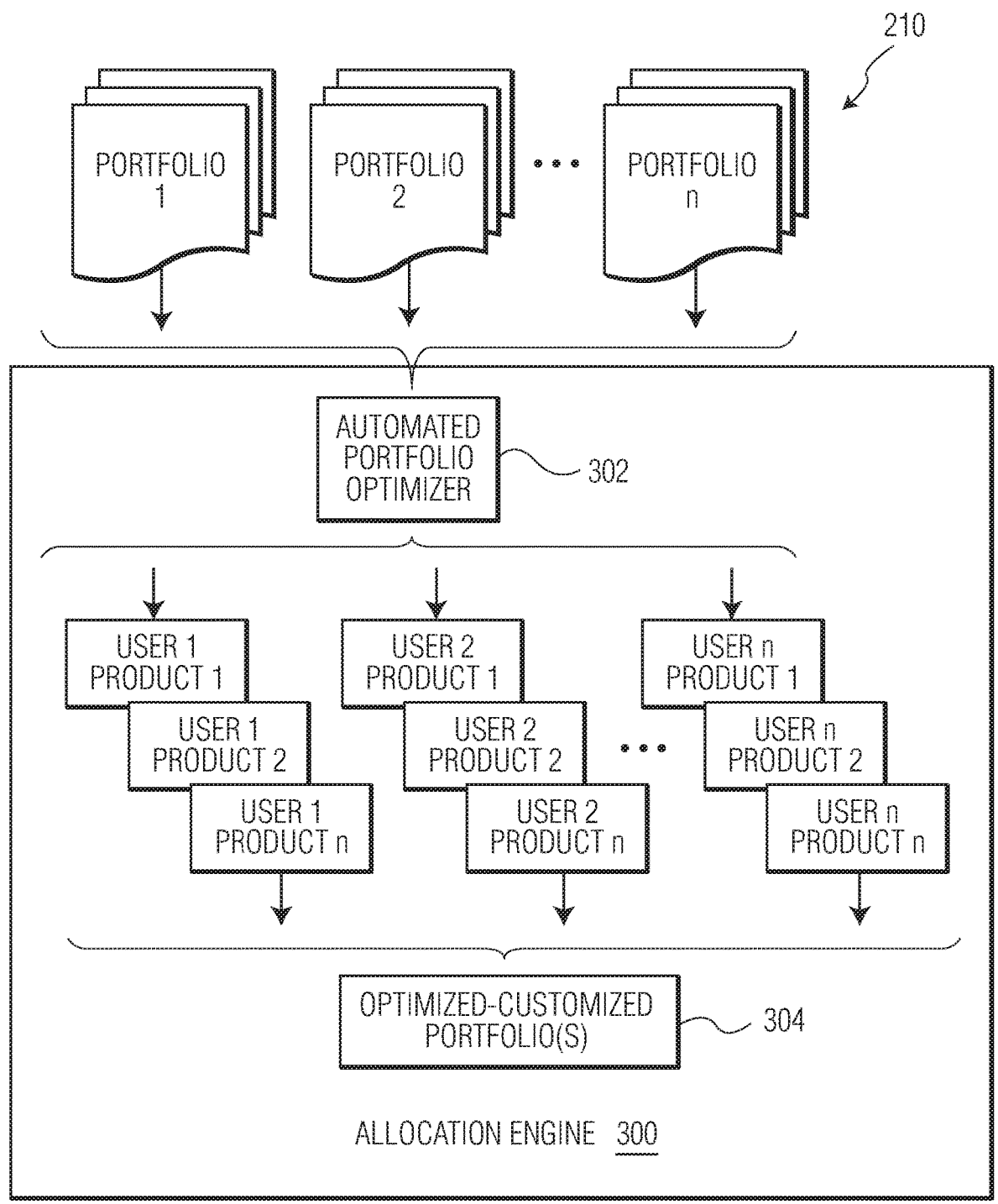
FIG. 3 is a functional block diagram of an example allocation engine, according to an aspect of the present disclosure.

Referring now to FIG. 3, a functional block diagram of example allocation engine 300 is shown. Allocation engine 300 may include automated portfolio optimizer 302 comprising one or more allocation optimization algorithms. Allocation engine 300 may receive information associated with user-customized portfolio(s) 210 from PB tool(s) 206. For example, the information may include basic strategy features (e.g., total portfolio amount, initial maximum term of the strategy, a liquidity structures of the strategy and any renewals strategy of the portfolio). In some examples, PB tool(s) 206 (either directly in response to the basic strategy features or as instructed by allocation engine 300) may prompt the user (via user device(s) 106) for additional portfolio information such as primary objective (e.g., FDIC insurance, yield, etc.), any exclusions, etc. Responsive to the portfolio features (e.g., the basic strategy features and/or the additional portfolio information) obtained by PB tool(s) 206, allocation engine 300 may provide the portfolio features to automated portfolio optimizer 302.

Automated portfolio optimizer 302 may be configured to optimize allocations across products and/or accounts via the allocation optimization algorithm(s). In some examples, automated portfolio optimizer 302 may be configured to determine a combination of product accounts (which may include across one or more of entity systems 104) that most closely matches the user desired portfolio strategy, defining an optimized allocation.

Automated portfolio optimizer 302 may be configured to identify criteria for selecting one or more data structures (e.g., baseline product(s) 124) that are eligible for creating a portfolio and that comply with a user-defined strategy (e.g., the user desired portfolio strategy). The criteria may pertain, for example, to selecting data structure(s) and/or to sources of the data structure(s) (e.g. entity system(s) 104). In some examples, the criteria may be pre-determined and may be stored in a logical database (e.g., centralized database structure(s) 112), such that selection of the user-defined strategy automatically identifies the criteria that may be implemented in order to select appropriate/eligible data structures. Automated portfolio optimizer 302 may be further configured to procure data structure(s) from among the one or more external data sources that comply with the (strategy-specific) criteria, and may rank the complying data structures according to one or more pre-defined ranking parameters. To determine the optimized allocation, automated portfolio optimizer 302 may be configured to match (e.g., pair) ranked data structures having the highest (e.g., most favorable) ranking parameters, while staying within a range of certain portfolio and/or strategy-specific limits.

In a non-limiting example, automated portfolio optimizer 302 may be configured to determine an optimal combination of time deposit product accounts (e.g., among entity system(s) 104) based on a user desired portfolio strategy (e.g., a desired total allocation amount, a desired strategy length, a desired liquidity frequency, a desired liquidity amount, etc.), which strategy may be captured as input through a series of questions presented through a GUI (e.g., customized portfolio builder 116 or 200). Automated portfolio optimizer 302 may identify additional criteria for selecting baseline product(s) 124 (e.g., an example of data structure(s)) for the allocation. The criteria may include, without being limited to, at least one of specific ad-hoc (e.g., non-recurring) liquidity parameter(s), recurring (e.g., regular) liquidity parameter(s), user demographic attributes, and/or any suitable criteria that can impact the determination of an optimal allocation (e.g., optimal interest rate) across entity system(s) 104 given potential differential rates by jurisdiction (e.g., states, countries, etc.), distribution channels, etc. In some examples, the allocation may be optimized for interest rate and FDIC insurance, subject to any restrictions (e.g., staying within a range of) the user desired portfolio strategy (e.g., total allocation amount, strategy length, liquidity frequency and/or liquidity amount). In determining eligible entity systems among entity system(s) 104, automated portfolio optimizer 302 may provide a GUI (e.g., customized portfolio builder 116) for receiving user input indicating any entity system exclusions. For example, not all contributing entity system(s) 104 (e.g. banks) may be eligible for a variety of reasons, such as FDIC insurance limits, reputational risk, etc.

Based on the user desired portfolio strategy, the criteria, and/or any exclusions, automated portfolio optimizer 302 may identify all time deposit products offered by eligible entity system(s) 104, rank the identified products by interest rate for each term (e.g., from highest to lowest) and match the outflows to a highest paying term deposit for an equivalent or nearest equivalent outflow term without substantially exceeding any FDIC insurance limits. Optionally, if the user is satisfied with the portfolio allocation determined by automated portfolio optimizer 302, a single account opening flow may be invoked for all allocated time deposits products at all corresponding entity system(s) 104.

Automated portfolio optimizer 302 may provide the optimized allocation to PB tool(s) 206. PB tool(s) 206 may present the optimized allocation to user device(s) 106, for user confirmation of the allocation. Responsive to user confirmation, as received by PB tool(s) 206, allocation engine 300 may issue optimized-customized portfolio(s) 304 (e.g., an automated optimal portfolio). Optimized-customized portfolio(s) 304 may include user-customized portfolio(s) 310 having the optimized allocation of products/accounts as determined by automated portfolio optimizer 302. In some examples, optimized-customized portfolio(s) 304 may include an alternative allocation based on user input 130 to PB tool(s) 206. Allocation engine 300 may transmit issued optimized-customized portfolio(s) 304 to automated lifecycle processing engine 120 (or 400). Additional information regarding aspects of portfolio allocation according to the present disclosure may be found below, with reference to FIGS. 8A-8L.

Figure 4:
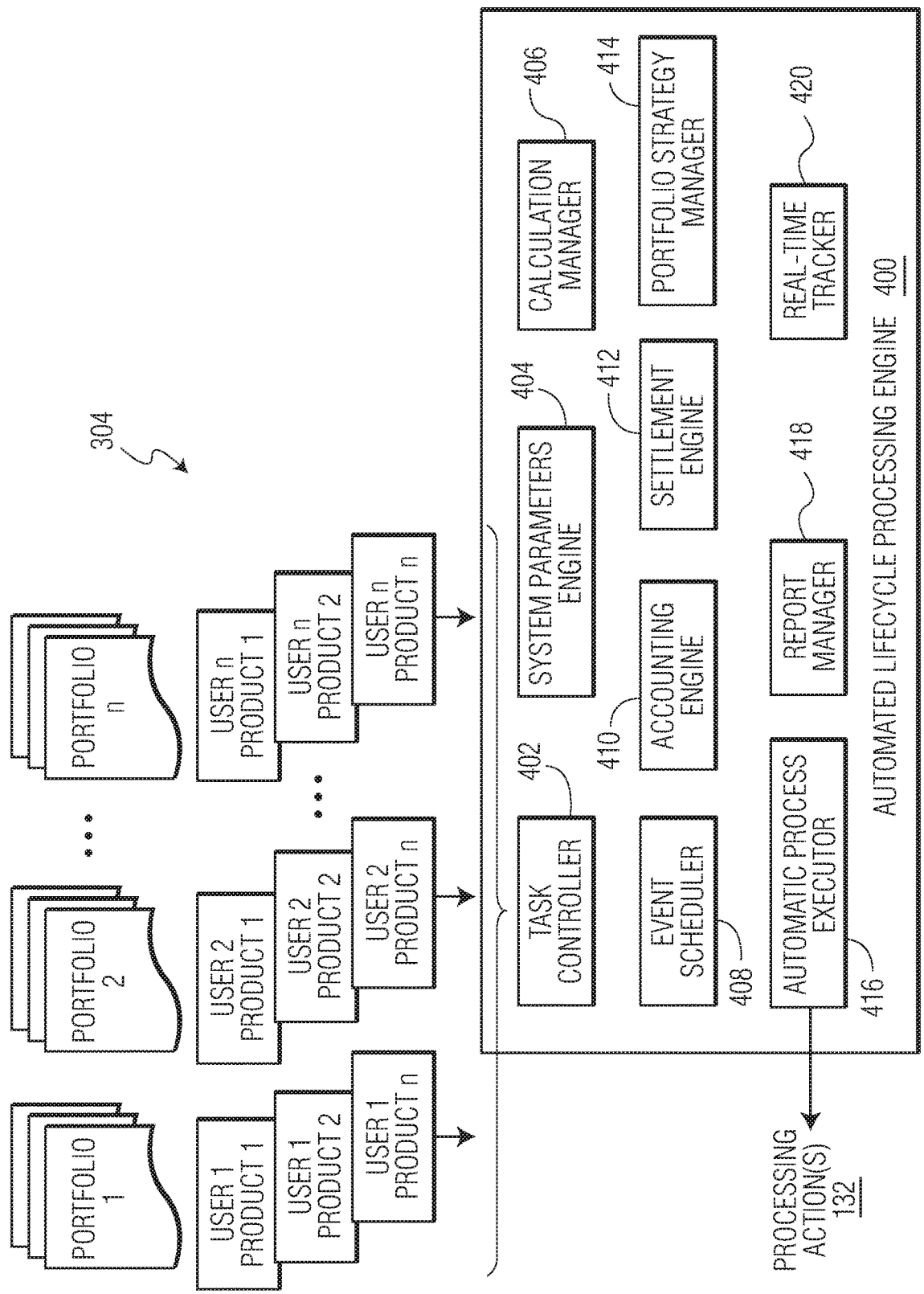
FIG. 4 is a functional block diagram of an example automated lifecycle processing engine, according to an aspect of the present disclosure.

Referring now to FIG. 4, a functional block diagram of example automated lifecycle processing engine 400 is shown. Automated lifecycle processing engine 400 may include task controller 402, system parameters engine 404, calculation manager 406, event scheduler 408, accounting engine 410, settlement engine 412, portfolio strategy manager 414, automatic process executor 416, report manger 518 and real-time tracker 420. In some examples, automated lifecycle processing engine 400 may further include one or more components for automatically generating governmental regulation(s) reporting data (e.g., tax reporting data). Components 402-420 may optionally include processing engines configured to interpret and understand any product, portfolio and account configured in CPM server(s) 102, and may manage lifecycle processing operations (e.g., calculation and generation of interest and principal payments, taxation reporting, early redemptions, renewals, redemptions, accounting and regulatory reporting, etc.).

Task controller 402 may be configured to receive optimized-customized portfolio(s) 304 (e.g., via allocation engine 300). Task controller 402 may manage the handling of optimized-customized portfolio(s) 304 for one or more lifecycle operations specifically associated with individual ones of optimized-customized portfolio(s) 304 (e.g., specific events, renewals, rollovers, reporting, settlements, funding, etc.). Task controller 402 may be configured to control one or more of system parameters engine 404, calculation manager 406, event scheduler 408, accounting engine 410, settlement engine 412, automatic portfolio strategy manager 414, automatic process executor 416, report manger 418 and real-time tracker 420 to perform various lifecycle operation tasks associated with optimized-customized portfolio(s) 304.

System parameters engine 404 may be configured to store one or more parameters and/or information that may be useful for task controller 402, system parameters engine 404, calculation manager 406, event scheduler 408, accounting engine 410, settlement engine 412, portfolio strategy manager 414, automatic process executor 416, report manger 418 and/or real-time tracker 420. For example, system parameters engine 404 may store parameter(s)/information for performing lifecycle operation(s) on optimized-customized portfolio(s) 304, rollover/renewal operations, portfolio strategy information, automated daily processing operations, data tracking operations and/or reporting operations. In some examples, the system parameters may be configured and maintained in an independent manner by each entity system 104, such that the behavior and automated lifecycle treatment may automatically vary from one entity system (e.g., entity system 104-1) to another (e.g., entity system 104-2), without the need for intervention by a programming administrator.

Calculation manager 406 may be configured to store one or more formulas and/or algorithms that may be useful for task controller 402, system parameters engine 404, calculation manager 406, event scheduler 408, accounting engine 410, settlement engine 412, portfolio strategy manager 414, automatic process executor 416, report manger 418 and/or real-time tracker 420. For example, calculation manager 406 may store formula(s) and/or algorithm(s) that may be used for performing lifecycle operation(s) on optimized-customized portfolio(s) 304, automated daily processing operations, data tracking operations and/or reporting operations.

Event scheduler 408 may be configured to identify one or more events associated with optimized-customized portfolio(s) 304. Event scheduler 408 may automatically schedule (e.g., by communicating with one or more external systems) the identified event(s) over the lifecycle of each optimized-customized portfolio(s) 304. Task controller 402 may be configured to use the scheduled events to control operation of one or more of accounting engine 410, settlement engine 412, portfolio strategy manager 414, automatic process executor 416, report manager 418 and real-time tracker 420. In one non-limiting example, the events may include user-specific liquidity events (e.g., where products of optimized-customized portfolio(s) 304 may include one or more liquid time deposits). In another non-limiting example, the events may include one or more maturity events Accounting engine 410 may include a parameterized engine and may be configured to perform fully automated generation of all accounting events and entries associated with optimized-customized portfolio(s) 304. In some examples, accounting engine 410 may be configured to perform and/or initiate (e.g., by communicating with one or more external systems) automated funding and formalization of products of optimized-customized portfolio(s) 304. In some examples, accounting engine 410 may be configured to automatically generate any suitable regulatory reporting data (e.g., call report data) together with the associated accounting events/entries. Accounting engine 410 may further be configured to perform automated opening of all of the underlying portfolio component accounts of optimized-customized portfolio(s) 304. In a given portfolio, there may potentially be multiple products provided by potentially multiple entity system 104. Accounting engine 410 may also be configured to perform a single account opening process flow that in turn simultaneously opens all the component accounts of portfolio 304 at all associated entity systems 104. In some examples, accounting engine 410 may be configured to interface with a common account opening application and open all product accounts associated with portfolio 304 in each respective ones of entity system(s) 104. In some examples, accounting engine 410 may be configured to perform automated capture of total strategy amount funds and distribution of the total amount among all entity system(s) 104 that are part of optimized-customized portfolio(s) 304.

Settlement engine 412 may be configured to perform fully automated processing of all settlements associated with products of optimized-customized portfolio(s) 304 over the portfolio's lifecycle. For example, settlement engine 412 may initiate and perform settlement processing (directly, and/or via one or more external systems) from an initial funding of products of optimized-customized portfolio(s) 304 through to a final maturity of optimized-customized portfolio(s) 304. Processing operations of settlement engine 412 may include, in some examples, interest management, backup withholding processing, early withdrawals and/or processing of scheduled liquidity and/or maturities events.

Portfolio strategy manager 414 may be configured to perform automated management of a user-customized portfolio strategy of optimized-customized portfolio(s) 304, via user-customized renewals and/or rollovers. In one example, portfolio strategy manager 414 may automatically perform a renewal or rollover of one or more products of optimized-customized portfolio(s) 304 over its lifecycle in accordance with the user-customized portfolio strategy. For example, depending on an overall renewal strategy customized (via user input 130) for portfolio 304, each of the individual products (e.g., time deposit components) of portfolio 304 may have potentially different renewal instructions as a product relates to potentially a new certificate of deposit (CD) rollover term and/or potentially a new entity system 104 for the renewed CD.

In some examples, users (via user device(s) 106) may elect different renewal strategies (e.g., perpetual rolling, fixed term, non-renewal, a combination thereof, etc.) for underlying time deposit products of a portfolio. Portfolio strategy manager 414 may manage the product(s) in a portfolio according to the user-elected strategy. For a perpetual rolling type of strategy, for example, portfolio strategy manager 414 may, for example, manage a maturing time deposit product by automatically rolling over the product for a new term equivalent to the term of the product having the longest duration in the portfolio (rather than automatically rolling over the product for the same original term). For a fixed term type of strategy, for example, portfolio strategy manager 414 may manage time deposit product(s) by renewing/rolling over each product for a term that is different from the product's original term, where the new term may ensure that the product matures at the same time as the product having the longest duration in the portfolio. For a non-renewal type of strategy, for example, portfolio strategy manager 414 may manage the portfolio according to explicit instructions not to renew product(s) and to automatically liquidate product(s).

Automatic process executor 416 may be configured to perform automated daily processing operations for one or more products of optimized-customized portfolio(s) 304. In some examples, the automated daily processing may correspond to end-of-day processing operations performed by entity system(s) 104. In some examples, the daily/end-of-day processing operations performed by automatic process executor 416 may take place through a series of different applications that automatically run in the background. In some examples, automatic process executor 416 may include launcher, executor and associated batch process applications for running the processing operations in the background. The applications of automatic process executor 416 may be configured to be independent of any task controllers of automatic process executor 416 that may invoke the actual execution of the corresponding end-of-day processes.

Automatic process executor 416 may be configured to optimize the daily/end-of-day processes, and may perform multiple parallel processing tasks that enable the complete end-of-day processing execution for all entity system(s) 104. In some examples, automatic process executor 416 may be optimized in the case of a multi-tenant deployment platform to be executed rather quickly (e.g., 20 to 30 minutes), including with entity system(s) 104 managing large transaction volumes with more than 80,000 new account transactions per day.

Automatic process executor 416 may transmit one or more processing action(s) 132 for downstream (internal or external) processing by one or more of entity system(s) 104, in response to the daily/end-of-day processing operations. For example, CPM server(s) 102 may generate and provide one or more data feeds to entity system(s) 102 for sending processing action(s) 132 and/or may transmit one or more files including processing action(s) 132 to entity system(s) 104 for downstream processing. Non-limiting examples of downstream processing by entity system(s) 104 (that may be triggered by processing action(s) 132) may include taxation reporting, account statement generation, automated clearing house (ACH) settlements and data handed off to an internal MIS analytics system of entity system(s) 104.

It may be appreciated that technical support of daily/end-of-day processing tasks and activities would typically require a user to have a deep understanding of the database structure and log content, as well as a deep understanding of the structure of the end-of-day processing concepts. Additionally, the ability to query these details requires database access rights, something which is generally heavily restricted and only allowed for authorized database administrators. In some examples, CPM server(s) 102 may include an administrator GUI (not shown) to facilitate the automated monitoring of the daily/end-of-day processing in a user-friendly manner. The administrator GUI may be configured with specific functionality that allows administrators to view real-time details of the processing status and the most relevant information related to all end-of-day processing operations performed by automatic process executor 416. With this functionality, users can easily and rapidly hone-in on a specific process execution and status without having to search for the same type of information in a generic, global log that would be time consuming, resource consuming and difficult to navigate, requiring in-depth technical knowledge of the application and database concepts. Accordingly, in some examples, in addition to the completely automated execution of all daily processing requirements, the CPM server(s) 102 may also provide automated monitoring tools through an Administrator GUI as well as automated notifications of current processing statuses. Additional information regarding aspects of an Administrator GUI according to the present disclosure may be found below, with reference to FIGS. 9A-9G.

Report manager 418 may be configured to generate one or more reports regarding the lifecycle processing of optimized-customized portfolio(s) 304. The report(s) may be transmitted to one or more of entity system(s) 104, one or more of user device(s) 106 and/or any other remote system(s). For example, the reports may include regulatory reports, government entity reports (e.g., tax reports), MIS reports (including intelligence reports), portfolio reports (e.g., updates on optimized-customized portfolio(s) 304), account statements and/or any suitable information associated with optimized-customized portfolio(s) 304 and/or user accounts. In general, report manager 418 may generate one or more reports associated with lifecycle processing operations and/or events of optimized-customized portfolio(s) 304 over the respective lifecycle. In some examples, report manager 418 may be configured to provide automated notifications of current processing statuses of optimized-customized portfolio(s) 304.

Real-time tracker 420 may be configured to perform real-time tracking of one or more data sources that may be relevant to optimized-customized portfolio(s) 304 and/or daily/end-of-day processing operations (of automatic process executor 416). In one non-limiting example, real-time tracker 420 may include automated monitoring tools that monitor live electronic marketplace activity in real-time (e.g., commercial activity, treasury and hedge management positions, interest rate volatility, live market data, etc.). The results of real-time tracking may be provided to one or more of components 402, 408, 410, 412, 414, 416 and 418 for incorporating the tracking results into the lifecycle operations and/or daily/end-of-day processing operations of automated lifecycle processing engine 120.

In a non-limiting example, CPM server(s) 102 may be configured to create and manage user-customized portfolios of products (e.g., time deposits) associated with one or more entity system(s) 104. In some examples, CPM server(s) 102 may create and manage these customized portfolios without restriction on the minimum transaction value and/or types of portfolio strategies in a manner that creates no incremental operational overhead for the particular entity system.

Certain types of portfolios (e.g. fixed income portfolios) may include time deposit products that are Depository Trust Corporation (DTC)-eligible, CUSIP-bearing, negotiable CDs. Such products typically require the intervention of multiple parties other than the issuing entity system (such as DTC (Depository Trust Corporation), Calculation Agents, Custodians . . . etc.). This intervention may increase the overall operational cost and decreases flexibility for building portfolios. Additionally, insurance limits (e.g., FDIC insurance) makes it even more difficult to search, find and automatically assemble a portfolio with full FDIC insurance.

Figure 11C:
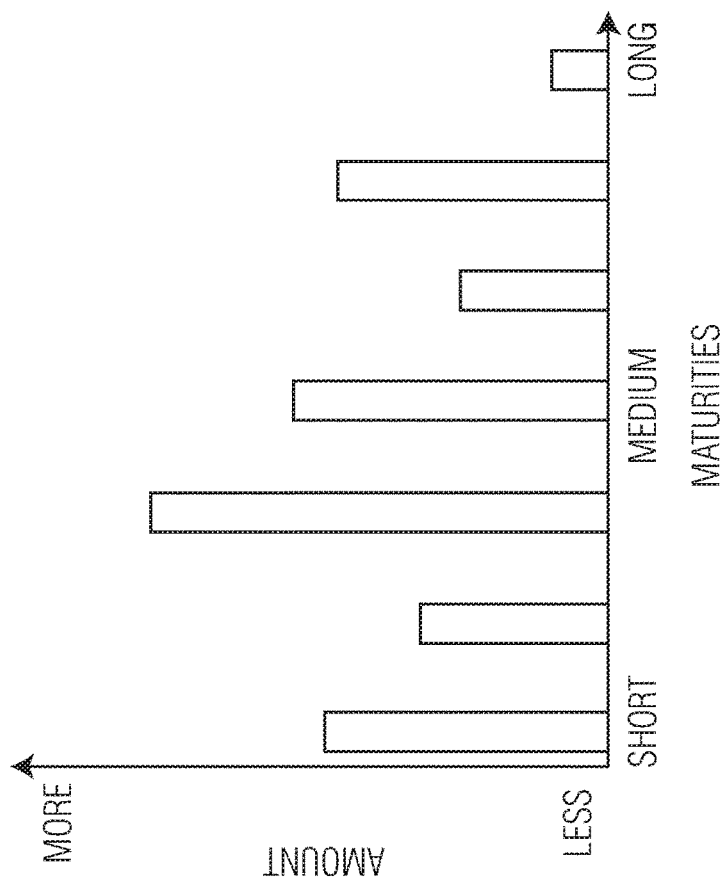
Figure 11D:
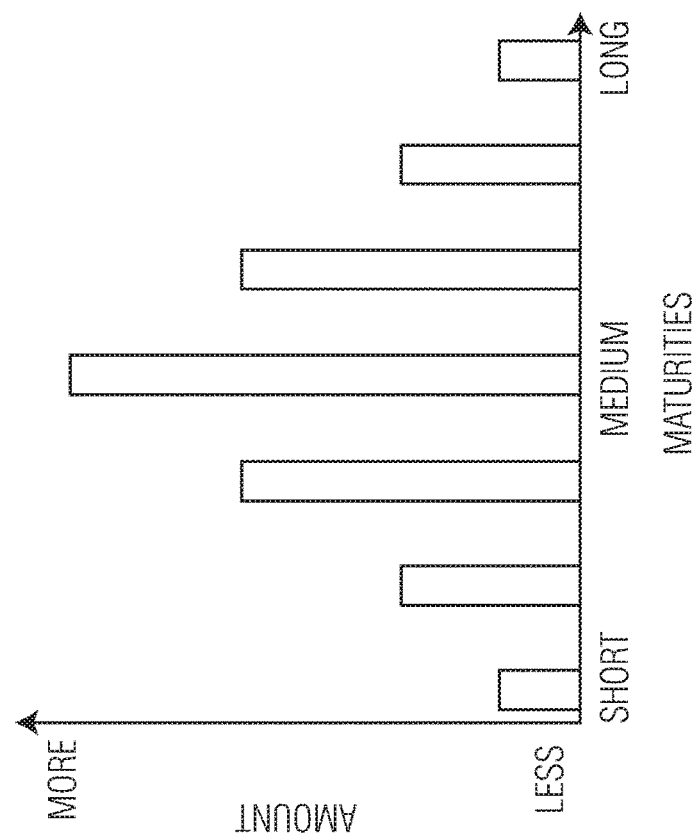

In some examples, CPM server(s) 102 streamlines automated construction and management of time deposit portfolios for any fixed income strategy. Fixed income strategies manage risk (e.g., interest, reinvestment and credit) exposure by diversifying maturities. Example graphs of various portfolio strategies which may be used for a fixed income strategy are shown in FIGS. 11A-11D. In FIG. 11A, a barbell portfolio strategy is shown. The barbell strategy may allocates higher amounts to shorter and longer maturities versus medium maturities. In FIG. 11B, a ladder portfolio strategy is shown. The ladder strategy may allocate roughly equal amounts on each of the desired maturities, which are typically sequential (monthly, quarterly, annually . . . etc.). In FIG. 11C, a bullet portfolio strategy is shown. The bullet strategy may allocate higher amounts to medium maturities versus shorter and longer maturities. In FIG. 11D, an example random (e.g., other) portfolio strategy is shown illustrating a possible combination of strategies.

In some examples, CPM server(s) 102 may facilitate FDIC insurance for all of the time deposits in the portfolio through a single entity system or through multiple entity systems. CPM server(s) 102 may support time deposits that need not be DTC-eligible or carry a CUSIP, which may result in a lower cost a higher flexibility.

As discussed above, CPM server(s) 102 may be configured to automatically manage plural products (such as time deposits) of a portfolio. Management of multiple time deposits as part of a managed, fixed income strategy entails much more than just managing said time deposits independently. Core entity systems process accounts individually, with no, or limited, capabilities to treat them as a bundle, especially if underlying accounts are of the same type (e.g., loans, demand deposits, time deposits . . . etc.). However, when a user opens several same type products, these must be related to each other in some manner (e.g., such as when the products are part of single portfolio single strategy).

For instance, if a user, after having opened multiple time deposits as part of a single strategy, desired to early withdraw one of the time deposits, it is desirable that CPM server(s) 102 inform the user that the time deposit account is part of an overall collection of time deposit accounts that served, at least initially, a desired strategy based on expected interest rate views at the time of designing and opening the times deposits in the portfolio.

In addition to the collective processing features described herein, CPM server(s) 102 is also configured to handle the crucial aspect of renewals of one, or multiple, time deposits in the portfolio. Fixed income instrument portfolios are typically built to manage a type of risk known as 'reinvestment risk'. Management of this risk may involve the reinvestment of maturing time deposits in the portfolio in same or different maturity time deposits. In some examples, CPM server(s) 102 may be configured for one or more reinvestment strategies. Non-limiting examples of reinvestment strategies may include non-renewal, fixed term portfolio and perpetual strategies.

In a non-renewal strategy, maturing time deposits in the portfolio may be paid back, including any accrued interest, into settlement accounts. This type of decision may be made by users/administrators who prioritize liquidity and most likely expect, when opened, rates to rise more than expected at specific terms. If that is the case, maturing time deposits can be reinvested in new time deposits at a rate higher for higher than expected paying tenors. In a fixed term portfolio type of renewal strategy, maturing time deposits may be reinvested in time deposits whose maturity is such that total portfolio strategy tenor equals a longest tenor of the original time deposit portfolio. In a perpetual type of renewal strategy, maturing type deposits may be reinvested in a longest original time deposit tenor, making it, theoretically, perpetual. Such a perpetual renewal strategy may be chosen by a user/administrator unconcerned by liquidity and with a neutral stand on interest rate evolution.

In some examples, CPM server(s) 102 may be configured to manage automated allocation across multiple entity systems 104, as well as to manage enhanced renewal strategies that optimize not only product renewal strategy but also associated issuer in order to optimize potential portfolio yield. In a multi-issuer environment, in which time deposits in an original portfolio were issued by multiple entity systems 104 to maximize yield, mitigate credit risk, or expand FDIC insurance, the renewal strategy may be more complicated than as in a single issuer-environment. For example, entity systems 104 do not consistently offer the highest rates across all terms depending on their funding needs. CPM server(s) 102 may determine whether, upon maturity, maturing funds should be reinvested in the same institution or in a different one if it offers a better interest rate for the desired renewal term. CPM server(s) 102 may also consider variables such as whether the term is being offered by an entity system in which the user already has maximum FDIC insurance deposited. All of these aspects, choices and optimizing algorithms may be managed through CPM server(s) 102.

In some examples, CPM server(s) 102 may be configured to provide collective pricing and downstream management of any number of user-customized time deposit portfolios, having any number of permutations. For collective pricing to occur, CPM server(s) 102 may operate as a 'multi-entity system' for the time deposits that are opened through it as part of the fixed income strategies that users/administrator wish to establish. In some examples, CPM server(s) 102 may be configured as an open architecture time deposit offering and processing platform for entity systems to obtain core and brokered funding. Core funding may be provided for the portion of the time deposit strategy that are accepted from their own users. Brokered funding may be provided for the portion of the time deposit strategy that are accepted from users of other entity systems.

In some examples, the open architecture and the automated customized portfolio builder and portfolio management functionality provided by CPM server(s) 102 may enable users/administrators to fully align their objectives with those of potentially multiple entity systems while minimizing core entity system restrictions (e.g., with respect to insurance limits). In some examples, CPM server(s) 102 may provide the ability to build customized portfolios of time deposits to maximize yield and/or enhance FDIC insurance.

CPM server(s) 102 also provide operational benefits. The operational benefits may include: contributions of products from multiple entity systems to a central repository which may also indicate their potential funding availability (e.g., in the form of a term and an interest rate). Another operational benefit may include the ability of a user/administrator to utilize an open architecture platform for constructing portfolios of time deposit products to maximize yield and minimize credit risk, which may be equivalent to maximizing FDIC insurance. A further operational benefit may include the ability of CPM server(s) 102 to relate all time deposits in portfolio as part of a single short, medium or long term fixed income strategy or portfolio. Another operational benefit may include providing entity systems 104 the ability to perform downstream processing of time deposits offered through CPM server(s) 102 with ready and easy connection to their own core system (for example, to consolidate treasury position).

In some examples, components 108-122 of CPM server(s) 102 may be embodied on a single computing device. In other examples, components 108-122 of CPM server(s) 102 may be embodied on two or more computing devices distributed over several physical locations, connected by one or more wired and/or wireless links. It should be understood that CPM server(s) 102 refers to a computing system having sufficient processing and memory capabilities to perform the specialized functions described herein.

The solutions described herein utilize the power, speed and precision of a special purpose computer system configured precisely to execute the complex and computer-centric functions described herein. As a result, a mere generic computer will not suffice to carry out the features and functions described herein. Further, it is noted that the systems and methods described herein solve computer-centric problems specifically arising in the realm of computer networks so as to provide an improvement in the functioning of a computer, computer system and/or computer network.

For example, a system according to the present disclosure includes an ordered combination of specialized computer components (e.g., middleware engine, security management system, centralized database structure(s), CPM website, dynamic GUI, etc.) that, collectively, monitor multiple entity systems, receiving/retrieve real-time data (e.g., from feeds) having varying data formats and originating from any number of external systems, providing security protection and encryption of sensitive data, storing the received data in a secure manner in at least one centralized database structure, providing a specialized interactive GUI that creates user-customizable portfolios of products (including from baseline products from among received data) and that dynamically adjusts and displays (in real-time) portfolio parameters (and impact of such adjustments) without having to reprogram the system, and managing lifecycle events and processing actions for the customized portfolio(s) by interacting with one or more external systems and initiating one or more automated actions. As a result, the CPM server obtains the most up-to-date information, provides an interactive customizable-portfolio user interface including the ability to dynamically customize portfolios and creates a dynamic representation of the effects of user selection(s)/adjustment(s) to the portfolios in real-time (based on the most-up-to-date information) and manages processing of the customized portfolios; thereby providing an improved user interface, providing user-customizable portfolios without increasing the computational burden on the entity systems that create and process customized portfolios, and improving the accuracy of the product and portfolio offerings to users through the interactive user interface.

Some portions of the present disclosure describe embodiments in terms of algorithms and symbolic representations of operations on information. These algorithmic descriptions and representations are used to convey the substance of this disclosure effectively to others skilled in the art. These operations, while described functionally, computationally, or logically, are to be understood as being implemented as data structures, computer programs or equivalent electrical circuits, microcode, or the like. Furthermore, at times, it may be convenient to refer to these arrangements of operations as modules or algorithms. The described operations and their associated modules may be embodied in specialized software, firmware, specially-configured hardware or any combinations thereof.

Figure 5:
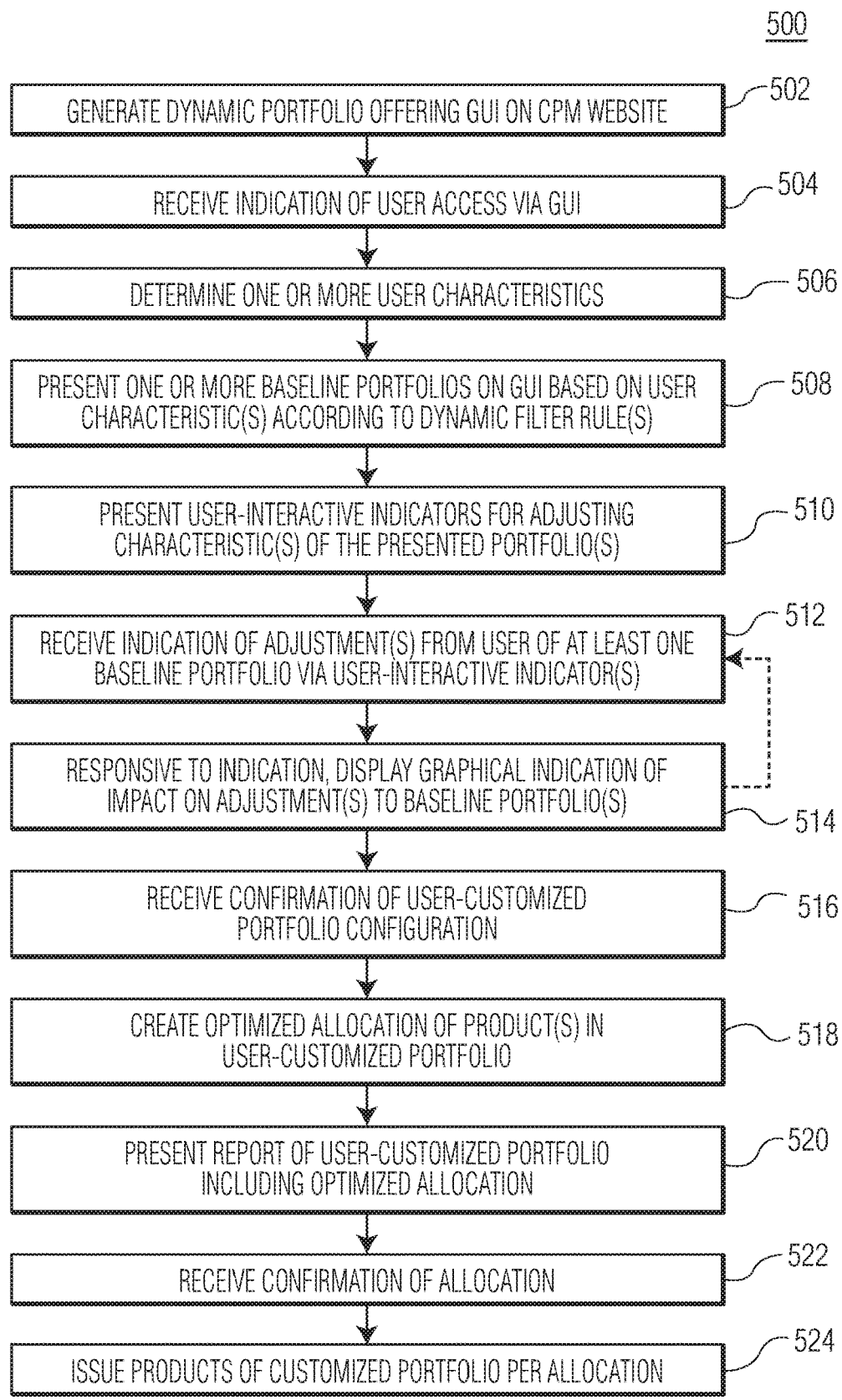
FIG. 5 is a flowchart diagram of an example method for creating user-customized portfolio(s) via an interactive GUI, according to an aspect of the present disclosure.
Figure 6:
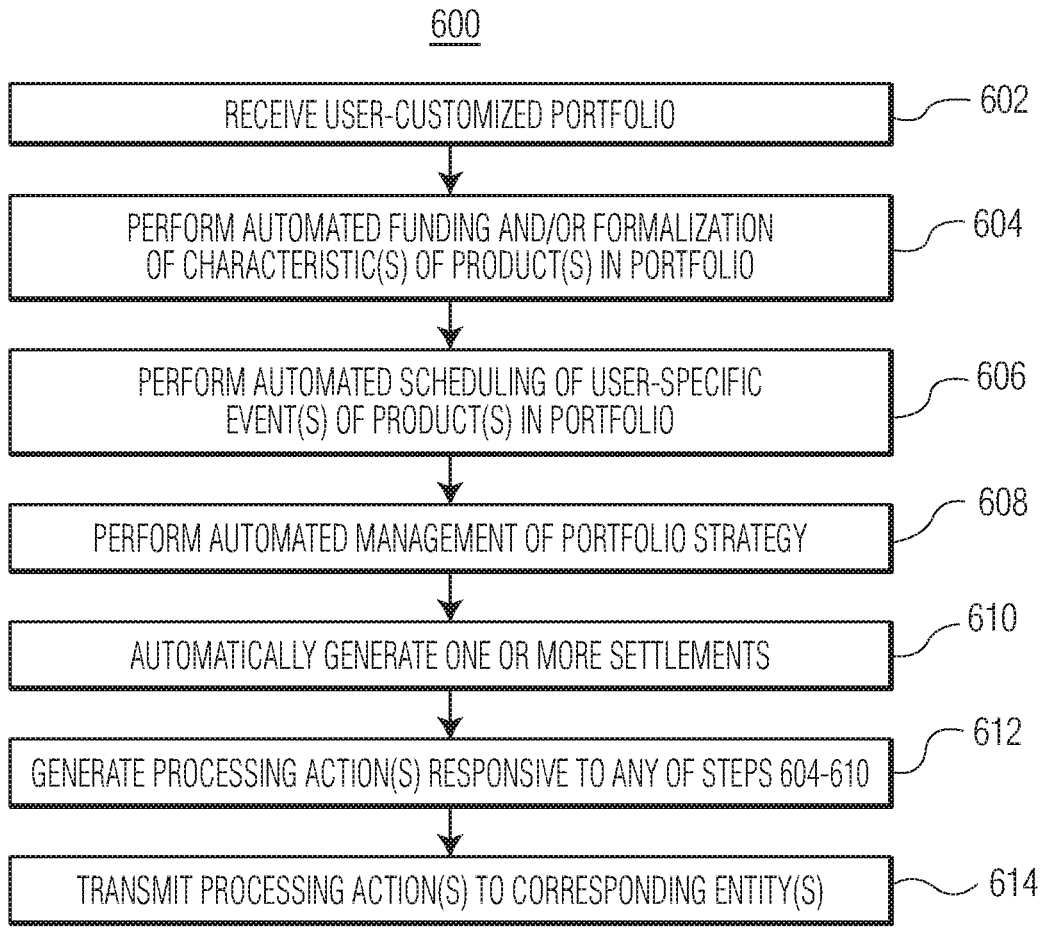
FIG. 6 is a flowchart diagram of an example method for managing a lifecycle of a user-customized portfolio, according to an aspect of the present disclosure.

CPM server 102 may be configured with more or less modules to conduct the methods described herein with reference to FIGS. 5 and 6. In particular, FIG. 5 is a flow chart diagram illustrating an example method for creating user-customized portfolios via customized portfolio builder 116 (200), according to an aspect of the present disclosure; and FIG. 6 is a flow chart diagram illustrating an example method for managing a lifecycle of a user-customized portfolio, according to an aspect of the present disclosure. As illustrated in FIGS. 5 and 6, the methods shown may be performed by processing logic that may comprise hardware (e.g., circuitry, dedicated logic, programmable logic, microcode, etc.), software (such as instructions run on a processing device), or a combination thereof. In one embodiment, the methods shown in FIGS. 5 and 6 may be performed by one or more specialized processing components associated with components 108-122 of data structure management system 100 of FIG. 1.

Referring now to FIG. 5, a flowchart diagram is shown of an example method 500 for creating user-customized portfolio(s) 128 via customized portfolio builder 116 (or 200), according to an aspect of the present disclosure. At step 502, customized portfolio builder 116 (200) may generate a dynamic portfolio offering GUI on CPM website 114 for creating user-customized portfolio(s) 128 and may be accessed via user device(s) 106. Initially, the dynamic portfolio offering GUI may be configured to display baseline portfolio(s) 126 with one or more indicators of portfolio customizability (e.g., for adjusting parameter(s) of baseline portfolio(s) 126). An example of a dynamic offering GUI is shown in FIGS. 7A-7E.

At step 504, the dynamic portfolio offering GUI may receive an indication of user access to CPM website 114 via user device(s) 106. At step 506, the dynamic portfolio offering GUI may determine one or more user characteristics of the user accessing CPM website 114.

At step 508, dynamic offering filter(s) 202 may apply one or more dynamic filter rules based on the user characteristic(s), and the dynamic portfolio offering GUI may present one or more of baseline portfolio(s) 126 on user device(s) 106 according to the dynamic filter rule(s). In some examples, the selection of baseline portfolio(s) 126 presented on user device(s) 106 may be restricted by entity system(s) 104 on the basis of dynamic filter rule(s) introduced into CPM server(s) 102 by entity system(s) 104. In one example, a particular entity system (e.g., entity system 104-1) may provide filtering rules to filter the same product with different baseline rate curves dependent on the user's (or user device's) geolocation. In another example, entity system 104-1 may provide filtering rules to present the same product with different baseline rate curves and tenors dependent on the user's existing relationship with entity system 104-1, or dependent on any other of the user's characteristics (e.g., wealth categorization, industry, etc.).

At step 510, the dynamic portfolio offering GUI may present one or more user-interactive indicators for adjusting one or more characteristics of the presented portfolio(s). At step 512, the dynamic portfolio offering GUI may receive input triggering one or more adjustments to characteristics of baseline portfolio(s) 126 via one or more user-interactive indicators (generated by the dynamic portfolio offering GUI). The input may take the form of text, selection(s) from a drop-down menu, click(s) on selection buttons, drag-and-drop data into a box or dedicated screen area, or any other form of data input.

At step 514, the dynamic portfolio offering GUI, responsive to the indication(s) input, may generate and dynamically display, in real-time, a graphical indication and/or a textual indication of an impact of the adjustment(s) to other parameters and/or characteristics of baseline portfolio(s) 126 to create customized portfolio(s) 128. In some examples, steps 512 and 514 may be repeated one or more times. In this manner, the dynamic portfolio offering GUI provides the ability to input multiple adjustments in order to customize baseline portfolio(s) 126 together with the ability to display, in real-time, the impact to the portfolio characteristics. Thus, by using the interactive means provided by the dynamic portfolio offering GUI, the user input (whether from user device 106 and/or entity system(s) 104) may be used to fully customize the baseline portfolio(s) by adjusting any number of parameters/characteristics/strategies of the baseline portfolio(s). In some examples, the adjustment(s) to the parameters/characteristics may include introducing details of a portfolio amount desired, a maximum maturity date, a frequency of interim maturities (e.g., including details of an amount desired), a desired renewal or rollover strategy, etc. As this interactive configuration and adjustment is undertaken, user device(s) 106 and/or entity system(s) 104 may display a graphical illustration of the impact of the adjustments on portfolio characteristics (e.g., a time deposit portfolio), as the adjustments are being applied (i.e., a dynamic illustration).

At step 516, the dynamic portfolio offering GUI may receive a confirmation indicating completion of the user-customized portfolio configuration. In this manner, once the user has made all desired adjustments and configurations to baseline portfolio(s), the dynamic portfolio offering GUI, via user device(s) 106 and/or entity system(s) 104, may confirm the user selections.

At step 518, allocation engine 118 (300) may create an optimized allocation of product(s) and/or product account(s) in the user-customized portfolio (e.g., as confirmed in step 516), to automatically assign optimal products (e.g., time deposits) in the user-customized portfolio. At step 520, the dynamic portfolio offering GUI may present a report of the user-customized portfolio including the optimized allocation (e.g., determined in step 518). At step 522, assuming user is satisfied with the allocated products in the portfolio, the dynamic portfolio offering GUI may receive a confirmation indicating confirmation of the allocation for the user-customized portfolio configuration. At step 524, responsive to the confirmation (in step 522), allocation engine 118 (300) may automatically issue the products of the user-customized portfolio in accordance with the optimized allocation. The portfolio, as issued, may to transmitted to automated lifecycle processing engine 120.

Although not shown in FIG. 5, in some examples, the dynamic portfolio offering GUI may receive, at step 522, a rejection of the optimized allocation. In response to a rejection, the dynamic portfolio offering GUI may, in some examples, present one or more indicators for user input of alternative allocation information (e.g., alternative product(s) and/or alternative entity system(s) 104). Optionally, the dynamic portfolio offering GUI may permit issuance of the customized portfolio (at step 524) with user-altered allocation information. In this manner, dynamic portfolio offering GUI may allow the user to modify the allocation if the user is not satisfied with the allocation determined by allocation engine 118 (300).

As each user-customized portfolio is issued, automated lifecycle processing engine 120 may automatically inform the associated entity system(s) 104 by registering and handling the contract(s) in accordance with lifecycle processing operations. The operations may include automated funding of the contract(s) (e.g., via accounting engine 410 and/or via communications with one or more external systems) and automated scheduling and execution of all downstream processing for all of the contracts in the portfolio. In this respect, entity system(s) 104 may keep a running tally of the total volume of contracts, as well as a running tally of total volumes with a breakdown of volume by maximum and interim maturities. Moreover, entity system(s) 104 may elect to interactively adjust the interest rate curve(s) in order to control the volume of deposits for specific tenors, or all tenors, as determined by the funding and asset and liability management needs of entity system(s) 104. Any such change, once it is approved and published by entity system(s) 104, may have an immediate effect on the customized portfolio builder 116 and automated lifecycle processing engine 120.

Referring next to FIG. 6, a flowchart diagram is shown of an example method 600 for managing a lifecycle of one or more user-customized portfolio(s) (e.g., optimized-customized portfolio(s) 304), according to an aspect of the present disclosure. FIG. 6 illustrates automated downstream management of a plurality of products (e.g., time deposits) as part of a user-customized portfolio (e.g., a fixed income portfolio) comprising a combination of products (e.g., time deposits) throughout the portfolio and contract lifecycle, for example, by automated lifecycle processing engine 120 (or 400). In some examples, the automated lifecycle processing method 600 shown in FIG. 6 may be conducted following the issuance of the plurality of products (e.g., time deposits) which are part of any given portfolio. Although FIG. 6 illustrates the management of an exemplary portfolio of time deposit products, method 600 is not limited to this example, and may be used to manage any suitable user-customized portfolio of products in accordance with the description herein.

At step 602, automated lifecycle processing engine 120 or 400 (e.g., task controller 402) may receive one or more user-customized portfolio(s) (e.g., optimized-customized portfolio(s) 304) from allocation engine 118 (300). For example, when the customized portfolio(s) include (issued) time deposit product(s), each product may include unique characteristics such as originating entity system characteristics, amounts, tenors and/or interest rates. Automated lifecycle processing engine 120 or 400 (e.g., a single automated system) may be configured to manage the processing of all of the liquid time deposit products of the user-customized portfolio(s).

At step 604, automated lifecycle processing engine 120 or 400 (e.g., accounting engine 410) may perform automated funding operations and formalization of characteristics operations of the user-customized portfolio. For example, automated lifecycle processing engine 120 (400) may read in the characteristics of each product of the user-customized portfolio. The characteristics may be analyzed and interpreted, and the engine may automatically generate instructions (which may be transmitted to one or more external systems or processed internally) that initiate the collection of funds for the formalization of a user contract. The instructions for collection of funds may be created for a single location (e.g. for a single entity system such as entity system 104-1), or across multiple locations or entity systems 104. Accordingly, for each user-specific portfolio of products (e.g., time deposit products), automated lifecycle processing engine 120 (400) may classify the deposit, may generate appropriate accounting entries, and may aggregate data through one or more processes that allows entity system(s) 104 to satisfy any regulatory and fiscal reporting requirements, as well as store data for any analytical reporting.

Following the funding and formalization (step 604) of one or more user-customized product(s) in the user-customized portfolio, at step 606, automated lifecycle processing engine 120 or 400 (e.g., event scheduler 408) may perform automated scheduling of one or more planned events. Automated lifecycle processing engine 120 may read in the characteristics of each time deposit product, and may analyze and interpret the characteristics to automatically generate instructions (which may be transmitted to one or more external systems or processed internally) for scheduling planned events. In some examples, the instructions may including details of the user/contract specific maturity dates, amounts and/or desired settlement or payment account. Thus, automated lifecycle processing engine 120 (400), at step 606, may generate details of the scheduled events of each time deposit product in the portfolio, and may store the scheduled events for each product.

At step 608, automated lifecycle processing engine 120 (e.g. portfolio strategy manager 414) may automatically perform automated management of the portfolio strategy for the user-customized portfolio. The automated management may include performance of any renewals and/or rollovers of one or more time deposit products of the user-customized portfolio, as indicated in the (customized) portfolio strategy.

Accordingly, for each time deposit product in the user-customized portfolio, automated lifecycle processing engine 120 (400) may generate appropriate event/renewal/rollover entries (e.g., classify details of the scheduled maturities of the time deposit product(s)), and may aggregate data through one or more processes that allows entity system(s) 104 to satisfy any regulatory and fiscal reporting requirements, as well as store data for any analytical reporting.

Automated lifecycle processing engine 120 (400) may then be configured to manage one or more scheduled user/client specific interest(s) and maturities event(s) (e.g., from the issue date of the time deposit products through to the maturity date of the same products).

At step 610, automated lifecycle processing engine 120 or 400 (e.g. settlement engine 412) may automatically generate one or more scheduled settlements of products in the user-customized portfolio. For example, automated lifecycle processing engine 120 (400) may read data associated with time deposit products (e.g., maturity calendars, APYs, interest rate and/or deposit amounts transaction descriptions). Automated lifecycle processing engine 120 may analyze and interpret the data to automatically generate instructions (which may be transmitted to one or more external systems or processed internally) for the settlement of funds for the user contract maturity event(s). In some examples, for each time deposit product, automated lifecycle processing engine 120 (400) may reclassify the deposit, may generate appropriate accounting entries, may generate payment instructions for one or more of entity system(s) 104, may store data for analytical reporting and may aggregate data in a manner that allows entity system(s) 104 to satisfy any regulatory and/or fiscal reporting requirements.

At step 612, automated lifecycle processing engine 120 or 400 (e.g., automatic process executor 416) may perform a daily/end-of-day processing of products (as discussed above) and may generate one or more processing action(s) 132 for downstream processing by one or more of entity system(s) 104. At step 614, CPM server(s) 102 may transmit the processing action(s) 132 to corresponding ones of entity system(s) 104, for example.

Referring next to FIGS. 7A-7E, example screenshots of dynamic portfolio offering GUI 700 are shown. Each of FIGS. 7A-7E illustrates an example of interactive windows (within dynamic portfolio offering GUI 700) configured to receive input for creating one or more user-customized portfolios. In some examples, dynamic portfolio offering GUI 700 may be generated via CPM website 114. Dynamic portfolio offering GUI 700 is an example of an interactive GUI that may comprise one or more windows and/or regions configured to display data associated with one or more user-customizable portfolios, input tools that adjust parameters and characteristics of baseline portfolio(s) in response to input, dedicated fields that receive textual information, graphical and/or textual indicators that dynamically illustrate the impact of any user adjustments on other portfolio parameters and characteristics (i.e., in real-time in response to user adjustments), and one or more selector buttons that guide users in the customization and finalization of portfolio(s). Information displayed on dynamic portfolio offering GUI 700 may be updated, for example, in real-time, in near real-time, periodically (for example, on a daily basis, on an intraday basis, etc.), based on one or more predetermined schedules, events, etc. In some examples, information displayed on dynamic portfolio offering GUI 700 may be updated based on data/information received from entity system(s) 104 via one or more real-time data feed interfaces.

Figure 7A:
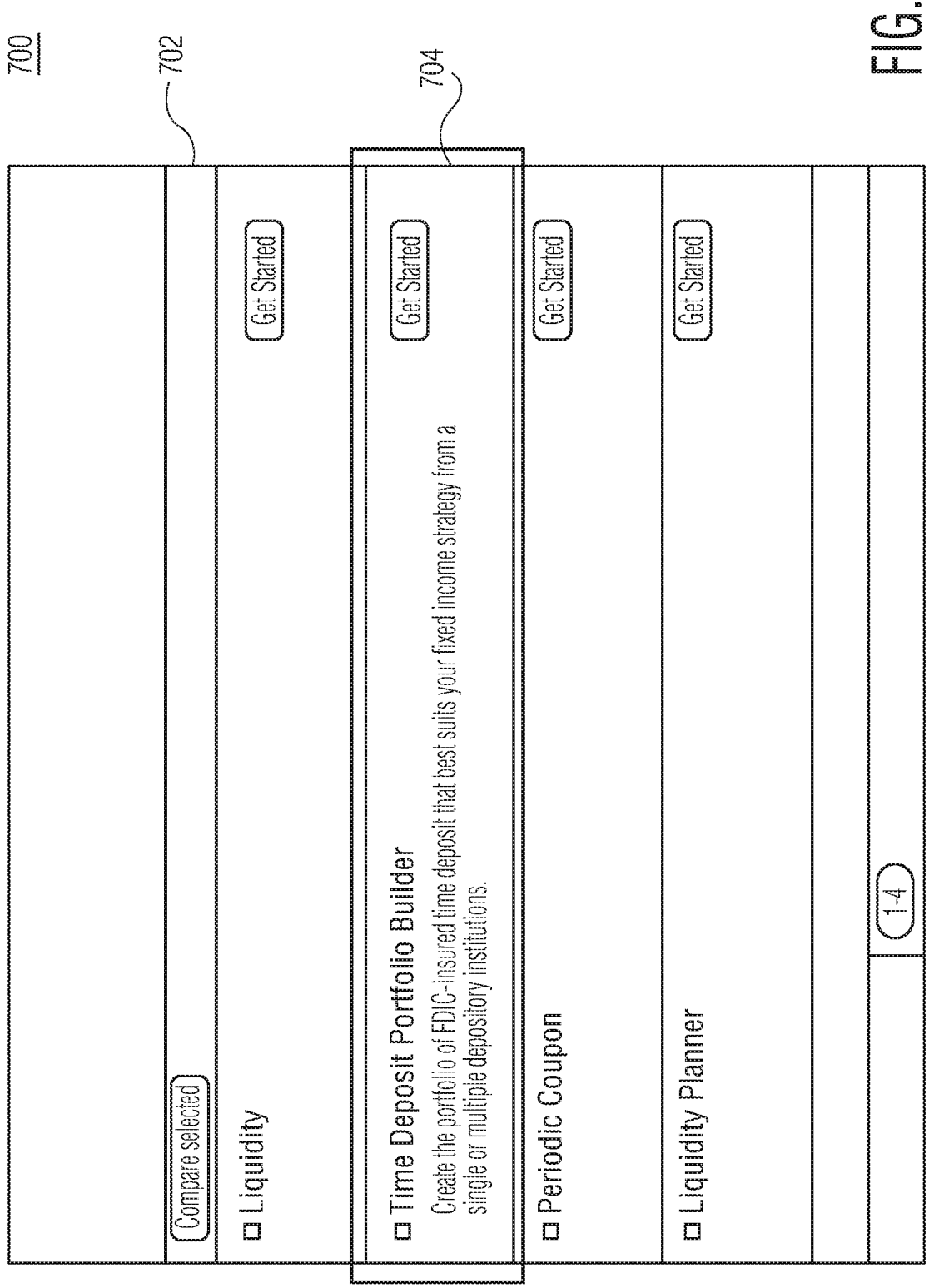

FIG. 7A illustrates an initial screen 702 of dynamic portfolio offering GUI 700. Screen 702 may include a region 704. Selection of indicator(s) in region 704 may initiate creation of a user-customizable portfolio.

Figure 7B:
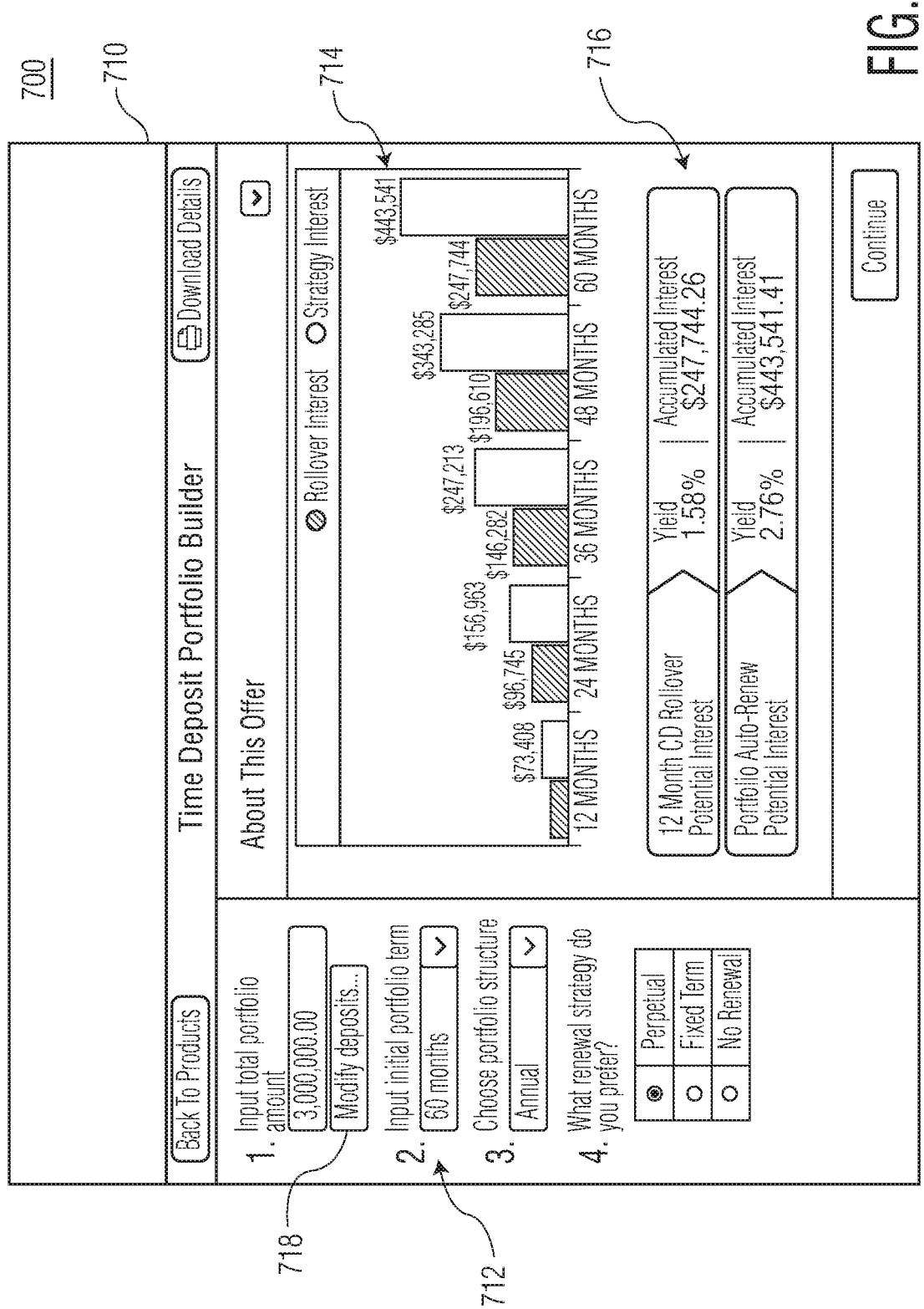

FIG. 7B illustrates an initial portfolio configuration screen 710 of dynamic portfolio offering GUI 700. Screen 710 may be displayed upon selection of indicator(s) in region 704 in initial screen 702 (FIG. 7A). Screen 710 may include selection region 712. Selection region 712 may allow a user to input a total amount to deposit for a portfolio (e.g., via textual input), choose an initial portfolio term (e.g., from a dropdown input tool), choose a portfolio structure (e.g., from a dropdown input tool) and choose a renewal strategy (e.g., from a radio button selection tool). Selection region 712 may also a deposit selector button 718 for allowing a user to modify one or more deposits. Screen 702 may also include a graphical display region 714 that displays payment details (with respect to rollover and strategy interest) and a region 716 that displays a CD rollover potential interest and renewal potential interest (e.g., in terms of yield and accumulated amount of interest) that may potentially be earned for the portfolio over the selected term. As data is entered into any of the input fields noted above, the graphical display region 706 and region 708 are automatically updated to reflect such input.

FIG. 7C illustrates an information screen 720 of dynamic portfolio GUI 700. Screen 720 may include selection region 712 and offer information region 722. Offer information region may include information (e.g., in a text format) for creating a customized portfolio.

Figure 7D:
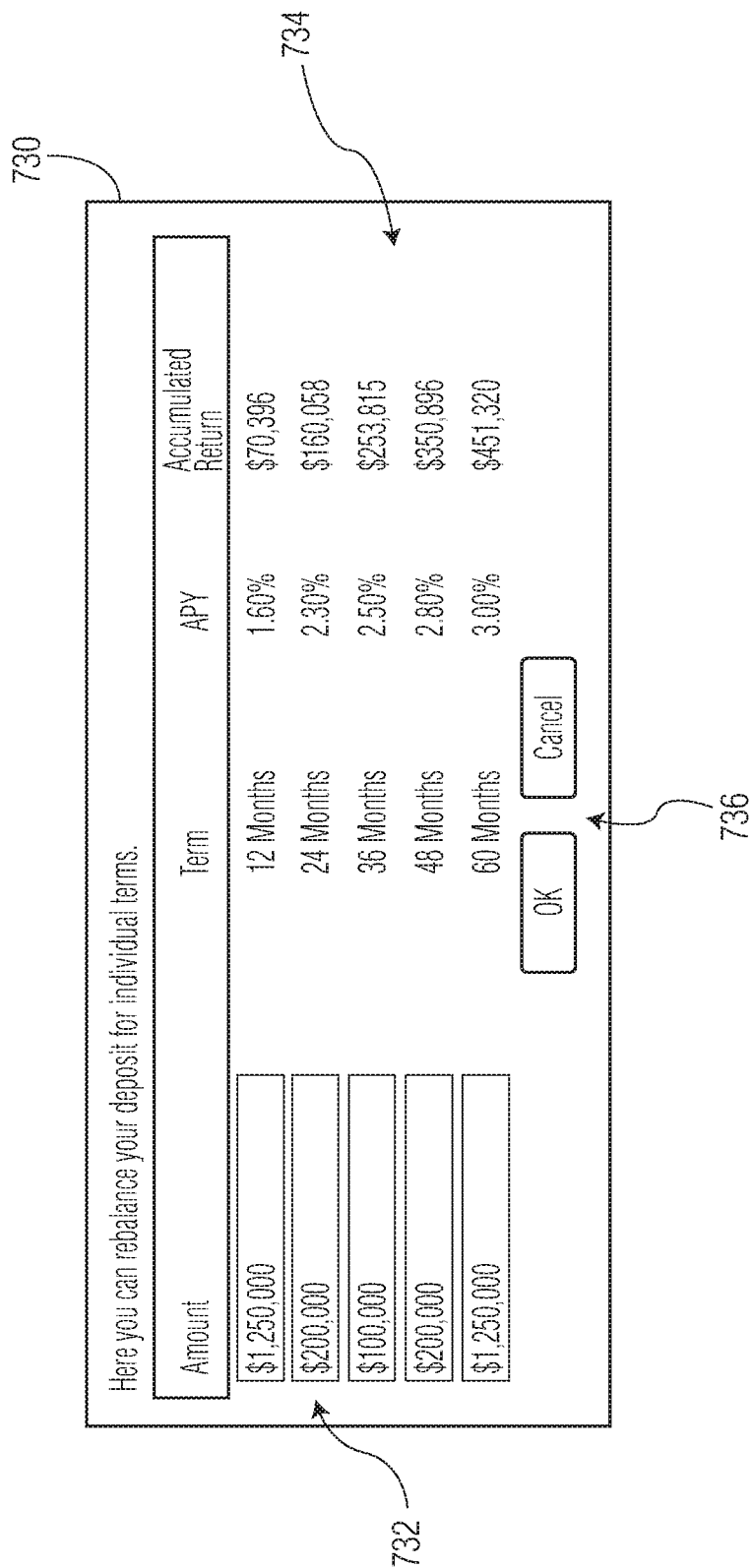

FIG. 7D illustrates pop-up window 730 which may be displayed (e.g., over screen 710) if the user selects deposit selector button 718, and chooses to enter deposit customization parameters, such as modifying deposit amounts for one or more terms, for rebalancing a deposit for individual terms. Pop-up window 730 may include user input tools 732 that can be used input to deposit information (e.g., via textual input), term information region 734 for displaying term, APY and accumulated return for each term) and selection buttons 736 (or similar input functions) for accepting or rejecting the modified deposits.

FIG. 7E illustrates screen 740 that may immediately and dynamically be generated responsive to selection or input of an "OK" button among selection buttons 736 (or similar function) in pop-up window 740 (FIG. 7D). Screen 740 includes regions similar to initial screen 710 (FIG. 7B), but provides a graphical representation of the user-customized portfolio 742 in region 714. Region 716 may include a recalculated yield and new accumulated interest amount for the portfolio. Screen 740 also include selection button 744 for continued processing (e.g., confirmation of the portfolio as configured in FIG. 7E. Screen 740 also illustrates report selection button 746. Selection of button 746 may generate an electronic downloadable report providing details of characteristics, parameters and or underlying products of the user-configured portfolio.

Although exemplary sections/windows are depicted in FIGS. 7A-7E, alternative configurations for the sections/windows are envisioned. For examples, dynamic portfolio offering GUI 700 may contain more or fewer sections, windows, webpages and/or tabs. Additionally, the sections/windows may be reorganized in any manner and display any pertinent information.

In some examples, dynamic portfolio offering GUI 700 may be presented to any number and any types of users (e.g., account administrators via entity system(s) 104, personal investors of user devices 106, etc.) of the system. Dynamic portfolio offering GUI 700 may be configured with transparent and intuitive graphic tools with simple and easy to follow steps that may generate clear on-screen descriptions and simulations of the underlying product and single or multi-entity system portfolio characteristics. Dynamic portfolio offering GUI 700 may also provide dynamic and personalized documentation. The result is an improved user interface device providing new and powerful functionality.

Figure 8A:
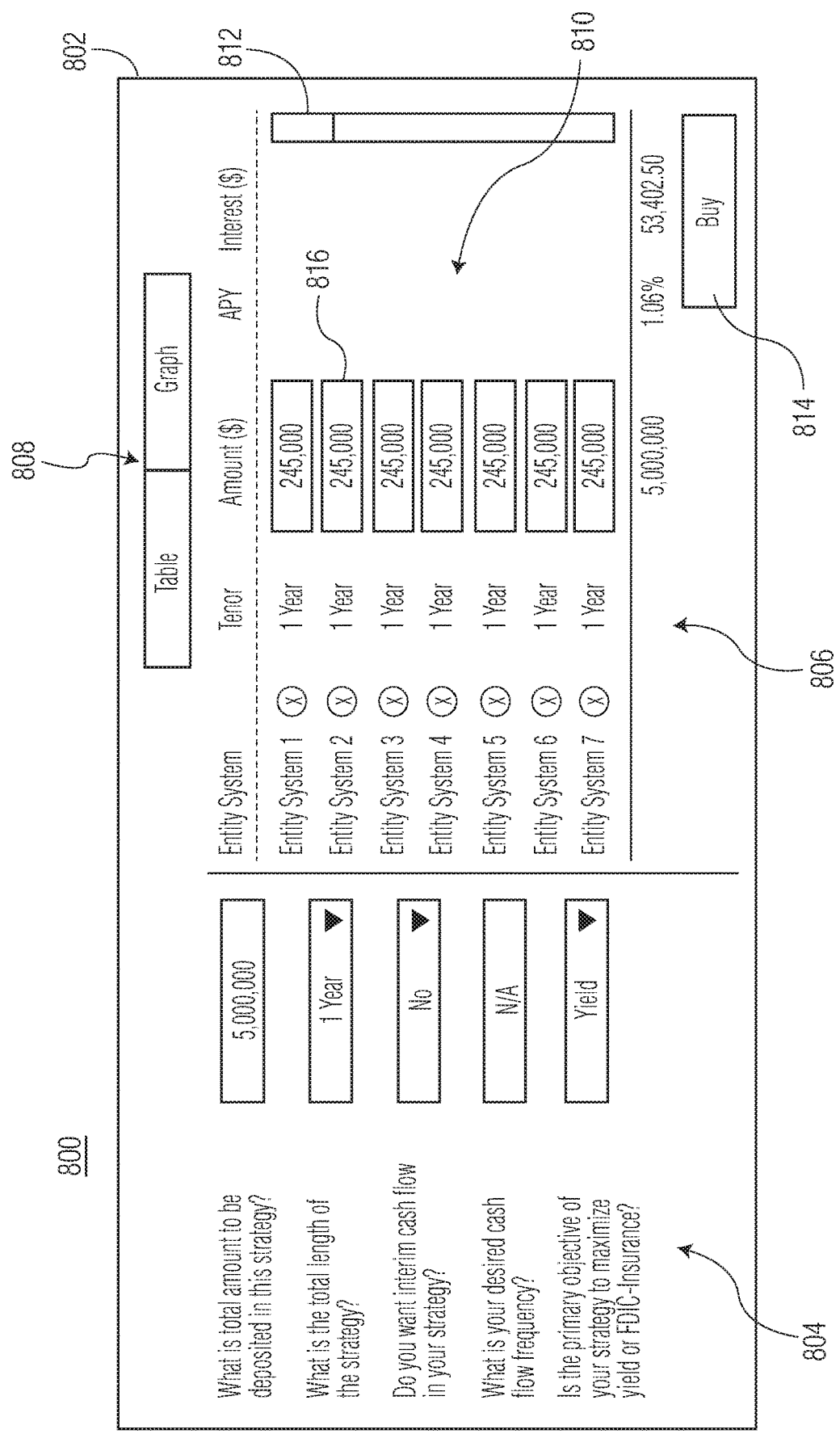
Figure 8B:
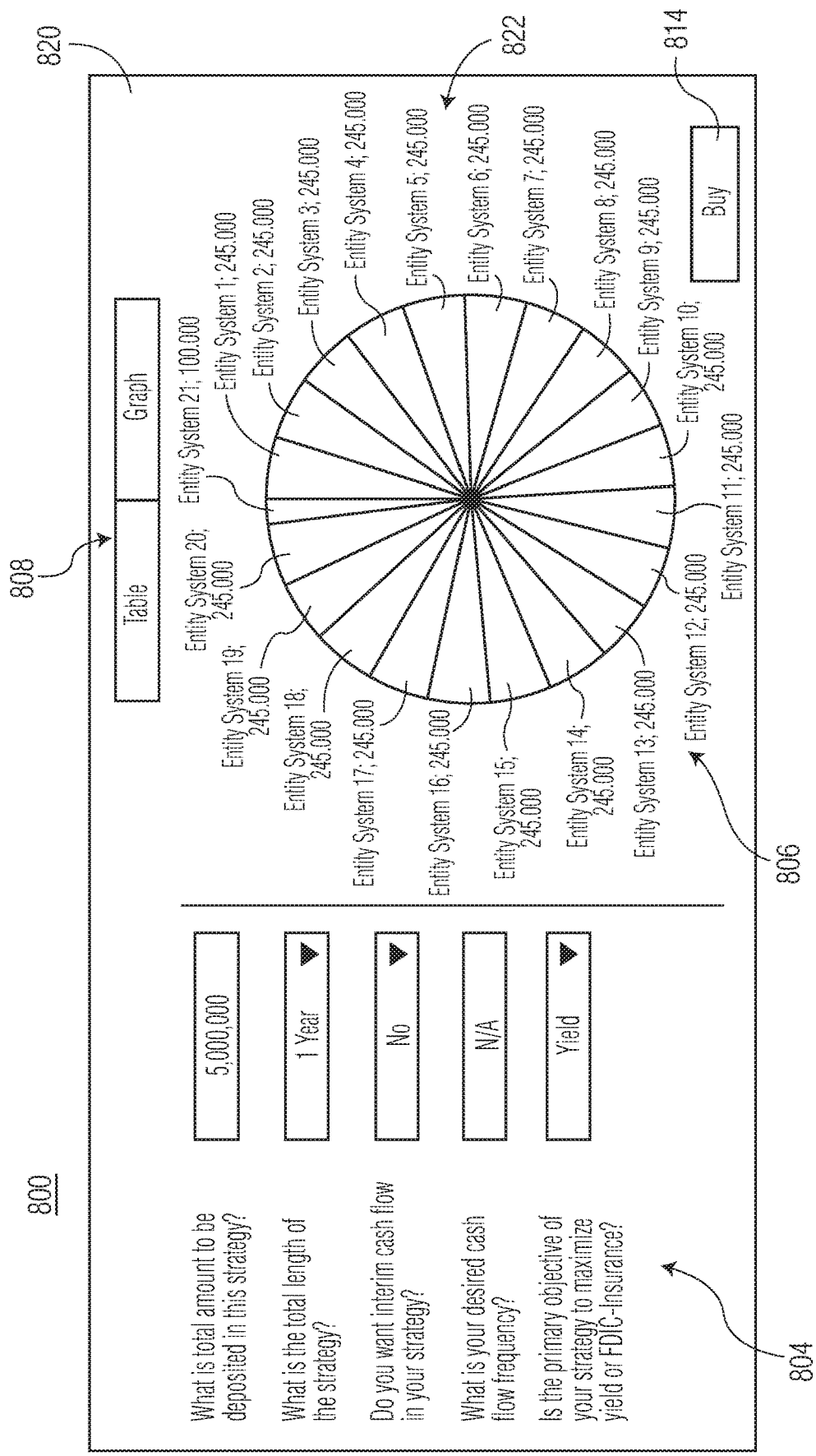
Figure 8C:
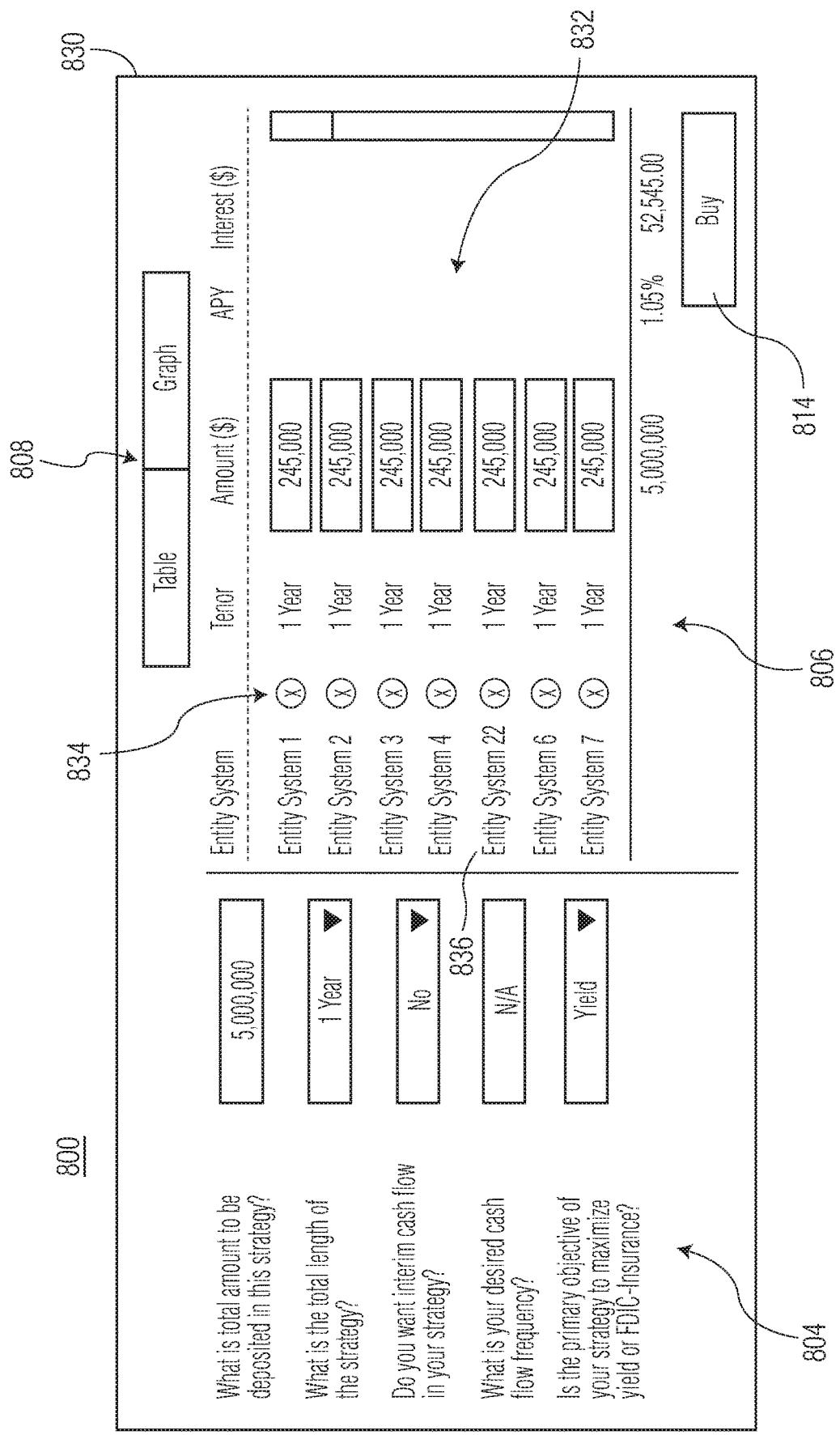
Figure 8D:
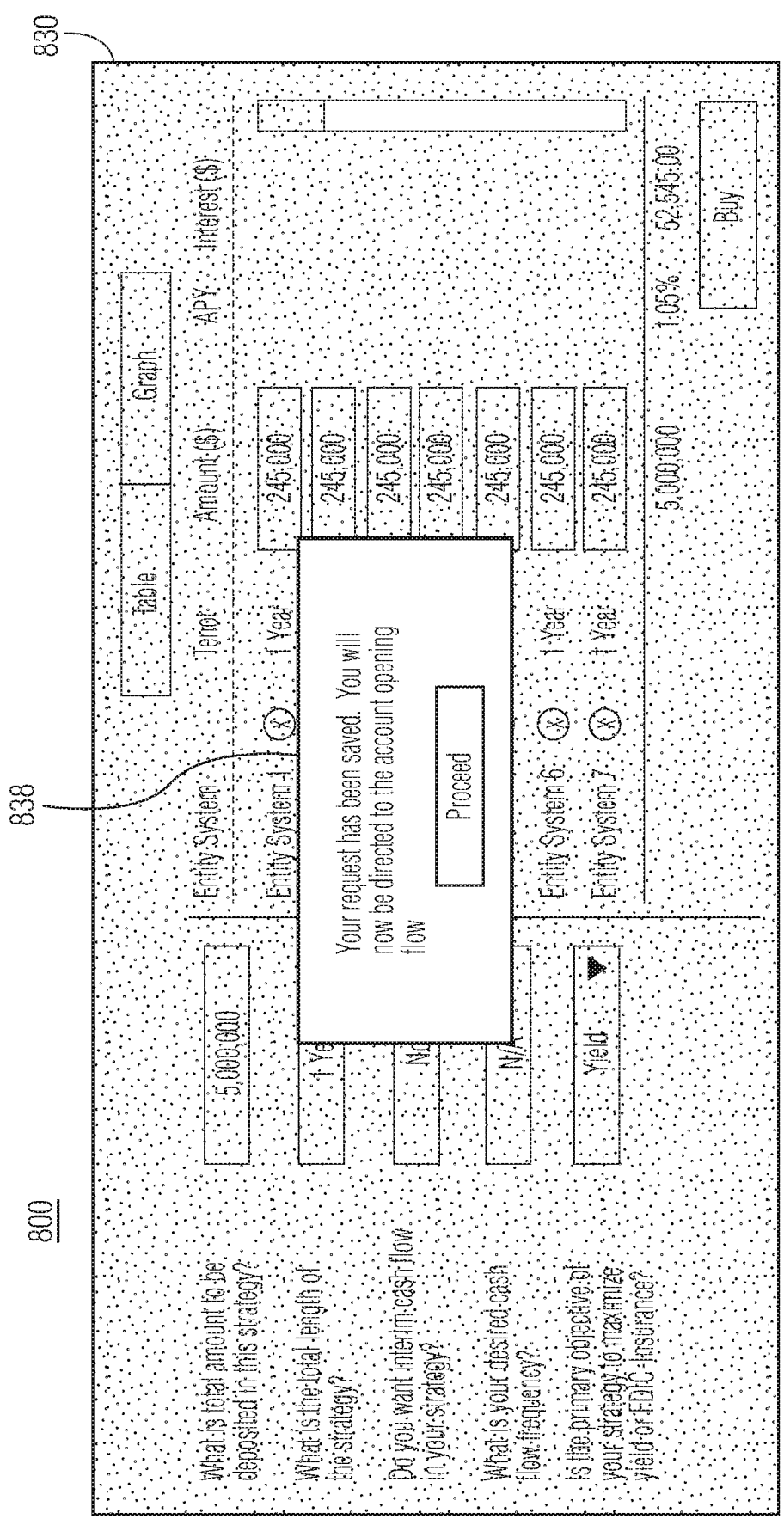
Figure 8E:
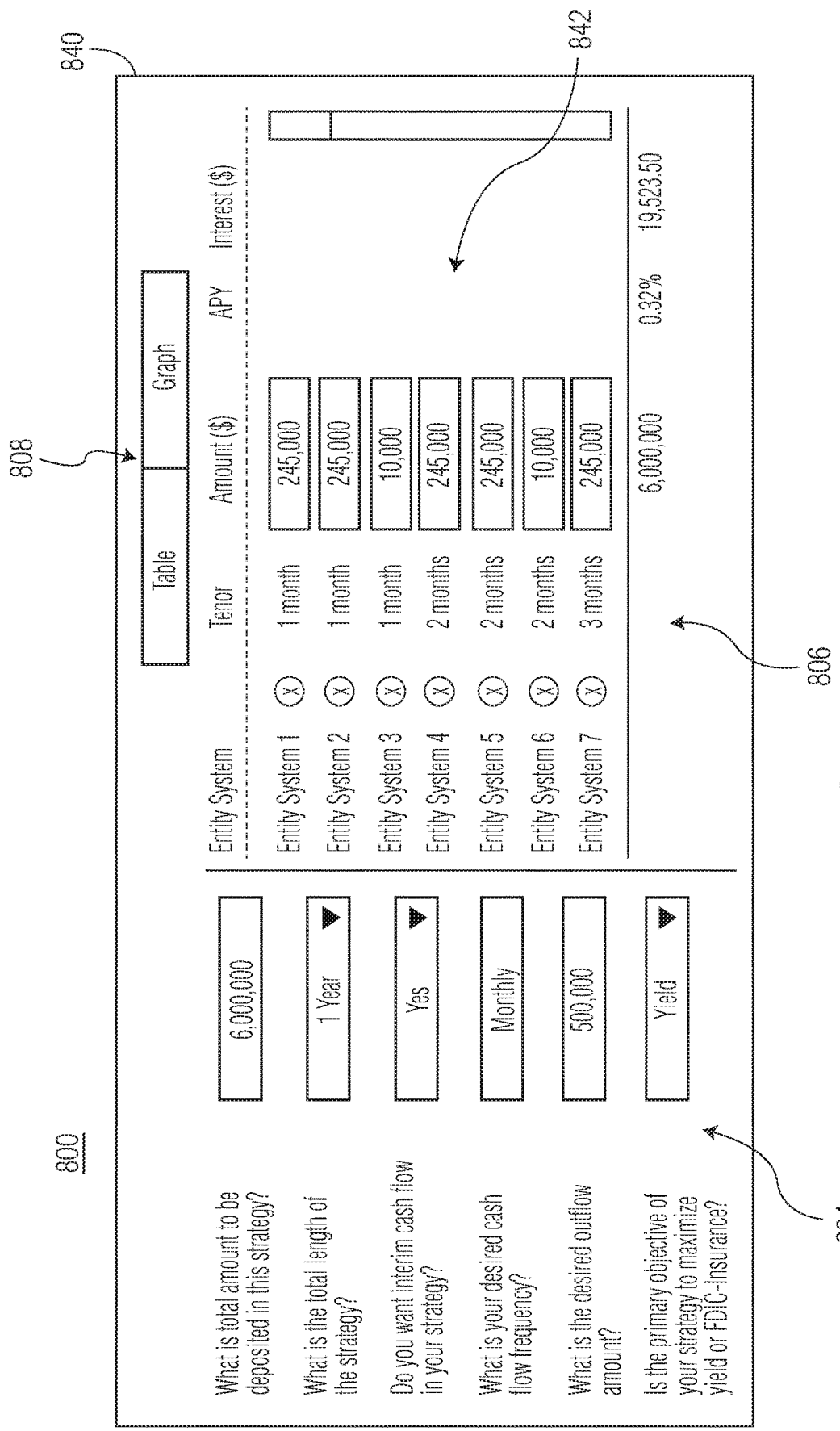
Figure 8G:
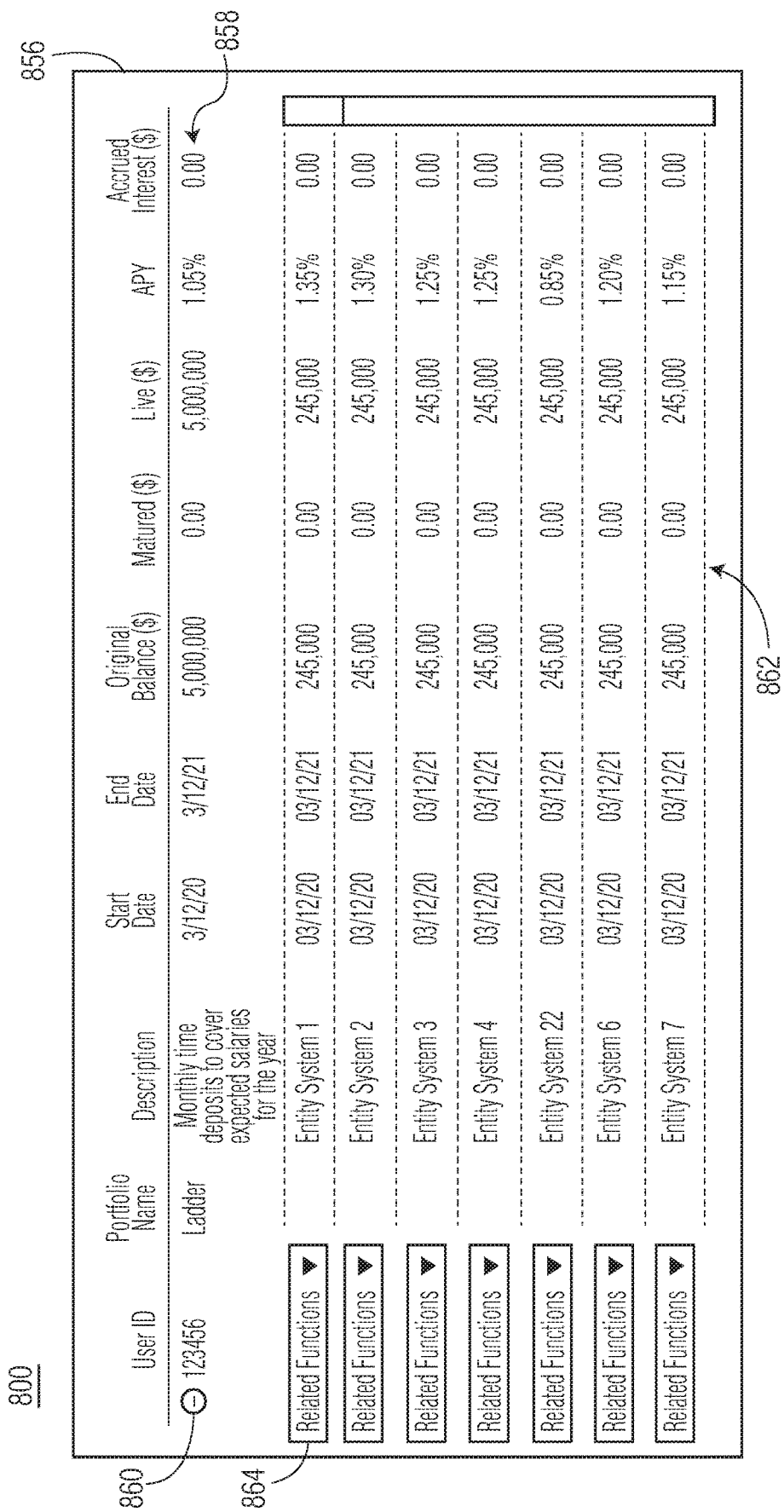
Figure 8H:
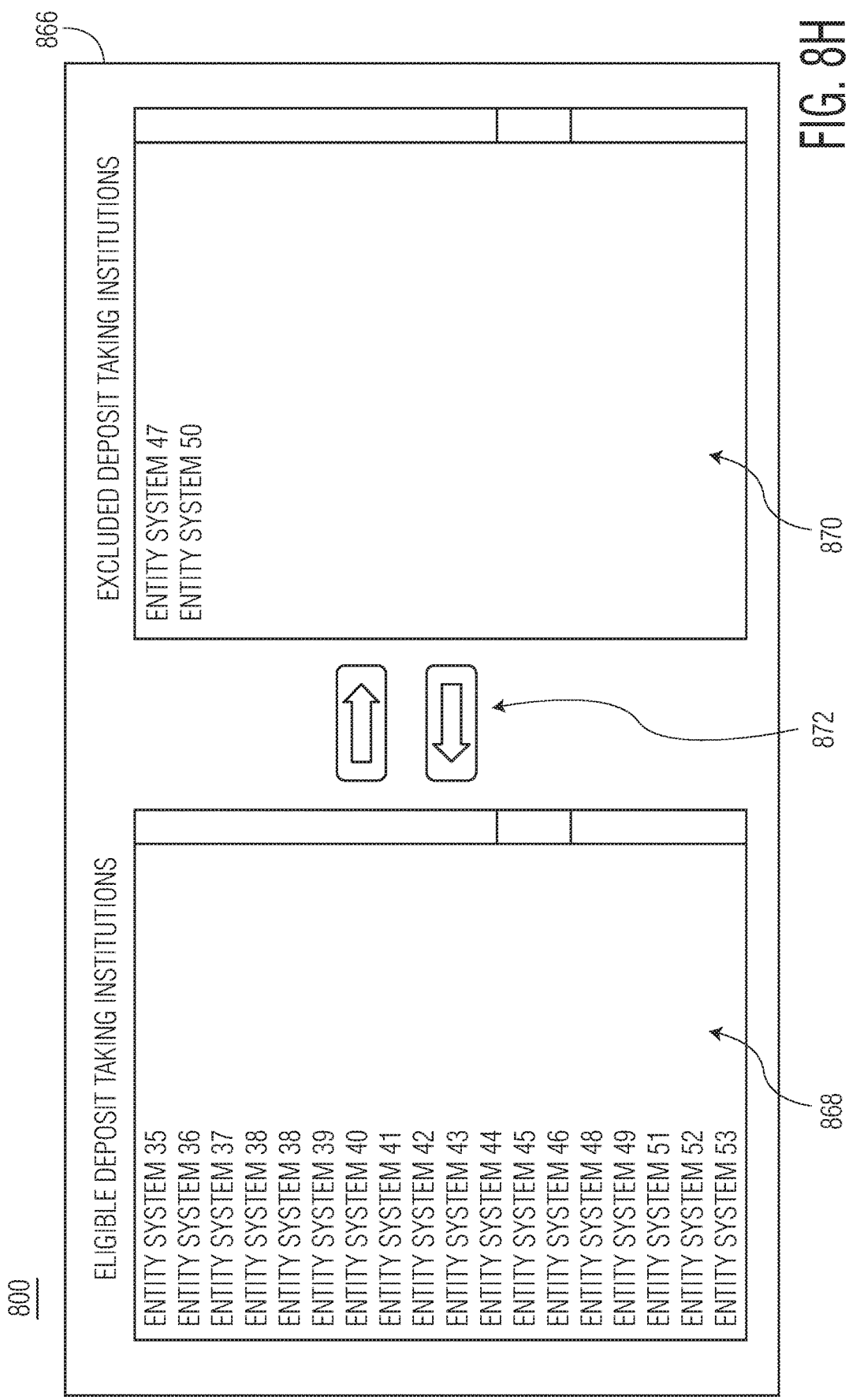
Figure 8L:
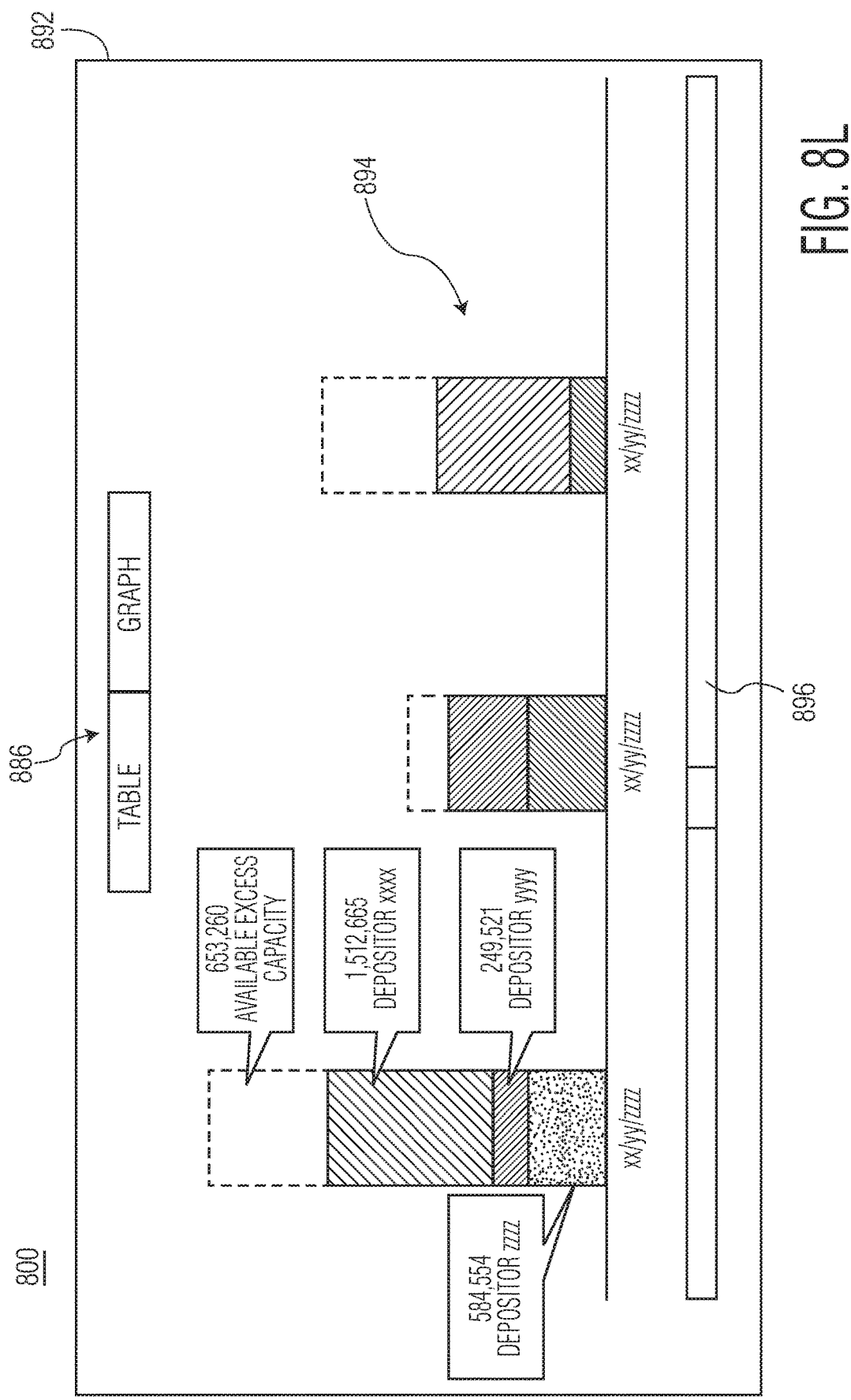

Referring next to FIGS. 8A-8L, example screenshots of portfolio allocation, portfolio management and product funding GUI 800 (referred to herein as GUI 800) are shown. FIGS. 8A-8L illustrate an example of interactive windows (within GUI 800) configured to receive input for creating an optimized allocation of one or more user-customized portfolios (FIGS. 8A-8E), for receiving input for managing user-customized portfolio(s) (FIGS. 8F-8I) and for additional aspects of product management (FIGS. 8J-8L). GUI 800 may be generated via CPM website 114. GUI 800 is an example of an interactive GUI that may comprise one or more windows and/or regions configured to display data associated with one or more user-customizable portfolios, input tools that adjust parameters and characteristics of user-customized portfolio(s) in response to input, dedicated fields that receive textual information, graphical and/or textual indicators that dynamically illustrate the impact of any user adjustments on other portfolio parameters and/or characteristics (i.e., in real-time in response to user adjustments), and one or more selector buttons that guide users in the customization, finalization and management of portfolio(s). Information displayed on GUI 800 may be updated, for example, in real-time, in near real-time, periodically (for example, on a daily basis, on an intraday basis, etc.), based on one or more predetermined schedules, events, etc. In some examples, information displayed on GUI 800 may be updated based on data/information received from entity system(s) 104 via one or more real-time data feed interfaces.

FIG. 8A illustrates an exemplary portfolio allocation screen 802 of GUI 800. Screen 802 may include selection region 804 for providing a user desired portfolio strategy. Selection region 804 may allow a user to input a total amount to deposit for a portfolio strategy (e.g., via textual input), choose a total length of the portfolio strategy (e.g., from a dropdown input tool), choose an interim cash flow frequency for the strategy (e.g., from a dropdown input tool), input a desired cash flow frequency (e.g., via textual input) and choose a primary objective (e.g., from a dropdown input tool). It should be noted that any input device/means/GUI operation may be used to gather user information. In some examples, depending upon user input to one or more questions in selection region 804, screen 802 may be updated to include fewer or additional questions for user input (e.g., in selection region 804, as one more pop-up windows, etc.), in order for automated portfolio optimizer 302 to determine an optimized allocation for the user-customized portfolio.

Screen 802 may also include display region 806 that displays optimized allocation details (e.g., as determined by automated portfolio optimizer 302) based on the user desired portfolio strategy (e.g., as input in selection region 804). Screen 802 may also include display format selector buttons 808 to toggle display region 806 between a table format display of the allocation details (as shown by table results region 810 in FIG. 8A) and a graphical format display of the allocation details (as shown by graphical results region 822 of screen 820 in FIG. 8B). Initially, display region 806 may be empty or include minimal information. Responsive to user input in selection region 804, automated portfolio optimizer 302 may determine an optimized allocation, and display region 806 of screen 802 may be updated to display the allocation results (e.g., as table results region 810 if the selector buttons 808 are initially set to select a table format display).

Table results region 810 may include information on entity system(s) 104 (e.g., bank systems), and portfolio parameters (e.g., tenors and amounts allocated to each bank), as initially determined by CPM server(s) 102 as representing an optimized allocation for the user-customized portfolio. Table results region 810 may include options to adjust the allocation, for example, via one or more selector buttons to add/remove various allocated entities (e.g., selector buttons 834 shown in FIG. 8C), and editable amounts to be allocated to each entity system (e.g., which may be edited via textual input such as shown by editable text box 816). In some examples, the amounts allocated to each bank may be editable such that the total amount can be distributed in a different manner, with the total amount remaining fixed (e.g., $5,000,000). Optionally, table results region 810 may also include areas to display APY and interest data for individual banks. This data for individual entity systems 104 may not be publically displayed (e.g., if the data is considered to be confidential for a particular entity system 104 such as a bank system), but may be privately displayed if the user is an authorized user, (e.g., of a particular bank system). In some examples, table results region 810 may publically display a blended APY and total interest (e.g., for all banks as allocated). Table results region 810 may further include a scroll bar 812 for scrolling through the table entries.

As data is entered into any of the input fields noted above, display region 806 may be automatically updated to reflect such input. Screen 802 may also include a "buy" button 814 to confirm acceptance of the allocation shown in display region 806.

FIG. 8B illustrates an exemplary portfolio allocation screen 820 of GUI 800, which may be displayed if a graphical display format option among display format selector buttons 808 is selected. Screen 820 may include graphical results region 822 in display region 706. Graphical results region 822 may display entity system(s) and amounts allocated to each in any suitable graphical format (e.g., a pie chart). In one example, an entity system and individual information displayed in graphical results region 822 may be similar to the information in table results region 810 (FIG. 8A). It may be appreciated that the display of allocation information in a graphical format may provide a more intuitive overview of the allocations, particularly as the number of entity system(s) included in the allocation increases.

FIG. 8C illustrates an exemplary portfolio allocation screen 830 of GUI 800, which may be displayed if a user selects selector button(s) 834 to remove one allocated entity system (e.g., bank 5, as shown in FIG. 8A) and to add bank 22 (indicated by element 836).

FIG. 8D illustrates an exemplary pop-up window 838 of GUI 800 which may be displayed (e.g., over screen 830) if the user selects "Buy" button 814, and chooses the allocation shown in display region 806 in screen 830. Pop-up window 838 may include user input tools to confirm saving of the allocation and opening of the account(s) in the allocation.

FIG. 8E illustrates another example portfolio allocation screen 840 of GUI 800 which may be displayed if a user inputs particular information into selection region 804. In this example, based on the user input in selection region 804, automated portfolio optimizer 302 may determine that staggered maturities should be allocated (e.g., a ladder strategy) in order to meet the needs of the user. The optimized allocation (determined by automated portfolio optimizer 302) may be presented in table results region 842 of display region 806. For example, in a ladder strategy, a user can select regular terms (e.g., periodic tenors such as monthly tenors) and CPM server(s) 102 may optimize the portfolio based on the user's selections. In one example, staggering time deposit maturities (as shown in FIG. 8E), may create a ladder which may be useful to cover any salary liabilities. In another example (not shown), a user may select a barbell portfolio strategy, by choosing more short-term maturities and assigning higher balances to these maturities. This type of strategy may be useful when a user expects (e.g., with a high degree of certainty), that short-term interest rates could rise significantly in the medium run. In the barbell strategy, in order to maximize investment returns, short-term duration maturities may be preferred (which may be reinvested upon maturity). Long-duration products may also be used in this strategy, whereas intermediate-duration products may not be desired.

FIG. 8F illustrates an exemplary account management screen 850 of GUI 800. Account management screen 850 may include one or more selectable tabs 852 for presenting information associated with a user, including, without being limited to, user information, contact information, funding/payment information, account information and documentation. Account management screen 850 may display account review region 854 when the "Review" tab of selectable tabs 852 is selected. Account review region 854 may display account information associated with a user, such as (without being limited to) various entity system(s) 104 (e.g., bank(s)) for which the user may have an account, an allocated amount, term and APY for each entity system, a total amount allocated across the entity system(s) 104 and/or a blended APY. In some examples, the account information may be associated with account(s) of product(s) in a particular user-customized portfolio. In some examples, individual APY data (or other particular data) may not be publically displayed (e.g., if the data is considered to be confidential for a particular entity system), but may be privately displayed if the user is an authorized user (e.g., for a particular bank).

FIG. 8G illustrates an exemplary portfolio manager screen 856 of GUI 800. Screen 856 may include portfolio summary region 858 for displaying one or more portfolios (e.g., user-customized portfolio(s)) associated with a user, for example in a list view. Portfolio summary region 858 may display summary information for each portfolio including, for example, portfolio name, portfolio description, start date, end date, original balance, matured principal, live principal, blended APY and accrued interest.

Portfolio summary region 858 may also include selector tool 860 associated with each listed portfolio (e.g., a toggle selector tool). Selector tool 860 may allow a user to choose between displaying summary information (as shown in portfolio summary region 858) for each portfolio and displaying detailed information on all products (e.g., time deposits) in an individual portfolio (as shown in detailed portfolio region 862). Screen 856 may be updated to present or hide detailed portfolio region 862, responsive to user input via selector tool 860. Detailed portfolio region 862 may also include product management tools 864 for providing management functions for each individual product (e.g., from a dropdown input tool). Product management tool 864 may allow a user to perform various self-service functions including, but not limited to functions relating to product details, holds, early withdrawal and statements.

FIG. 8H illustrates an exemplary entity system exclusion screen 866 of GUI 800. Screen 866 may include first region 868, second region 870 and entity selector tools 872 for including and/or excluding individual entity systems from a portfolio. First region 868 may display one or more selectable eligible entity systems associated with a portfolio. Second region 870 may display any entity systems to be excluded from a portfolio. Entity selector tools 872 allow a user to select any selectable eligible entity systems in first region 868 and move the selected entity system(s) to second region 870, in order to exclude the selected eligible entity system(s) from the portfolio. Entity selector tools 872 may also allow a user to select excluded entity system(s) displayed in second region 870 and move the selected excluded entity system(s) to first region 868, for inclusion in the portfolio.

FIG. 8I illustrates an exemplary revenue setting screen 874 of GUI 800. Screen 874 may include selection region 876 for providing user input for managing revenue associated with one or more portfolio. Selection region 876 may allow a user (e.g., a distribution partner such as a bank, a financial intermediary, an advisor, etc.) to input a maximum revenue (e.g., via textual input), choose whether a portion of revenue is held by a relationship manager (e.g., via selector buttons) and/or input a maximum discount the relationship manager can provide to a user (e.g., via textual input). In some examples, selection region 876 may allow a user to input additional information (e.g., via a link) if revenue is different depending on tenor or some other parameter(s). In some examples, user-facing screens (e.g., for a depositor, an advisor, etc.) may display net-net-net interest rates comprising a net of any administrator fee, a net of any distribution partner fees and a net of any relationship manager discount. In an illustrative example, a blended APY offered to a depositor for a one-year strategy may be 1.06%. The blended APY may have been 1.31% without any fees (e.g., 0.15% for a distribution partner and 0.10% for an administrator fee). For a client rate of 1.06%, the client rate becomes 1.11% with a full relationship manager discount.

FIG. 8J illustrates an exemplary pricing console screen 878 of GUI 800 for product funding by administrators of entity system(s) 104 (e.g., depository institutions such as banks, credit unions, etc.). In an example, a depository institution may include any entity system 104 that is willing to accept deposits. Screen 878 may include selection region 880 for providing user input for funding a product. Selection region 880 may allow an administrator to input (e.g., via textual input), for each parameter (e.g., tenor), other parameters/variables, such as an APY (e.g., how much the depository institutions is willing to pay for each term), a minimum amount of desired funding (e.g., a minimum target deposit size for each term), a maximum total amount of desired funding (e.g., a maximum combined deposit size for each term), etc. Screen 878 may also include display region 882 that displays capacity information for each term (e.g., how much total allowed capacity for each term has been fulfilled and how much capacity is remaining). The capacity information may be determined by CPM server(s) 102 based on the user input in screen 878 (e.g., as input in selection region 880). For example, in display region 882, the value "0" under "Remaining" may indicate that a maximum allocation has been reached and that there is no remaining capacity.

FIG. 8K illustrates an exemplary maturity report screen 884 of GUI 800. Maturity report screen 884 may be used by administrators of entity system(s) 104 (e.g., depository institutions such as banks, credit unions, etc.) for reviewing details for all issued products (e.g., time deposits) in a single location. Screen 884 may include display region 888 that displays all expected future outflows by a date when the funds are expected to flow out and depositor(s) to which funds will be disbursed. Display region 888 may display details including (without limit) maturity date, outflow, principal, expected interest, remaining capacity, depositor, etc. In some examples, display region 888 may include selector tool 890 (e.g., a toggle tool) if the maturities for a given product include more than one depositor (e.g., "Various"). Selector tool 890 may allow an administrator to display either an overview of the maturity balance or details of the maturity balance by individual depositor.

Screen 884 may also include display format selector buttons 886 to toggle between table and graphical formats. Screen 884 may include display region 888 showing information in a table format (e.g., when the table format option among display format selector buttons 886 is selected), or in any other desired format (e.g., list, chart, etc.).

FIG. 8L illustrates an exemplary maturity report screen 892 of GUI 800, which may be displayed if a graphical display format option among display format selector buttons 886 is selected. Screen 892 may include display region 894 for displaying maturities information (similar to the information presented in display region 888 of FIG. 8K) in a graphical format (e.g., as bar graphs). Screen 892 may include one or more scroll bars 896 for scrolling through the information displayed in display region 894.

Although exemplary sections/windows are depicted in FIGS. 8A-8L, alternative configurations for the sections/windows are envisioned. For example, GUI 800 may include more or fewer sections, windows, webpages and/or tabs. Additionally, the sections/windows may be reorganized in any manner and display any pertinent information.

In some examples, dynamic portfolio offering GUI 700, GUI 800 may be presented to any number and any types of users (e.g., account administrators via entity system(s) 104, personal investors of user devices 106, etc.) of the system. GUI 800 may be configured with transparent and intuitive graphic tools with simple and easy to follow steps that may generate clear on-screen descriptions and simulations of portfolio allocation and portfolio management tools. The result is an improved user interface device providing new and powerful functionality.

In some examples, customized portfolio builder 116 may provide interactive interface(s) between various entity system(s) 104 and user device(s) 106. Customized portfolio builder 116 may optionally be configured to connect various distributers (e.g., computer systems associated with banks, brokers/dealers, registered investment advisors (RIAs), etc.) to various depository institutions (e.g., computer systems associated with banks). The distributers may be further connected to one or more depositors (e.g., computer systems associated with individual users, businesses, municipalities, trusts, endowments, foundations, etc.). In some examples, entity system(s) 104 may represent depository institutions. Additionally and/or alternatively, entity system(s) 104 may represent distributers. In some examples, user device(s) 106 may represent distributers and/or depositors. In one non-limiting example, a distributer (e.g., via user device 106-1) may input a depositor's desired portfolio strategy into customized portfolio builder 116 (e.g., a web interface). Based on the selections, customized portfolio builder 116 may automatically display, in real-time, participating depository institutions and a blended APY that is available, where portions of this information may be provided via a live data feed. The distributer may also be notified if any of the depository institutions has already received funds from the institution as an insurance limit may have been reached.

Referring next to FIGS. 9A-9G, example screenshots of administrator GUI 900 are shown. In some examples, administrator GUI 900 may be generated via automated lifecycle processing system 120. Administrator GUI 900 is an example of an interactive GUI that may comprise one or more windows and/or regions configured to display monitoring data and alerts associated with various processing tasks by CPM server(s) 102, and one or more selector buttons to guide administrators in the monitoring of processes. Information displayed on administrator GUI 900 may be updated, for example, in real-time, in near real-time, periodically (for example, on a daily basis, on an intraday basis, etc.), based on one or more predetermined schedules, events, etc.

Figure 9A:

FIG. 9A illustrates an exemplary principal monitoring screen 902 of administrator GUI 900. Screen 902 may include region 904 for selecting filter criteria such as data control buttons. Screen 902 may also include display region 906 for displaying status information on various tasks and datasets. The principal monitoring screen 902 may provide for easy navigation including date control buttons (e.g., in region 904) and the ability to display a high-level status (e.g., in display region 906) across multiple database instances, and the different tasks and data sets within each. As shown further in FIG. 9B, data in display region 906 may be selectable, such that selection of particular data may cause generation and/or display of additional information, such as in an additional region.

FIG. 9B illustrates an exemplary screen 910 of administrator GUI 900. Screen 910 may include region 912 for displaying selectable data (similar to display region 906 in FIG. 9A). Screen 910 may also illustrate additional detail region 914 that may be displayed responsive to selection of particular data in display region 912. In this manner, screen 910 may allow users to quickly drill-down on the details of any particular set of automated processing tasks to identify the granular status details of the underlying processing tasks.

Figure 9C:
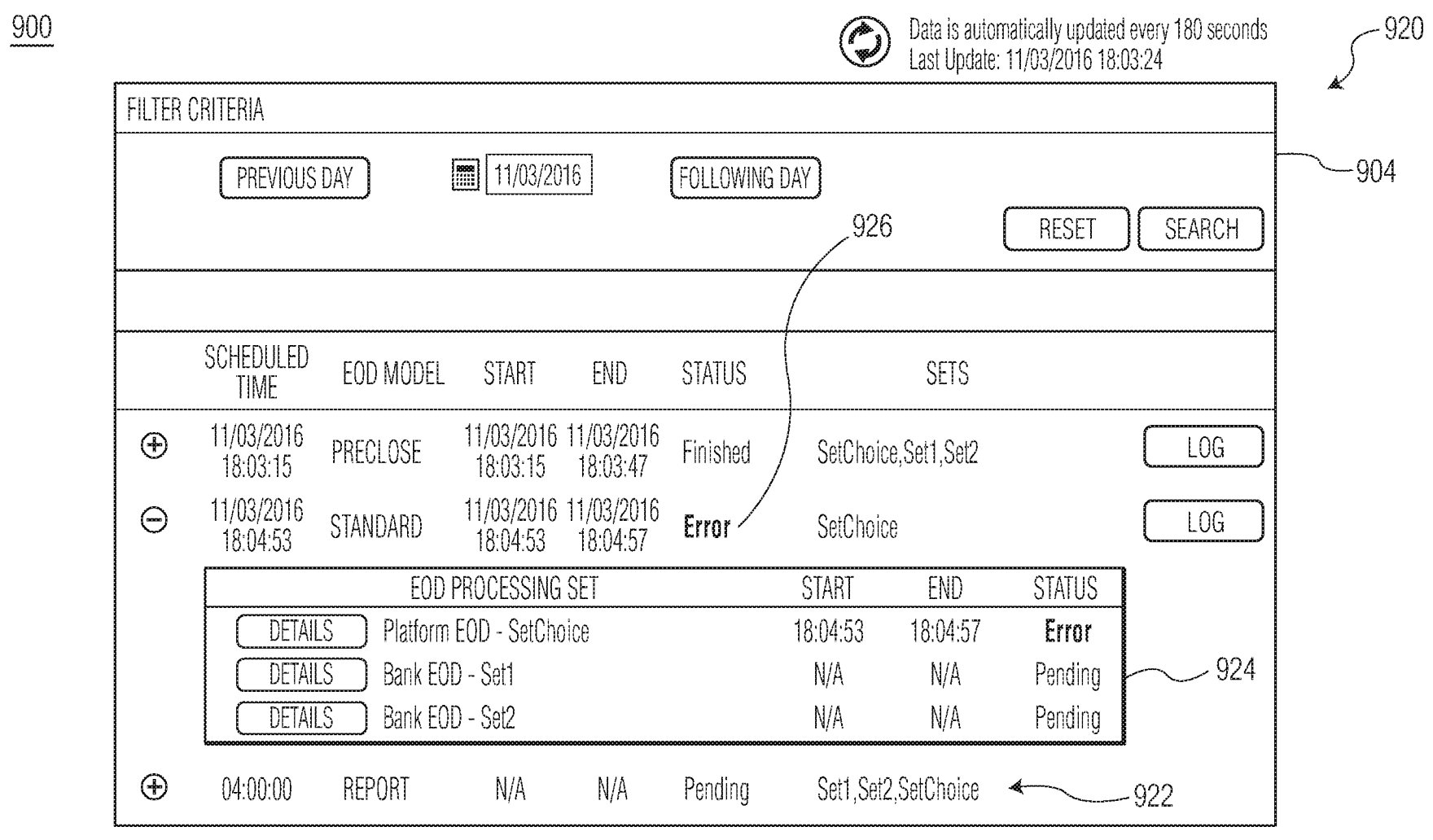

FIG. 9C illustrates an exemplary screen 920 of administrator GUI 900. Screen 920 includes display region 922 and detail region 924 which may display additional detail when particular data is selected in display region 922. Screen 920 may also illustrate that information in display region may display status error indications, such as indication 926. As in screen 910 (FIG. 9B), screen 920 may provide users with navigation ability that allows for rapid identification of the status of any identified incident (e.g., via indication 926).

Figure 9E:
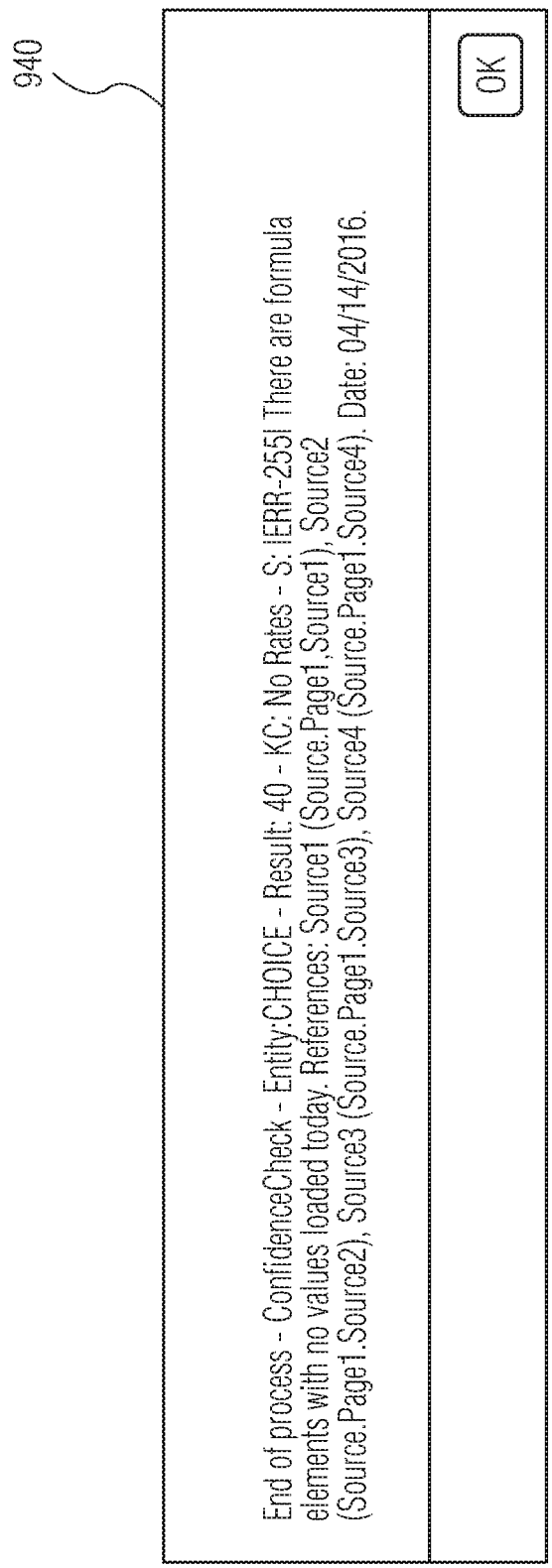

FIG. 9D illustrates an exemplary screen 930 of administrator GUI 900. Screen 930 may include search region 932 for performing a search for a task. Screen 930 may also include display region 934 for displaying search results. Search region 932 may provide users with direct access the associated details of a task in question without requiring the user to have knowledge of the structure of the log entries. FIG. 9E illustrates additional information box 940 that may be displayed (e.g., on a separate window, in a pop-up window, as another region within screen 930, etc.) when the user selects button 936 in screen 930 (FIG. 9D) for a particular task in display region 934.

FIG. 9F illustrates an exemplary screen 950 of administrator GUI 900. Screen 950 may include region 952 for general monitoring of the progress and status of scheduled tasks. Screen 950 may also include display region 954 for providing direct access to the details of all scheduled processes and their status.

FIG. 9G illustrates an exemplary screen 960 of administrator GUI 900. Screen 960 may be similar to screen 950 (FIG. 9F), except that display region 964 may include detail region 966. Detail region 966 may be displayed responsive to selection of particular data in display region 964. In this manner, screen 960 may provide users with the ability to immediately drill-down and access user-friendly details (e.g. in detail region 966).

Figure 10:
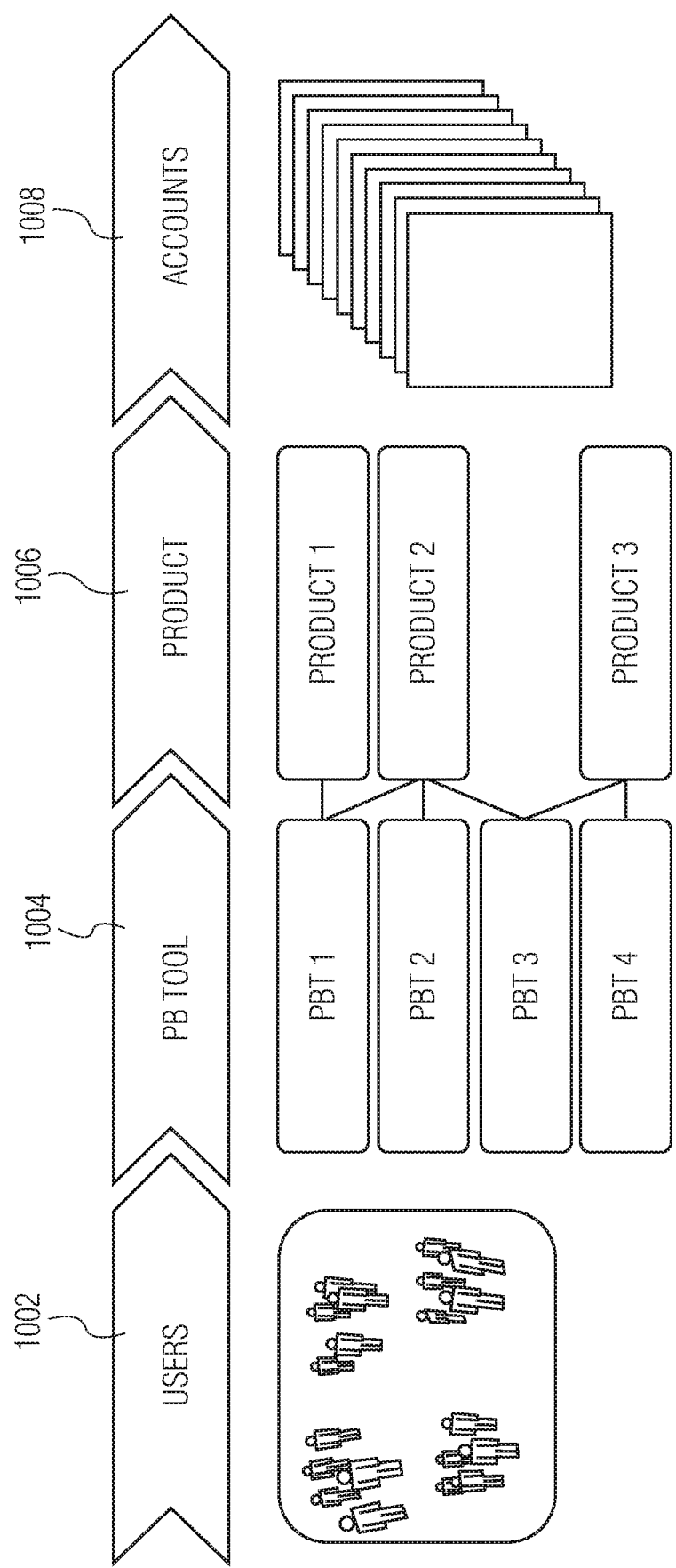
FIG. 10 is an example diagram illustrating a method of creating products using product builder tools according to an aspect of the present disclosure.

Referring next to FIG. 10, a diagram illustrating an example of creating products using multiple PB tool(s) 206 is shown. Various users 1002 (e.g., clients) may access and customize baseline products through the use of PB tool(s) 1004. The resulting customized products 1006 may then be associated with personalization account(s) 1008 administered by entity system(s) 104 (e.g., a banking institution). This association of customized product(s) 1006 to personalization account(s) 1008 facilitates the entity system's 104 ability to manage the customized product(s) 1006 throughout their respective lifecycles. This is because, in one aspect, the association enables the entity system(s) 104 to relate any number of customized products 1006 back to their respective underlying baseline product (or baseline product catalogue), which in turn enables the entity system(s) 104 to process/manage the customized products 1006 similarly, without any incremental system processing overhead. In other words, customized products 1006 having a common underlying baseline product may be processed similarly, with little to no additional system processing overhead requirements. For example, customized Product 1 may result from customization of an underlying baseline product using PB tool (PBT) 1; customized Product 2 may result from customization of an underlying baseline product by using a combination of PBT 1, PBT 2 and PBT 3; and customized Product 3 may result from customization of an underlying baseline product by using a combination of PBT 3 and PBT 4. It is understood that FIG. 10 represents a non-limiting example for customizing underlying baseline products using PB tools 1004 (or PB tools 206).

Figure 12:
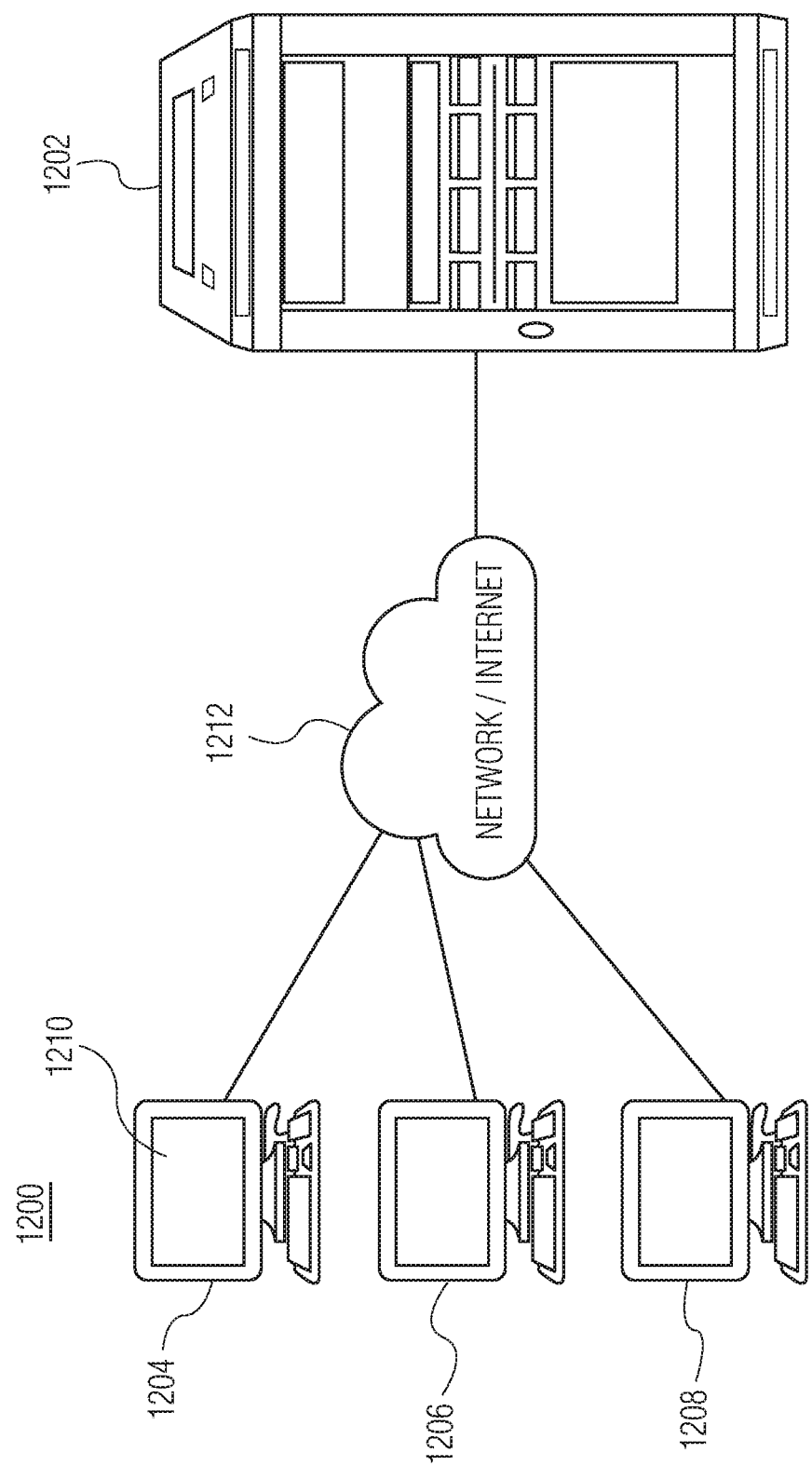
FIG. 12 is a functional block diagram illustrating an example data structure management system according to an aspect of the present disclosure.

Referring next to FIG. 12, an example data structure management system 1200 is shown, according to an aspect of the present disclosure. In some examples, system 1200 may be configured to create and manage user-customized portfolios. In a non-limiting example described below, the user-customized portfolios may include customized time deposit portfolios. System 1200 may include one or more computing devices 1202-1208 in communication with each other, via, for example, wired or wireless communications network 12012. Although not shown in FIG. 12, each computing device 1202-1208 may include memory for storing instructions, at least one processor for executing instructions and at least one communication component (e.g., for sending and receiving data/information). In some examples, computing devices 1202-1208 may communicate and interact as peers, such as in a peer-to-peer network. In some examples, computing devices 1202-1208 may communicate in a client-server relationship. For example, one of the computing devices (e.g., computing device 1202) may operate as a centralized server that may provide data, program functions, security, etc. to the remainder of the group of devices (e.g., computing devices 1204-1208) that may operate as clients. In either scenario, computing devices 1202-1208 may reside at a single physical location (e.g., at centralized financial entity), or across multiple, physically separated locations (e.g., across one or more entity systems 104 and/or one or more user locations).

At least one of computing devices 1202-1208 may comprise instructions that when executed, causes system 1200 (via one or more of computing devices 1202-1208) to create a plurality of user-customized time deposit portfolios. Each portfolio may include a combination of baseline product structures (e.g., financial products such as time deposits). Each baseline product structure may begin as a baseline product, where the baseline product may include a combination of one or more underlying product components. The underlying product component(s) may include one or more customizable component parameters. The customizable component parameters, when adjusted, may define the structure and characteristic(s) of each product structure.

To create user-customized portfolios, one or more of computing devices 1202-1208 may include instructions for creating one or more combinations of baseline financial products by combining one or more underlying product components. In one embodiment, at least one of computing devices 1202-1208 may be configured to create different baseline financial products, each comprising a different combination of underlying product components. Once at least one baseline financial product has been created, one or more of computing devices 1202-1208 may create one or more user-customized time deposit portfolios by dynamically adjusting, in response to user-defined input, one or more customizable parameters of at least one of the underlying product components of the at least one of the baseline financial product, as discussed above.

In one embodiment, at least one computing device 1202-1208 may further include a display 1210 and instructions for automatically calculating certain portfolio characteristics (e.g., an adjusted yield, interest amount, etc.). In some examples, calculation of the portfolio characteristics may be dynamically adjusted based on (without being limited to) at least one of portfolio parameters (e.g., portfolio time deposit maturities, a monetary value of each event as introduced into the system by the user, etc.).

In such an embodiment, display 1210 may be configured to dynamically display a graphical and/or numerical representation of certain portfolio characteristics (e.g., scheduled liquidity events, adjusted yield, interest amount, etc.) that change as one or more parameters are adjusted via, for example, a user input device. In some examples, such a computing device 1202-1208 may be configured to: automatically prepare and display a summary report reflecting one or more adjusted parameters associated with each user-customized portfolio (e.g., time deposit portfolio(s)); receive user input confirming each of the adjusted parameters; and issue user-customized product structures (e.g., time deposits) in the portfolio in response to user input confirmations.

In an exemplary embodiment, each underlying baseline product component may comprise one or more component elements that may define the product behavior and may define the impact of user-customized inputs on the portfolio characteristics (e.g., portfolio strategy such as a calculated time deposit strategy, interim, final tenor(s), etc.). Non-limiting examples of component elements may include: present value of money, interest rate factor, sum of interest payment values, frequency, number of payments, etc. Non-limiting examples of baseline product-specific elements may include: tenor, base parameter, dynamic texts, return tables, return values, and others.

Optionally, one or more of computing devices 1202-1208 may comprise instructions for executing certain post-issue operations. In one embodiment, for example, at least one device among computing devices 1202-1208 may include instructions that, when executed, cause system 1200 to receive settlement details (in response to issuing one or more user transactions), and to assign a settlement amount, based on the settlement details, for at least one baseline product. In addition, the device (among computing devices 1202-1208) may be configured to aggregate the transactions and underlying characteristics (e.g., liquidity events and amounts) on a real-time basis in order to enable at least one of entity system(s) 104 to monitor aggregate volumes by a particular parameter such as tenor. Moreover, the entity system (e.g., entity system 104-1) may interactively adjust product characteristics such as interest rate curve(s) and/or offered frequency/tenor combinations in order to control the volume of deposits for specific tenors, or all tenors, as determined by the entity system (e.g. based on funding and asset and liability management needs of the entity system). Any such change, once it is approved and published, may have an immediate effect on the product catalogue and the variety of baseline product portfolio(s) presented to users via computing device(s) 1202-1208.

Systems and methods of the present disclosure may include and/or may be implemented by one or more specialized computers including specialized hardware and/or software components. For purposes of this disclosure, a specialized computer may be a programmable machine capable of performing arithmetic and/or logical operations and specially programmed to perform the functions described herein. In some embodiments, computers may comprise processors, memories, data storage devices, and/or other commonly known or novel components. These components may be connected physically or through network or wireless links. Computers may also comprise software which may direct the operations of the aforementioned components. Computers may be referred to as servers, personal computers (PCs), mobile devices, and other terms for computing/communication devices. For purposes of this disclosure, those terms used herein are interchangeable, and any special purpose computer particularly configured for performing the described functions may be used.

Computers may be linked to one another via one or more networks. A network may be any plurality of completely or partially interconnected computers wherein some or all of the computers are able to communicate with one another. It will be understood by those of ordinary skill that connections between computers may be wired in some cases (e.g., via wired TCP connection or other wired connection) or may be wireless (e.g., via a WiFi network connection). Any connection through which at least two computers may exchange data can be the basis of a network. Furthermore, separate networks may be able to be interconnected such that one or more computers within one network may communicate with one or more computers in another network. In such a case, the plurality of separate networks may optionally be considered to be a single network.

The term "computer" shall refer to any electronic device or devices, including those having capabilities to be utilized in connection with electronic financial entity systems, such as any device capable of receiving, transmitting, processing and/or using data and information. The computer may comprise a server, a processor, a microprocessor, a personal computer, such as a laptop, palm PC, desktop or workstation, a network server, a mainframe, an electronic wired or wireless device, such as for example, an on-site computing device specially configured for a particular entity system 104, a telephone, a cellular telephone, a personal digital assistant, a smartphone, an interactive television, such as for example, a television adapted to be connected to the Internet or an electronic device adapted for use with a television, an electronic pager or any other computing and/or communication device.

The term "network" shall refer to any type of network or networks, including those capable of being utilized in connection with data structure management systems and methods described herein, such as, for example, any public and/or private networks, including, for instance, the Internet, an intranet, or an extranet, any wired or wireless networks or combinations thereof.

The term "computer-readable storage medium" should be taken to include a single medium or multiple media that store one or more sets of instructions. The term "computer-readable storage medium" shall also be taken to include any medium that is capable of storing or encoding a set of instructions for execution by the machine and that causes the machine to perform any one or more of the methodologies of the present disclosure.

Figure 13:
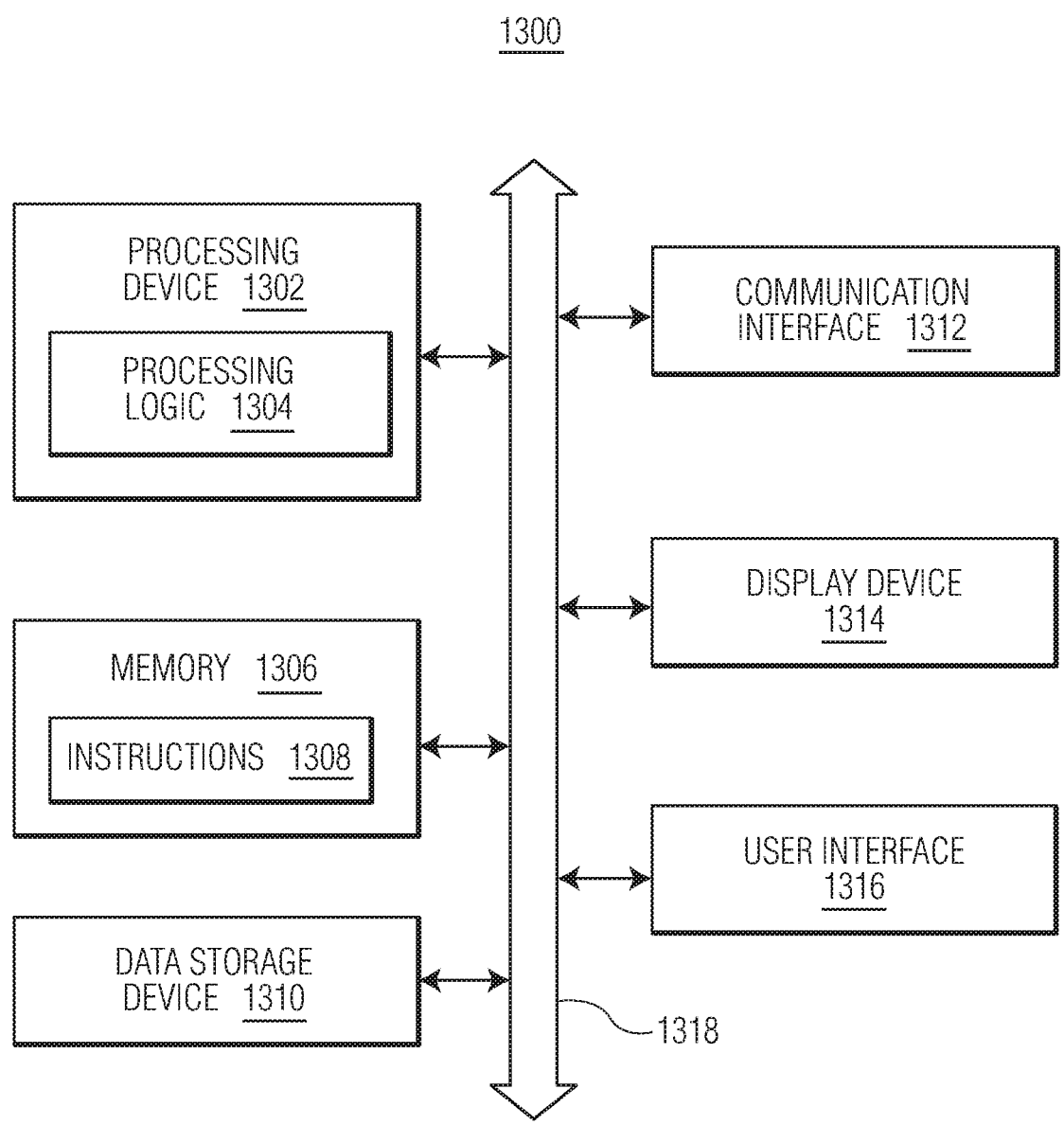
FIG. 13 is a functional block diagram of an example computer system according to an aspect of the present disclosure.

FIG. 13 illustrates a functional block diagram of a machine in the example form of computer system 1300 within which a set of instructions for causing the machine to perform any one or more of the methodologies, processes or functions discussed herein may be executed. In some examples, the machine may be connected (e.g., networked) to other machines as described above. The machine may operate in the capacity of a server or a client machine in a client-server network environment, or as a peer machine in a peer-to-peer (or distributed) network environment. The machine may be any special-purpose machine capable of executing a set of instructions (sequential or otherwise) that specify actions to be taken by that machine for performing the functions describe herein. Further, while only a single machine is illustrated, the term "machine" shall also be taken to include any collection of machines that individually or jointly execute a set (or multiple sets) of instructions to perform any one or more of the methodologies discussed herein. In some examples, one or more components of CPM server(s) 102 (middleware engine 108, security management system 110, centralized database structure(s) 112, CPM website 114, customized portfolio builder 116, allocation engine 118 and/or automated lifecycle processing engine 120), entity system(s) 104 and/or user device(s) 106 may be implemented by a specialized machine, particularly programmed to perform certain functions, such as the example machine shown in FIG. 13 (or a combination of two or more of such machines).

Example computer system 1300 may include processing device 1302, memory 1306, data storage device 1310 and communication interface 1312, which may communicate with each other via data and control bus 1318. In some examples, computer system 1300 may also include display device 1314 and/or user interface 1316.

Processing device 1302 may include, without being limited to, a microprocessor, a central processing unit, an application-specific integrated circuit (ASIC), a field programmable gate array (FPGA), a digital signal processor (DSP) and/or a network processor. Processing device 1302 may be configured to execute processing logic 1304 for performing the operations described herein. Processing device 1302 may include a special-purpose processing device specially programmed with processing logic 1304 to perform the operations described herein.

Memory 1306 may include, for example, without being limited to, at least one of a read-only memory (ROM), a random access memory (RAM), a flash memory, a dynamic RAM (DRAM) and a static RAM (SRAM), storing computer-readable instructions 1308 executable by processing device 1302. Memory 1306 may include a non-transitory computer readable storage medium storing computer-readable instructions 1308 executable by processing device 1302 for performing the operations described herein. For example, computer-readable instructions 1308 may include operations performed by components 108-122 of CPM server(s) 102, including operations shown in FIGS. 5 and 6. Although one memory device 1306 is illustrated in FIG. 13, in some examples, computer system 1300 may include two or more memory devices (e.g., dynamic memory and static memory).

Computer system 1300 may include communication interface device 1312, for direct communication with other computers (including wired and/or wireless communication) and/or for communication with a network. In some examples, computer system 1300 may include display device 1314 (e.g., a liquid crystal display (LCD), a touch sensitive display, etc.). In some examples, computer system 1300 may include user interface 1316 (e.g., an alphanumeric input device, a cursor control device, etc.).

In some examples, computer system 1300 may include data storage device 1310 storing instructions (e.g., software) for performing any one or more of the functions described herein. Data storage device 1310 may include a non-transitory computer-readable storage medium, including, without being limited to, solid-state memories, optical media and magnetic media.

While the present disclosure has been discussed in terms of certain embodiments, it should be appreciated that the present disclosure is not so limited. The embodiments are explained herein by way of example, and there are numerous modifications, variations and other embodiments that may be employed that would still be within the scope of the present disclosure.

The invention claimed is:

1. A system comprising:
at least one computer server configured to communicate with one or more entity systems and at least one user device, the at least one computer server comprising at least one memory storing computer-readable code and at least one processor executing the computer-readable code, thereby causing the at least one computer server to:
receive, via one or more data feed interfaces, one or more baseline data structures from among the one or more entity systems, each of said one or more baseline data structures comprising a combination of one or more pre-defined components and one or more pre-defined parameters associated with one or more non-tradeable deposit products;
generate an interactive graphical user interface (GUI) on a display of the at least one user device, the interactive GUI comprising one or more screens;
apply one or more dynamic filter rules to the one or more baseline data structures to generate a list of baseline data structures that is based, at least in part, on a geographic characteristic that is associated with one or more of the at least one user device and a user of the at least one user device, said dynamic filter rules comprising said geographic characteristic;
display, via the interactive GUI, one or more combinations, each of which comprises a combination of one or more baseline data structures among the list of baseline data structures;
display, via the interactive GUI, one or more user adjustment tools for customizing variables of the one or more combinations, said variables comprising at least one of a deposit strategy and a customizable parameter among said pre-defined parameters;
receive, from the at least one user device via the interactive GUI, at least one adjustment indication via the one or more user adjustment tools;
adjust, responsive to the at least one adjustment indication, at least one of said variables, thereby forming a user-customized configuration of a user-customized combination;
dynamically update and display, via the interactive GUI, said adjusting and an impact of said adjusting on at least one other variable as said adjusting occurs;
receive, from the at least one user device via the interactive GUI, input comprising a confirmation indication of the user-customized configuration; and
create and issue the user-customized combination of baseline data structures responsive to the confirmation indication received from the at least one user device via the interactive GUI.

2. The system of claim 1, wherein the one or more combinations are received from the one or more entity systems via the one or more data feed interfaces.

3. The system of claim 1, wherein the at least one computer server is configured to create the one or more combinations.

4. The system of claim 1, wherein the interactive GUI includes a selection tool to select among the one or more displayed combinations to customize.

5. The system of claim 4, wherein the one or more dynamic filter rules restrict a selection of combinations among the one or more combinations presented on said display.

6. The system of claim 1, the system further comprising an allocation engine that automatically determines and assigns, responsive to the confirmation indication and prior to issuing the user-customized combination, an optimal combination of baseline data structures from among the list of baseline data structures for inclusion in the user-customized combination,
wherein the interactive GUI displays said optimal combination of baseline data structures on the at least one user device.

7. The system of claim 6, wherein:
the interactive GUI receives, from the at last one user device, one of a first input comprising a confirmation indication of the optimal combination of baseline data structures and a second input comprising one or more modification indications to the optimal combination of baseline data structures, and
the system issues the user-customized combination with an allocation in accordance with one of the first input and the second input.

8. The system of claim 1, wherein the interactive GUI receives live data as input, via a live data feed, and adjusts at least one of the variables in real-time responsive to said received live data.

9. The system of claim 1, wherein the interactive GUI automatically generates and displays one or more summary reports reflecting all adjustments to said variables to create the user-customized combination.

10. The system of claim 1, wherein:
the one or more non-tradeable deposit products comprise one or more time deposit products, each time deposit product comprising a rate curve defined as a combination of available tenors and interest rates,
the deposit strategy comprises at least one of a barbell, a ladder, a bullet and a combination thereof, and
the one or more pre-defined parameters comprise at least one of a total deposit amount, a yield, total interest amount to be received, a schedule of time deposit maturities, a final maturity, a maximum strategy maturity, a renewal strategy and a rollover strategy.

11. The system of claim 10, comprising an automated data handling system that automatically initiates and executes one or more lifecycle routines post-issuance of the user-customized combination.

12. The system of claim 11, wherein the one or more lifecycle routines include at least one of funding and formulation across one or more funding systems, generating and transmitting details of the user-customized combination to one or more servers, classification of the user-customized combination, generation of accounting entries, generation of regulatory and fiscal reports, generation of analytical reports, data storage, initiating transactions, scheduling maturity events, conducting settlements, conducting one or more renewals, conducting one or more rollovers, automated end-of-day operations, and generation of one or more processing actions for further downstream processing.

13. The system of claim 1, further comprising a further interactive GUI that at least one of displays information associated with one or more data processing tasks and provides a search interface for searching of the one or more data processing tasks of the at least one computer server, said information including at least one of a progress and a status of the one or more data processing tasks.

14. The system of claim 1, wherein the interactive GUI further comprises one or more builder tools that generates the interactive GUI and dynamically refreshes the one or more screens of the interactive GUI.

15. The system of claim 1, wherein the one or more data feed interfaces corresponds to one or more real-time data feeds between the at least one computer server and the one or more entity systems.

16. A non-transitory computer-readable medium storing computer readable instructions that, when executed by one or more processing devices, cause the one or more processing devices to perform the functions comprising:
generating an interactive graphical user interface (GUI) on a display of at least one user device, such that the interactive GUI comprises:
one or more screens, at least one of the one or more screens comprising a user adjustment region, a display region, and a user confirmation region,
the display region displays a combination comprising a combination of one or more baseline data structures, each of the one or more baseline data structures comprising a combination of one or more pre-defined data structure components and one or more pre-defined parameters associated with one or more non-tradeable deposit products, the one or more baseline data structures received from among one or more entity systems via one or more data feeds, the display region displaying characteristics of the combination in a graphical format and a textual format, and
the user adjustment region comprises one or more user adjustment tools for customizing variables of the combination, said variables comprising at least one of a deposit strategy and a customizable parameter among said pre-defined parameters, wherein the computer readable instructions further cause the interactive GUI to:
apply one or more dynamic filter rules to the one or more baseline data structures to generate a list of baseline data structures that is based, at least in part, on a geographic characteristic that is associated with one or more of the at least one user device and a user of the at least one user device, said dynamic filter rules comprising said geographic characteristic,
display, in the display region, one or more combinations, each of which comprises a combination of one or more baseline data structures among the list of baseline data structures,
receive, via the one or more user adjustment tools in the user adjustment region, at least one adjustment indication, from the at least one user device,
adjust, responsive to the at least one adjustment indication, at least one of said variables, thereby forming a user-customized configuration of a user-customized combination,
dynamically update the display region and display said adjusting and an impact of said adjusting on at least one other variable as said adjusting occurs, thereby dynamically modifying the characteristics of said combination,
receive, via the user confirmation region, from the at least one user device, input comprising a confirmation indication of the user-customized configuration, and
display details of the user-customized combination of baseline data structures once said user-customized combination is created and issued responsive to the confirmation indication.

17. The non-transitory computer-readable medium of claim 16, wherein the at least one screen further comprises a report generation selector, selection of said report generation indication configured to generate and display one or more summary reports reflecting all adjustments to said variables to create the user-customized combination.

18. The non-transitory computer-readable medium of claim 16, the interactive GUI further comprising a further region, presented in at least one of the one or more screens, the further region configured to display information on customizing the combination.

19. The non-transitory computer-readable medium of claim 16, wherein:
the one or more non-tradeable deposit products comprise one or more time deposit products, each time deposit product comprising a rate curve defined as a combination of available tenors and interest rates,
the deposit strategy comprises at least one of a barbell, a ladder, a bullet and a combination thereof, and
the one or more pre-defined parameters comprise at least one of a total deposit amount, a yield, total interest amount to be received, a schedule of time deposit maturities, a final maturity, a maximum strategy maturity, a renewal strategy and a rollover strategy.

20. The non-transitory computer-readable medium of claim 16, wherein the at least one user adjustment tool further comprises at least one of:
an amount input region for inputting a total deposit amount,
an term input region for selecting a deposit term,
a structure input region for selecting a deposit structure,
a strategy selection region for selecting a renewal strategy, and
a modification selection button, selection of the modification button displaying a pop-up window, said pop-up window including an input region for modifying deposit amounts of one or more terms.

21. A method, the method comprising:
receiving, by at least one computer server configured to communicate with one or more entity systems and at least one user device, via one or more data feed interfaces, one or more baseline data structures from among the one or more entity systems, each of said one or more baseline data structures comprising a combination of one or more pre-defined components and one or more pre-defined parameters associated with one or more non-tradeable deposit products;
generating, by the at least one computer server, an interactive graphical user interface (GUI) on a display of the at least one user device, the interactive GUI comprising one or more screens;
applying one or more dynamic filter rules to the one or more baseline data structures to generate a list of baseline data structures that is based, at least in part, on a geographic characteristic that is associated with one or more of the at least one user device and a user of the at least one user device, said dynamic filter rules comprising said geographic characteristic;
displaying, via the interactive GUI, one or more combinations, each of which comprises a combination of one or more baseline data structures among the list of baseline data structures;

displaying, via the interactive GUI, one or more user adjustment tools for customizing variables of the one or more combinations, said variables comprising at least one of a deposit strategy and a customizable parameter among said pre-defined parameters;

receiving, by the at least one computer server, from the at least one user device via the interactive GUI, at least one adjustment indication via the one or more user adjustment tools;

adjusting, by the at least one computer server, responsive to the at least one adjustment indication, at least one of said variables, thereby forming a user-customized configuration of a user-customized combination;

dynamically updating and displaying, via the interactive GUI, said adjusting and an impact of said adjusting on at least one other variable as said adjusting occurs;

receiving, by the at least one computer server, from the at least one user device via the interactive GUI, input comprising a confirmation indication of the user-customized configuration; and creating and issuing, by the at least one computer server, the user-customized combination of baseline data structures responsive to the confirmation indication received from the at least one user device via the interactive GUI.

22. The method of claim 21, the method further comprising at least one of :
receiving the one or more combinations from the one or more entity systems via the one or more data feed interfaces, and
creating, by the at least one computer server, the one or more combinations.

23. The method of claim 21, the method further comprising providing, by the interactive GUI, a selection tool to select among the one or more displayed combinations to customize.

24. The method of claim 23, wherein the one or more dynamic filter rules restrict a selection of combinations among the one or more combinations presented on said display.

25. The method of claim 21, the method further comprising:
automatically determining and assigning, responsive to the confirmation indication and prior to issuing the user-customized combination, an optimal combination of baseline data structures from among the list of baseline data structures for inclusion in the user-customized combination; and
displaying, via the interactive GUI, said optimal combination of baseline data structures on the at least one user device.

26. The method of claim 25, the method further comprising:
receiving, via the interactive GUI, from the at last one user device, one of a first input comprising a confirmation indication of the optimal combination of baseline data structures and a second input comprising one or more modification indications to the optimal combination of baseline data structures,
the user-customized combination being issued with an allocation in accordance with one of the first input and the second input.

27. The method of claim 21, the method further comprising:
receiving, via the interactive GUI, live data as input, via a live data feed; and
adjusting at least one of the variables in real-time responsive to said received live data.

28. The method of claim 21, the method further comprising:
automatically generating and displaying, via the interactive GUI, one or more summary reports reflecting all adjustments to said variables to create the user-customized combination.

29. The method of claim 21, wherein:
the one or more non-tradeable deposit products comprise one or time deposit products, each time deposit product comprising a rate curve defined as a combination of available tenors and interest rates,
the deposit strategy comprises at least one of a barbell, a ladder, a bullet and a combination thereof, and
the one or more pre-defined parameters comprise at least one of a total deposit amount, a yield, total interest amount to be received, a schedule of time deposit maturities, a final maturity, a maximum strategy maturity, a renewal strategy and a rollover strategy.

30. The method of claim 29, the method further comprising:
automatically initiate and execute one or more lifecycle routines post-issuance of the user-customized combination,
wherein the one or more lifecycle routines include at least one of funding and formulation across one or more funding systems, generating and transmitting details of the user-customized combination to one or more servers, classification of the user-customized combination, generation of accounting entries, generation of regulatory and fiscal reports, generation of analytical reports, data storage, initiating transactions, scheduling maturity events, conducting settlements, conducting one or more renewals, conducting one or more rollovers, automated end-of-day operations, and generation of one or more processing actions for further downstream processing.

* * * * *